US006523964B2

(12) United States Patent
Schofield et al.

(10) Patent No.: US 6,523,964 B2
(45) Date of Patent: Feb. 25, 2003

(54) VEHICLE CONTROL SYSTEM AND METHOD

(75) Inventors: Kenneth Schofield, Holland, MI (US); Mark Larson, Grand Haven, MI (US)

(73) Assignee: Donnelly Corporation, Holland, MI (US)

(*) Notice: Subject to any disclaimer, the term of this patent is extended or adjusted under 35 U.S.C. 154(b) by 0 days.

(21) Appl. No.: 09/975,232

(22) Filed: Oct. 11, 2001

(65) Prior Publication Data

US 2002/0036830 A1 Mar. 28, 2002

Related U.S. Application Data

(63) Continuation of application No. 09/227,344, filed on Jan. 8, 1999, now Pat. No. 6,302,545, which is a continuation of application No. 08/478,093, filed on Jun. 7, 1995, now Pat. No. 5,877,897, which is a continuation-in-part of application No. PCT/US94/01954, filed on Feb. 25, 1994, which is a continuation-in-part of application No. 08/023,918, filed on Feb. 26, 1993, now Pat. No. 5,550,677.

(51) Int. Cl.$^7$ .............................................. G02B 27/00
(52) U.S. Cl. ...................... 359/601; 359/602; 359/267; 359/265
(58) Field of Search ...................... 359/601, 602–610, 359/882, 264–267, 613; 250/204, 205, 206.1, 206.2, 208.2, 210, 221, 221.1; 315/82, 159

(56) References Cited

U.S. PATENT DOCUMENTS

| 3,601,614 A | 8/1971 | Platzer, Jr. ................... 250/214 |
| 3,612,666 A | 10/1971 | Rabinow ..................... 359/604 |

(List continued on next page.)

FOREIGN PATENT DOCUMENTS

| DE | 2133182 | 1/1973 |
| DE | 2808260 | 8/1979 |

(List continued on next page.)

OTHER PUBLICATIONS

Commonly assigned co–pending U.S. application Ser. No. 09/599,979, filed Jun. 22, 2000, entitled Vehicle Rain Sensor Using Imaging Sensor (DON01–p. 816).

*Primary Examiner*—Mohammad Sikder
(74) *Attorney, Agent, or Firm*—Van Dyke, Gardner, Linn & Burkhart, LLP

(57) ABSTRACT

A system apparatus, means and method for controlling a plurality of variable reflectance mirrors (or mirror segments), including a rearview mirror and side view mirrors, which change their reflectance level in response to a plurality of drive voltages applied thereto, for controlling the vehicle lighting system and for monitoring a vehicle interior for an automotive vehicle. The system includes a light sensing device and a control circuit formed as a single VLSI CMOS circuit. The light sensing device comprises a photosensor array having a field of view encompassing a vehicle interior. The logic and control circuit determines a background light signal from photosensor element signals generated by the photosensor elements in the photosensor array indicative of light levels incident on the photosensor elements. The circuit also determines a peak light signal in three different zones or sub-arrays of the photosensor array. The zones or sub-arrays may correspond to three mirrors or mirror segments. The peak light signals in each of the zones and a common background light signal are used to determine independent and separate control signals, which are then output to separate mirror drive circuits for independently controlling the reflectance level of the rearview mirror and the left and right side view mirrors, or alternatively the segments of a mirror. The logic and control circuit uses the background light signal to control the vehicle lighting system. The logic and control circuit also determines a vehicle intrusion condition if there is movement within the vehicle in a vehicle intrusion detection mode of the vehicle interior monitoring system. The logic and control circuit also stores image data in memory in the compartment image data storage mode of the vehicle interior monitoring system.

22 Claims, 25 Drawing Sheets

U.S. PATENT DOCUMENTS

| | | | | |
|---|---|---|---|---|
| 3,665,224 A | 5/1972 | Kelsey | ................... | 307/311 |
| 3,680,951 A | 8/1972 | Jordan | ................... | 359/606 |
| 3,708,231 A | 1/1973 | Walters | ................... | 356/149 |
| 3,746,430 A | 7/1973 | Brean | ................... | 359/604 |
| 3,807,832 A | 4/1974 | Castellion | ................... | 359/267 |
| 3,811,046 A | 5/1974 | Levick | ................... | 250/206 |
| 3,813,540 A | 5/1974 | Albrecht | ................... | 250/214 |
| 3,862,798 A | 1/1975 | Hopkins | ................... | 359/38 |
| 3,962,600 A | 6/1976 | Pittman | ................... | 315/158 |
| 3,986,022 A | 10/1976 | Hyatt | ................... | 250/203 |
| 4,161,653 A | 7/1979 | Bedini | ................... | 250/215 |
| 4,200,361 A | 4/1980 | Malvano | ................... | 359/38 |
| 4,249,160 A | 2/1981 | Chilvers | ................... | 340/902 |
| 4,266,856 A | 5/1981 | Wainwright | ................... | 359/606 |
| 4,281,898 A | 8/1981 | Ochiai | ................... | 359/606 |
| 4,443,057 A | 4/1984 | Bauer | ................... | 359/606 |
| 4,491,390 A | 1/1985 | Tong-Shen | ................... | 359/39 |
| 4,512,637 A | 4/1985 | Ballmer | ................... | 359/275 |
| 4,529,275 A | 7/1985 | Ballmer | ................... | 359/265 |
| 4,529,873 A | 7/1985 | Ballmer | ................... | 250/201 |
| 4,572,619 A | 2/1986 | Reininger | ................... | 359/254 |
| 4,580,875 A | 4/1986 | Bechtel | ................... | 359/604 |
| 4,603,946 A | 8/1986 | Kato | ................... | 359/38 |
| 4,614,415 A | 9/1986 | Hyatt | ................... | 354/354 |
| 4,623,222 A | 11/1986 | Itoh | ................... | 359/38 |
| 4,629,941 A | 12/1986 | Ellis | ................... | 315/153 |
| 4,632,509 A | 12/1986 | Ohmi | ................... | 359/38 |
| 4,669,825 A | 6/1987 | Itoh | ................... | 359/38 |
| 4,669,826 A | 6/1987 | Itoh | ................... | 359/604 |
| 4,671,615 A | 6/1987 | Fukada | ................... | 359/38 |
| 4,672,457 A | 6/1987 | Hyatt | ................... | 348/761 |
| 4,676,601 A | 6/1987 | Itoh | ................... | 358/38 |
| 4,690,508 A | 9/1987 | Jacob | ................... | 359/38 |
| 4,697,883 A | 10/1987 | Suzuki | ................... | 359/604 |
| 4,701,022 A | 10/1987 | Jacob | ................... | 359/603 |
| 4,727,290 A | 2/1988 | Smith | ................... | 315/82 |
| 4,741,603 A | 5/1988 | Miyagi | ................... | 359/270 |
| 4,793,690 A | 12/1988 | Gahan | ................... | 359/604 |
| 4,820,933 A | 4/1989 | Hong | ................... | 307/10.1 |
| 4,838,650 A | 6/1989 | Stewart | ................... | 359/604 |
| 4,886,960 A | 12/1989 | Molyneux | ................... | 250/206 |
| 4,896,030 A | 1/1990 | Miyaji | ................... | 250/206 |
| 4,916,374 A | 4/1990 | Schierbeek | ................... | 318/483 |
| 4,917,477 A | 4/1990 | Bechtel | ................... | 359/267 |
| 4,956,591 A | 9/1990 | Schierbeek | ................... | 318/483 |
| 4,974,078 A | 11/1990 | Tsai | ................... | 358/133 |
| 4,991,054 A | 2/1991 | Walters | ................... | 361/165 |
| 5,012,082 A | 4/1991 | Watanabe | ................... | 250/208 |
| 5,055,668 A | 10/1991 | French | ................... | 250/208 |
| 5,064,274 A | 11/1991 | Alten | ................... | 359/604 |
| 5,148,014 A | 9/1992 | Lynam | ................... | 359/602 |
| 5,168,378 A | 12/1992 | Black | ................... | 359/38 |
| 5,193,029 A | 3/1993 | Schofield | ................... | 359/604 |
| 5,204,778 A | 4/1993 | Bechtel | ................... | 359/604 |
| 5,253,109 A | 10/1993 | O'Farrell | ................... | 359/604 |
| 5,416,318 A | 5/1995 | Hegyi | ................... | 250/226 |
| 5,537,003 A | 7/1996 | Bechtel | ................... | 315/82 |
| 5,550,677 A | 8/1996 | Schofield | ................... | 359/604 |
| 5,760,962 A | 6/1998 | Schofield et al. | ................... | 359/604 |
| 5,796,094 A | 8/1998 | Schofield et al. | ................... | 250/208.1 |
| 5,848,802 A | 12/1998 | Breed et al. | ................... | 280/735 |
| 5,877,897 A | 3/1999 | Schofield et al. | ................... | 359/604 |
| 6,097,023 A | 8/2000 | Schofield et al. | ................... | 250/208.1 |
| 6,433,676 B2 * | 8/2002 | DeLine et al. | ................... | 340/425.5 |
| 6,442,465 B2 * | 8/2002 | Breed et al. | ................... | 280/734 |

FOREIGN PATENT DOCUMENTS

| | | |
|---|---|---|
| DE | 3041612 | 11/1980 |
| DE | 3041692 | 5/1981 |
| DE | 4118208 | 11/1991 |
| EP | 48506 | 6/1985 |
| EP | 48810 | 10/1988 |
| EP | 0426503 | 5/1991 |
| EP | 0492591 | 7/1992 |
| FR | 2513198 | 3/1983 |
| GB | 1535182 | 12/1978 |
| GB | 2029343 | 3/1980 |
| GB | 2119087 | 11/1983 |
| GB | 2137373 | 10/1984 |
| GB | 2156295 | 10/1985 |
| JP | 5630305 | 8/1979 |
| JP | 57-173801 | 10/1982 |
| JP | 58-19941 | 12/1982 |
| JP | 57-208530 | 12/1982 |
| JP | 57-208531 | 12/1982 |
| JP | 59-51301 | 4/1984 |
| JP | 59-51325 | 4/1984 |
| JP | 60-212730 | 10/1985 |
| JP | 60-166651 | 11/1985 |
| JP | 61-54942 | 4/1986 |
| JP | 61-56638 | 4/1986 |
| JP | 3284413 | 12/1991 |
| JP | 417386 | 4/1992 |

* cited by examiner

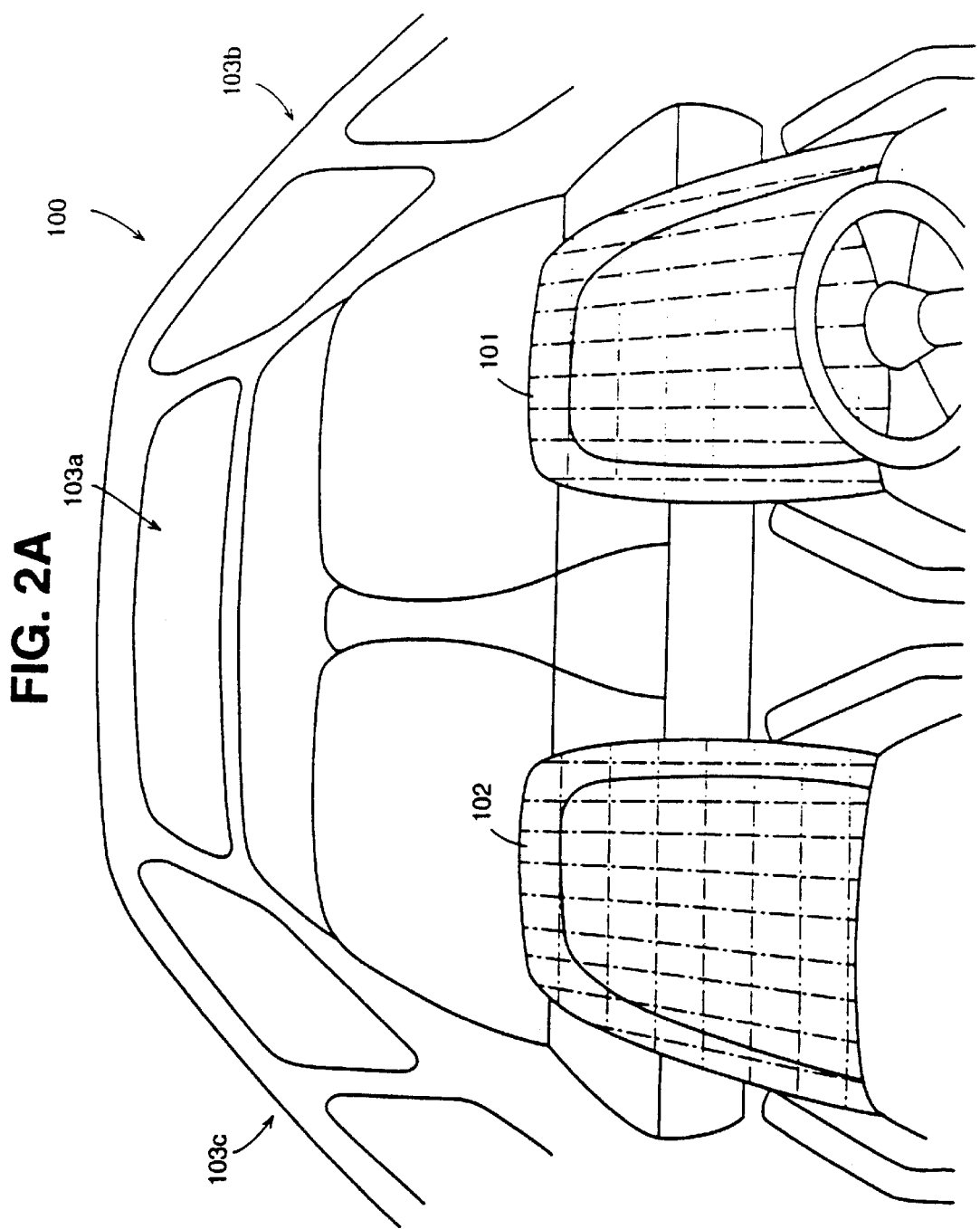

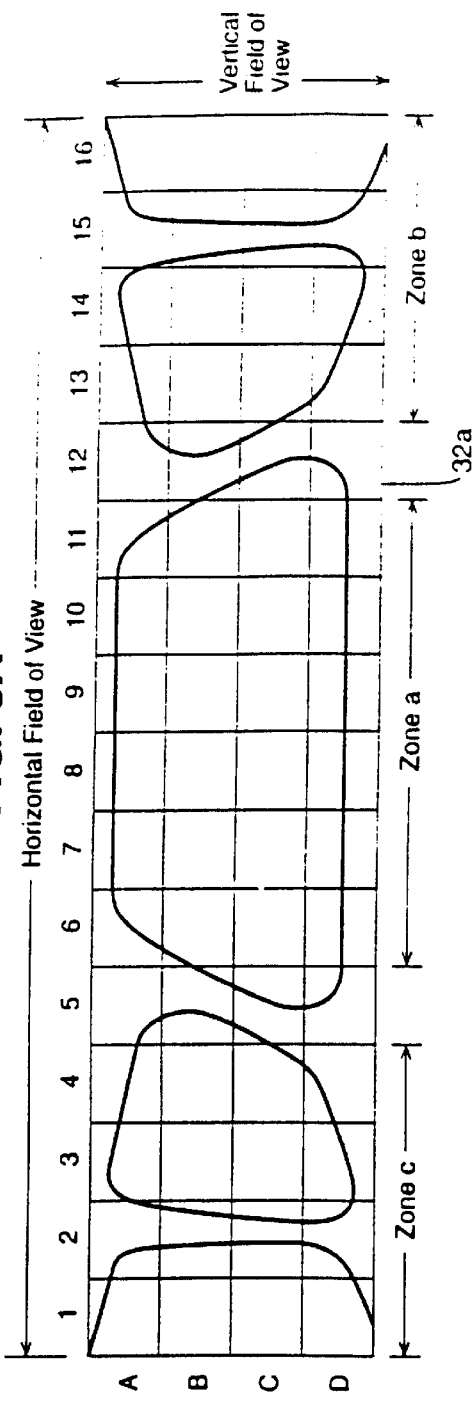
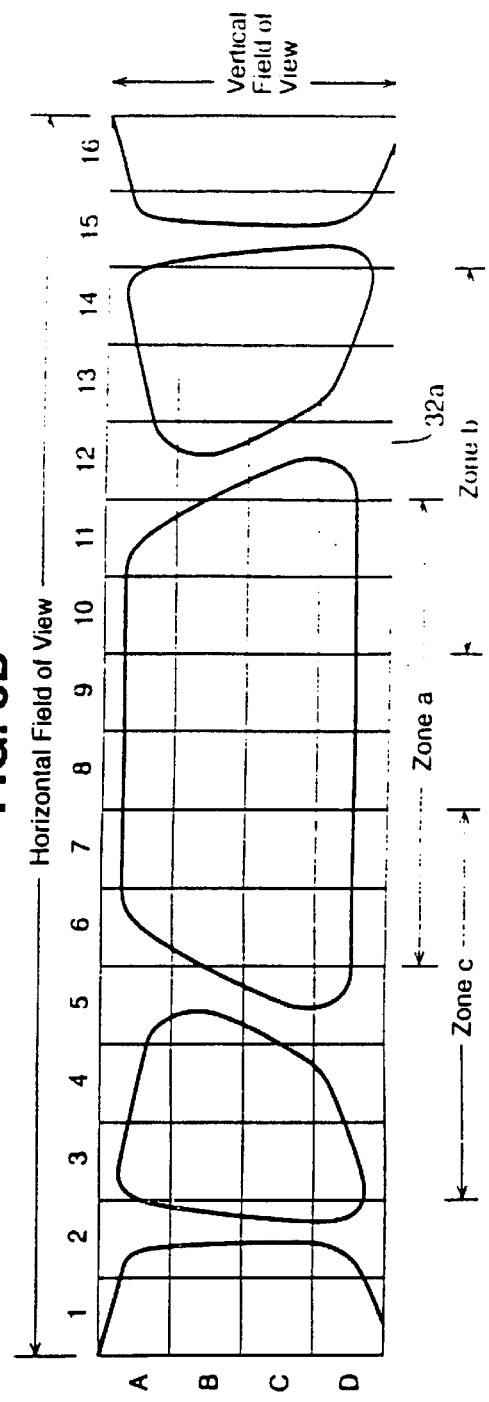

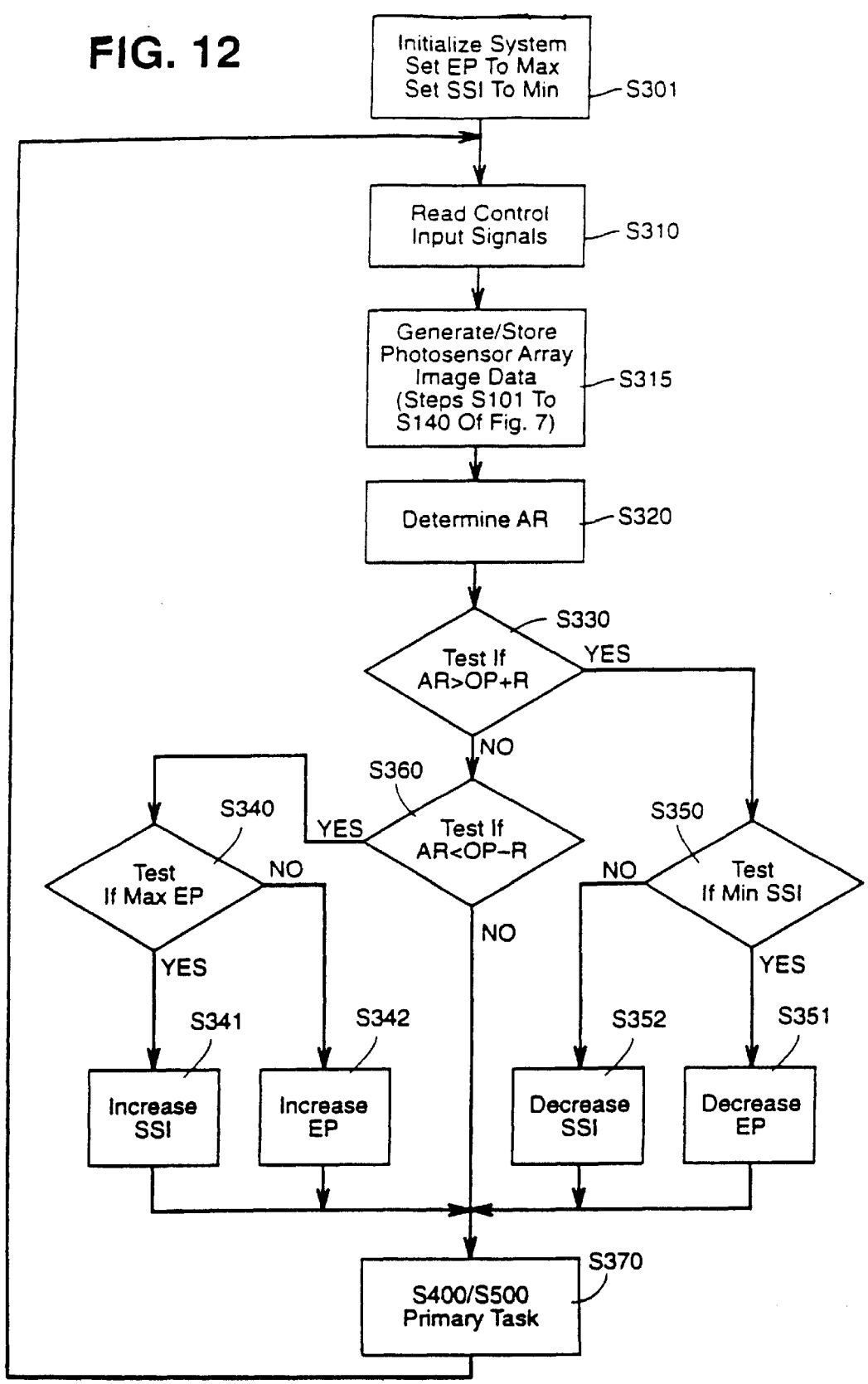

VEHICLE CONTROL SYSTEM AND METHOD

This application is a continuation of prior application Ser. No. 09/227,344, filed on Jan. 8, 1999, now U.S. Pat. No. 6,302,545, which is a continuation of application Ser. No. 08/478,093, filed on Jun. 7, 1995, now U.S. Pat. No. 5,877,897, which is a continuation-in-part of International Patent Application No. PCT/US94/01954, which designates the United States and which was filed Feb. 25, 1994 and which is a continuation-in-part of U.S. patent application Ser. No. 08/023,918, filed Feb. 26, 1993, now U.S. Pat. No. 5,550,677.

BACKGROUND OF THE INVENTION

1. Field of the Invention

This invention relates to an automatic rearview mirror system for automotive vehicles which automatically changes reflectance level in response to glare causing light, and more particularly relates to an improved automatic rearview mirror system using only a rearwardly facing sensor. This invention further relates to an automatic rearview mirror and vehicle interior monitoring system for automotive vehicles which also monitors a vehicle interior or compartment. This invention further relates to an automatic rearview mirror and vehicle interior monitoring system for automotive vehicles which may also be used as a vehicle intrusion detection system or as a compartment image data storage system. This invention further relates to an automatic rearview mirror and a vehicle lighting control system using an image sensor, such as a photosensor array.

2. Description of Related Art

Automatic rearview mirrors and mirror systems have been devised for varying the reflectance level of a variable reflectance rearview mirror by reducing the reflectance automatically in response to annoying glare light, as seen rearwardly of the rearview mirror or mirrors by a driver of the vehicle, and by increasing automatically the reflectance to a normal or maximum reflectance level when the annoying glare light subsides. These automatic mirrors have been changed over the years in an effort to improve their performance characteristics and associated level of glare protection.

Early automatic rearview mirrors used a rearwardly facing sensor and control circuit to change mirror reflectance. One example of such a "single-sensor" type mirror is described in U.S. Pat. No. 4,266,856. In these prior art single-sensor type mirrors, the rear glare light was incident on a rearwardly facing sensor or photocell, such as a photodiode, photoresistor or phototransistor. These mirrors suffered from various problems, however, including the problem that these mirrors would become increasingly sensitive and even "lock-up" in their minimum reflectance level or state as the driver encountered significantly higher light levels in town or city driving. This required the driver to repeatedly adjust the mirror's sensitivity control to prevent such problems.

To overcome the problems of single-sensor type mirrors, a non-rearwardly facing photocell for sensing "ambient" light was added. It was believed that the desired reflectance necessary to relieve the driver from glare depended not only on glare light but also on ambient light. Accordingly, these "two-sensor" type mirrors used two separate photocells, one generally facing rearwardly and one generally facing forwardly (or other non-rearwardly facing direction) of the mirror or vehicle. The signals from these two photocells were then compared in some fashion, and when, for example, the glare light from the rear was comparatively high with respect to the "ambient" light, a control circuit would apply a control signal to reduce mirror reflectance. Some examples are described in German Laid-Open Patent No. 3,041,692; Japanese Laid-Open Patent No. 58-19941; and U.S. Pat. Nos. 3,601,614; 3,612,666; 3,680,951; 3,746,430; 4,443,057; 4,580,875; 4,690,508; and 4,917,477. In many of these prior art automatic rearview mirrors, light generally forward of the mirror or vehicle was incident on the second photocell.

These arrangements, however, also had problems. In some of these mirrors the forwardly facing or "ambient" light sensor was inaccurate because it did not correctly measure ambient light levels since it did not include light generally rearward of the mirror or vehicle. Some examples include the devices described in U.S. Pat. Nos. 4,443,057 and 4,917,477. Other prior art devices overcame these deficiencies by providing a control circuit which correctly measured ambient light as a combination of both the forward and rear light levels. Examples of this significantly different approach are described in U.S. Pat. Nos. 4,793,690 and 4,886,960.

The prior art two-sensor type systems generally provided improved performance over prior art single-sensor type systems but were also more complex and costly. In part, this was because using separate forwardly and rearwardly facing photocells required that the performance characteristics of the two separate photocells, such as photoresistors, be matched appropriately to ensure consistent performance under various operating conditions. Matching photocells such as photoresistors, however, generally involves complex, expensive and time consuming operations and procedures.

Both the prior art single-sensor and two-sensor type mirrors presented additional problems when they were also used to control the exterior side view mirrors. This is because such prior art systems used a common control or drive signal to change the reflectance level of both the interior rearview mirror and the exterior left and/or right side view mirrors by substantially the same amount. In U.S. Pat. No. 4,669,826, for example, a single-sensor type mirror system used two rearwardly facing photodiodes to control both an interior rearview mirror and the left and/or right side view mirrors based on the direction of incident light from the rear. Another example includes the two-sensor type system described in U.S. Pat. No. 4,917,477.

In rearview mirror systems, however, each of the interior rearview and exterior side view mirrors may reflect different source light levels. More specifically, the inside rearview mirror, left side view mirror and right side view mirror each enable the driver to view a different portion or zone of the total rearward area. Of course, there may be some overlap of the image information contained in each of the three zones. The situation is further complicated with multi-lane traffic because each of the mirrors reflects different light levels caused by the headlights of the vehicles which are following, passing or being passed. As a result, in the prior art systems, when the reflectance level of the interior rearview mirror was reduced to decrease the glare of headlights reflected therein, the reflectance level of the exterior left and right side view mirrors was also reduced by substantially the same amount, even though, for example, the side view mirrors might not be reflecting the same level of glare light, if any. Accordingly, rear vision in the exterior left and right side view mirrors could be improperly reduced.

Other prior art two-sensor type systems used a common ambient light sensor and several rearwardly facing sensors, one for each of the mirrors. An example is the alternate system also described in U.S. Pat. No. 4,917,477. This approach is not satisfactory, however, because it reduces system reliability and increases complexity and cost.

Finally, some prior anti-glare mirrors used several sensors to control the segments of a variable reflectance mirror. One example is disclosed in U.S. Pat. No. 4,632,509, which discloses a single-sensor type mirror using three rearwardly facing photocells to control three mirror segments depending on the direction of incident light from the rear. See also U.S. Pat. No. 4,697,883. These prior mirror systems generally have the same problems as the other single-sensor type mirrors. Some other anti-glare mirrors are generally disclosed in U.S. Pat. Nos. 3,986,022; 4,614,415; and 4,672,457.

Consequently, there is a need for an automatic rearview mirror system for an automotive vehicle having improved reliability and low cost, which accurately determines or otherwise discriminates light levels that the driver will experience as glare without the need for a separate forwardly facing photocell. In addition, as noted above, there is also a need for an automatic rearview mirror system of high reliability and low cost, which accurately determines light levels that the driver will experience as glare, and which can control independently the reflectance of a plurality of mirrors according to the light levels actually reflected by each of the rearview and exterior side view mirrors without the need for additional and separate rearwardly facing photocells. There is also a need for an automatic rearview mirror system that can independently control the segments of a variable reflectance mirror while accurately determining light levels that the driver will experience as glare in each segment of the mirror without the need for additional and separate forwardly and rearwardly facing photocells.

One concern with automatic rearview mirror systems, as well as other systems having sensing, control or logic circuits located in the rearview mirror, is that differences in vehicle design and mirror field of view requirements may result in rearview mirrors having a variety of appearances (or finishes), forms (or shapes) and sizes. These variations generally require the re-design and re-tooling of a number of the components or sub-assemblies of the rearview mirror head assembly. However, it is generally desirable to reduce the number of components or sub-assemblies of the rearview mirror head assembly so as to reduce cost, product development lead time and manufacturing complexity. To achieve this in automatic rearview mirrors, as well as other systems having sensing, control or logic circuits located in the rearview mirror, it is desirable to locate the sensing, control or logic circuits and related components in a housing or module, which is attached, connected, made integral with or otherwise associated with the rearview mirror mounting bracket means or structure so that a common design of a mounting bracket sub-assembly for a rearview mirror may be used with a variety of rearview mirror head assemblies.

Vehicle lighting systems may include a variety of vehicle lights, including low intensity peripheral or side lights that allow other vehicle drivers to seethe vehicle in lower light conditions, high intensity headlights that operate in a low beam mode or a high beam mode for general night driving, and fog lights that provide low ground lighting with less back scattering to improve the driver's views in adverse weather conditions, such as fog, rain and snow. Vehicle lighting systems may also include headlights having an intermediate or mid beam mode, as well as the low and high beam modes. Vehicle lighting systems may also include vehicle running lights, which are vehicle headlights that are operated at an appropriate intensity to improve the ability of other vehicle drivers to see the vehicle during the day. Vehicle running lights may also be used for lower lighting conditions, such as certain adverse weather conditions or other lower visibility conditions.

Thus, as the number of vehicle lighting options has increased, it has become more complex for the driver to determine the appropriate vehicle lighting configuration and to operate or control the vehicle lighting systems. Therefore, improved vehicle lighting control systems are required that may operate with other systems, such as automatic rearview mirror systems and vehicle interior monitoring systems, or as stand-alone systems.

Finally, unauthorized vehicle intrusion for the purpose of stealing the vehicle or its contents is a significant problem. Each year, automotive manufacturers are including vehicle anti-theft or intrusion detection systems on more vehicles to deter potential intruders and to prevent the theft of vehicles or their contents. Currently known vehicle anti-theft systems are generally designed to protect the vehicle or its contents from theft or vandalism. There are many versions of vehicle anti-theft systems using various sensor technologies that attempt to deter theft or vandalism using the horn, siren or flashing lights, or other alarm mechanisms to bring attention to a vehicle. As is known, existing intrusion detection systems for vehicles use sensor technologies that have various limitations, including the problem of false triggering. For example, in many cases active vehicle alarms are simply ignored by people who assume that the alarm was falsely triggered. The proliferation of separate automatic rearview mirror systems and vehicle intrusion detection systems is also costly. Therefore, vehicle intrusion detection systems using an improved sensor technology are required that operate in combination with other vehicle systems (such as automatic rearview mirror systems) or that operate independently.

Even with such anti-theft systems, recovered stolen vehicles typically provide little or no evidence of the vehicle thief. Therefore, systems are required that provide an image of the vehicle thief that would be useful to law enforcement and the insurance industry as an aid in identifying the person(s) responsible for the vehicle theft, and that operate in combination with other vehicle systems (such as automotive rearview mirror systems) or that operate independently.

SUMMARY OF THE INVENTION

It is an object of the present invention to overcome the problems of the prior art.

It is another object of the present invention to provide an automatic rearview mirror system of improved reliability.

It is yet another object of the present invention to provide an automatic rearview mirror system that accurately determines light levels that the driver will experience as glare without the need for a separate forward facing sensor or other non-rearwardly facing photocells.

It is another object of the present invention to provide an automatic rearview mirror system of high reliability that accurately determines light levels that the driver will experience as glare, and which can independently control a plurality of mirrors or mirror segments according to different fields of view without the need for additional and separate rearwardly facing photocells.

According to one aspect of the present invention, using a photosensor array and an appropriate control circuit allows the elimination of separate forwardly facing or other non-rearwardly facing photocells, thereby allowing for lower costs and increased reliability since it is not necessary to match two separate photocells such as photoresistors.

According to another aspect, the present invention which achieves one or more of these objectives relates to a control system for controlling a plurality of variable reflectance mirrors or mirror segments which change their reflectance in response to a signal from a drive circuit. The system comprises a plurality of variable reflectance mirrors, a photosensor array and a control circuit receiving signals from the photosensor array for controlling the mirrors. The photosensor array is mountable to view rearwardly of the mirror or vehicle. The photosensor array comprises a plurality of sets of photosensor elements corresponding to the plurality of variable reflectance mirrors. The photosensor elements in each set produce a plurality of photosensor element signals in response to light incident thereon. The control circuit determines control signals, indicative of a desired reflectance for each of the plurality of variable reflectance mirrors, in response to receiving photosensor element signals from the photosensor element set for each view or zone corresponding to the rearview mirror and exterior side view mirrors and also (or alternatively) the mirror segments. The control signals control the drive circuit to cause the plurality of variable reflectance mirrors or mirror segments to assume the desired reflectance.

According to another aspect, the present invention which achieves one or more of these objectives relates to an automatic rearview mirror system for an automotive vehicle comprising at least one variable reflectance rearview mirror, and an array of sensing elements to sense light levels in an area rearward of the at least one variable reflectance rearview mirror. Each of the sensing elements is adapted to sense light levels of light incident thereon and to output an electrical signal indicative of the sensed light levels. The system further comprises a signal processor, connected to the array of sensing elements, receiving and using the electrical signals indicative of the sensed light levels from the sensing elements to determine a first electrical signal indicative of a background light level in the area rearward of the at least one variable reflectance rearview mirror and to determine a second electrical signal indicative of at least one peak light level in the area rearward of the at least one variable reflectance rearview mirror. The signal processor determines at least one control signal indicative of the desired reflectance level of the at least one variable reflectance rearview mirror from the first electrical signal indicative of the background light level and the second electrical signal indicative of the at least one peak light level. The system further comprises at least one drive circuit connected to the signal processor and to the at least one variable reflectance rearview mirror for receiving the at least one control signal and generating and applying at least one drive signal to the at least one variable reflectance rearview mirror to drive the at least one variable reflectance mirror to the desired reflectance level.

According to another aspect, the present invention which achieves one or more of these objectives relates to a control system for controlling a plurality of variable reflectance mirrors, each of which change their reflectance level in response to a drive signal from an associated drive circuit, for an automotive vehicle. The system comprises a plurality of variable reflectance mirrors, and a photosensor array mountable to face substantially towards a rear area. The photosensor array comprises a plurality of photosensor element sets. Each set comprises a plurality of photosensor elements. Each of the photosensor elements generates a photosensor element signal indicative of a light level of light incident thereon, and each of the sets corresponds to one of the plurality of variable reflectance mirrors. The system further comprises a control circuit, connected to the photosensor array, for determining and applying a plurality of control signals. Each of the control signals is indicative of a desired reflectance level for each of the plurality of variable reflectance mirrors in response to receiving the photosensor element signals from each of the plurality of photosensor element sets. The system further comprises a plurality of drive circuits connected to the control circuit and to different ones of the plurality of variable reflectance mirrors associated therewith. Each of the control signals is output to the drive circuit associated therewith, to generate and apply a drive signal to each of the plurality of variable reflectance mirrors causing each of the mirrors to assume a desired reflectance level.

According to another aspect, the present invention which achieves one or more of these objectives relates to a control system for controlling at least one variable reflectance mirror for an automotive vehicle. The system comprises photosensor array means for sensing light levels in an area rearward of the at least one variable reflectance mirror and generating photosensor array signals, means for determining a background light signal from the photosensor array signals, means for determining a peak light signal from the photosensor array signals, and means for controlling a reflectance level of the at least one variable reflectance mirror using the background and peak light signals.

According to another aspect, the present invention which achieves one or more of these objectives relates to a method of controlling the reflectance of at least one variable reflectance mirror comprising the steps of sensing light levels in an area rearward of the at least one variable reflectance mirror with an array of sensing elements, determining a background light level from the sensed light levels, determining a peak light level from the sensed light levels, and controlling a reflectance level of the at least one variable reflectance mirror using the determined background and peak light levels.

By using a plurality of photosensor element sets or sub-arrays on a photosensor array to control a plurality of mirrors and also (or alternatively) mirror segments, the mirrors may be controlled independently to vary their reflectance in accordance with the view associated with each of the photosensor element sets or sub-arrays.

According to another aspect the present relates to an automatic rearview mirror system for an automotive vehicle comprising a variable reflectance rearview mirror, a photosensor array means for sensing light levels in an area rearward of said variable reflectance rearview mirror and for generating photosensor array signals, a signal processing means for receiving said photosensor array signals and for determining from said photosensor array signals a signal for controlling said variable reflectance rearview mirror, and a mounting bracket means for attaching said variable reflectance rearview mirror to said automotive vehicle, said mounting bracket means further comprising a housing means for housing said photosensor array means and said signal processing means.

According to another aspect the present relates to a vehicle lighting control system for controlling a vehicle lighting system in an automotive vehicle comprising a photosensor array means for sensing light levels in a forward field of view and generating a set of photosensor array signals, and a signal processing means coupled to said photosensor array means for receiving said set of photosensor array signals and determining from said set of photosensor array signals at least one control signal for controlling said vehicle lighting system.

According to another aspect, the present invention relates to a control system for monitoring a vehicle interior and for controlling at least one variable reflectance mirror for an automotive vehicle. The system comprises photosensor array means for sensing light levels in an area rearward of said photosensor array means and generating at least a first set of photosensor array signals, first determining means coupled to said photosensor array means for receiving said at least a first set of photosensor array signals and determining from at least a portion of said at least a first set of photosensor array signals a first signal for controlling said at least one variable reflectance mirror, second determining means coupled to said photosensor array means for receiving said at least a first set of photosensor array signals and determining at least a first set of values indicative of said at least a portion of said at least a first set of photosensor array signals, and memory means coupled to said second determining means for receiving and storing said at least a portion of said at least a first set of photosensor array signals.

According to another aspect, the present invention relates to a vehicle intrusion detection system for detecting movement within a vehicle interior for an automotive vehicle. The system comprises photosensor array means for sensing light levels in an area including at least a portion of a vehicle interior and generating at least a first set and a second set of photosensor array signals, determining means coupled to said photosensor array means for receiving said at least a first set and a second set of photosensor array signals and determining at least a first set and a second set of values indicative of said at least a first set and a second set of photosensor array signals, and comparing means coupled to said determining means for receiving said at least a first set and a second set of values indicative of said at least a first set and a second set of photosensor array signals and comparing said at least a first set and a second set of values to generate at least one output control signal indicative of the correlation between said at least a first set and a second set of values.

According to another aspect, the present invention relates to a compartment image data storage system for an automotive vehicle. The system comprises photosensor array means for sensing light levels in at least a portion of a vehicle compartment and generating at least a first set of photosensor array signals, determining means coupled to said photosensor array means for receiving said at least a first set of photosensor array signals and determining at least a first set of values indicative of said at least a first set of photosensor array signals, and memory means coupled to said determining means for receiving and storing said at least a first set of values indicative of said at least a first set of photosensor array signals.

These and other objects, advantages and features of the present invention will be readily understood and appreciated with reference to the detailed description of preferred embodiments discussed below together with the accompanying drawings.

BRIEF DESCRIPTION OF THE DRAWINGS

FIG. 2A is an illustrative diagram of a rearward area of a vehicle interior as viewed by the photosensor elements of the photosensor array for monitoring the vehicle interior;

FIGS. 3A and 3B are illustrative diagrams of a rearward area as viewed by the photosensor elements of the photosensor array;

FIG. 12 is a flow chart illustrating the method of the present invention of the vehicle interior monitoring system;

DETAILED DESCRIPTION OF PREFERRED EMBODIMENT

I. The Automatic Rearview Mirror System

Figure 1A:
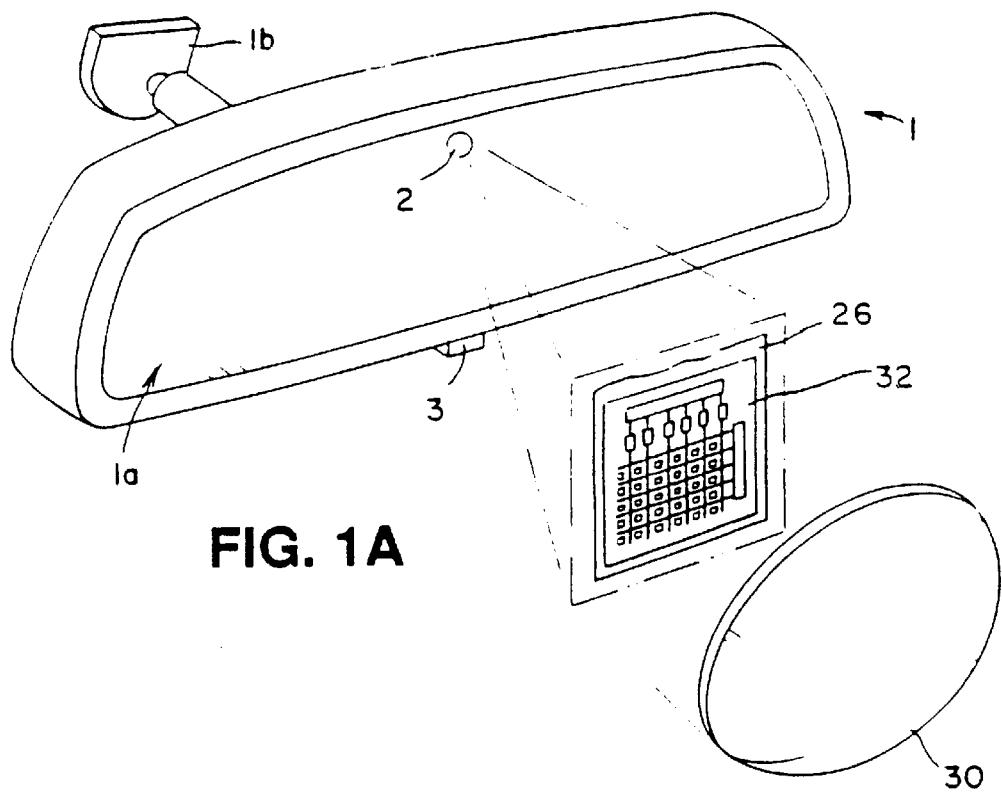
FIG. 1A is a drawing of an automatic rearview mirror of the present invention, including an expanded view of a rearwardly facing photosensor array located in the upper center area of the mirror surface.

FIG. 1A illustrates an automatic rearview mirror 1 comprising a variable reflectance mirror element 1a and a single rearwardly facing photosensor 2. The photosensor 2 is mounted facing rearwardly of the rearview mirror 1 so that its field of view encompasses an area comprising a rear window area and at least a portion of either or both side window areas. Also shown is a switch 3 to allow a driver to manually control several possible mirror functions, such as an on-off control switch, a sensitivity adjustment and a force-to-day or a force-to-night switch (i.e., forced maximum or minimum reflectance levels, respectively). An expanded view of the photosensor 2, which is preferably located in an upper center area of the variable reflectance mirror element 1a as shown, shows a light sensing and logic circuit 26 comprising a photosensor array 32 and a logic and control circuit 34 (which is not shown in FIG. 1A but is shown in FIG. 6 as discussed below). A photosensitive surface of each of the photosensor elements 32a (shown in FIG. 5) of the photosensor array 32 senses light levels or image information in a predetermined field of view encompassing an area located rearwardly of the rearview mirror 1. A lens 30 images or otherwise focuses the light information from the predetermined field of view onto the photosensor array 32.

The rearview mirror 1 further comprises a channel mount 1b or other mounting means used to fixedly attach the mirror 1 to the windshield or headliner area of the vehicle. The rearview mirror 1 is generally adjustable with respect to the channel mount 1b to allow a driver to position the mirror for correct viewing of the rearward area or scene so that the driver's sightline through the rearview mirror 1 is aligned approximately with the vehicle's centerline.

Figure 1B:
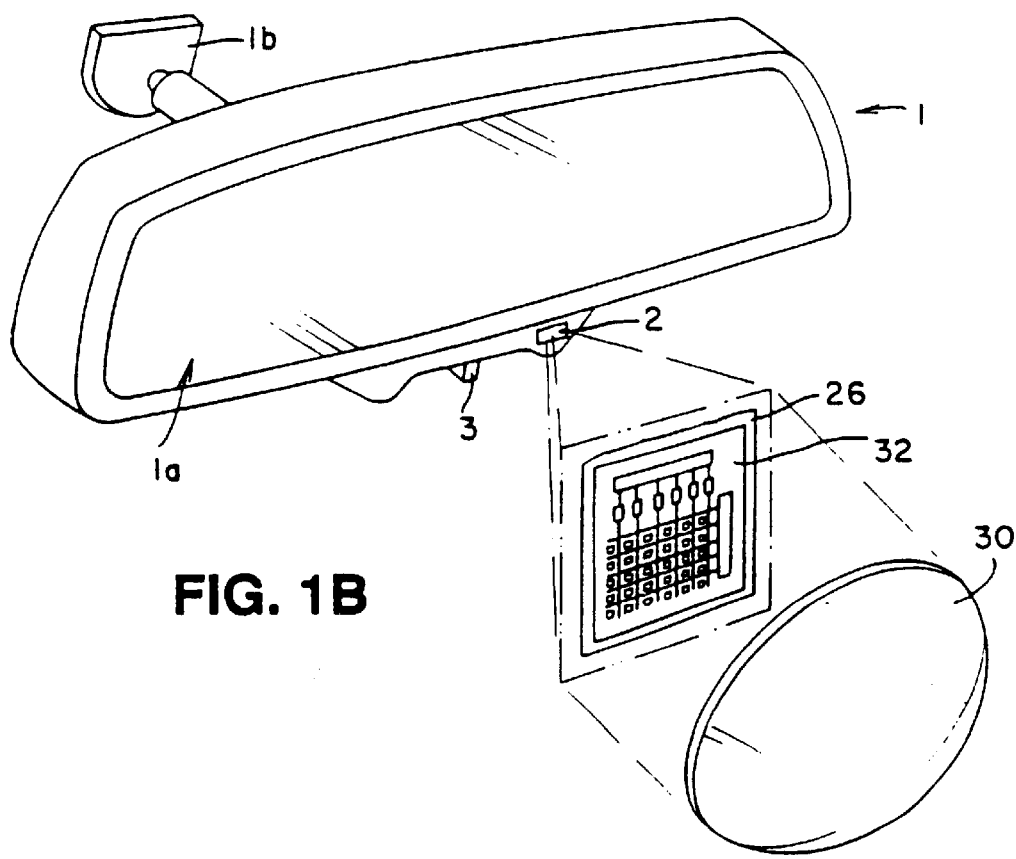
FIG. 1B is another drawing of an automatic rearview mirror of the present invention, including an expanded view of the rearwardly facing photosensor array alternatively located in a bezel or chin of the mirror.

Preferably, the photosensor 2 is fixedly mounted on the adjustable portion of the rearview mirror 1 as shown in both FIGS. 1A and 1B so that the viewing axis of the photosensor 2 is generally aligned with the viewing axis of the mirror 1 which is perpendicular to the glass surface of the mirror 1. This approach is preferable both because of packaging concerns and because it provides a guaranteed sightline. It is, however, within the scope of the present invention to mount the photosensor array 32 so that it is movable with respect to the variable reflectance mirror element 1a of the rearview mirror 1.

More preferably, as shown in FIG. 1A, the photosensor 2 is located in the upper center area of the variable reflectance mirror element 1a. This may be required, for example, if it is necessary to reduce the bezel size of the rearview mirror 1. If the photosensor 2 is located behind a glass surface of the variable reflectance mirror element 1a, an appropriately sized hole is provided in the protective and reflective materials of the variable reflectance mirror element 1a. Additionally, a corresponding area within an active layer of the variable reflectance mirror element 1a may be removed or otherwise rendered inactive to enable the photosensor 2 to view directly the rearward scene. Alternatively, for manufacturing reasons, the photosensor 2 may view the rearward scene through the active layer of the variable reflectance mirror element 1a, in which case it is preferable to compensate for or otherwise negate the effects of reducing reflectance and correspondingly the transmittance of the variable reflectance mirror element 1a so that the photosensor 2 effectively views the rearward scene directly as will be described later.

Most preferably, a reflective surface is maintained within the hole to both preserve the cosmetic appearance of the assembly as viewed by the driver and to maximize the reflective surface. This can be achieved by providing a very thin metal reflective layer (100 Å thickness or lower) of aluminum, stainless steel, chromium, or silver, etc., so as to be sufficiently transmitting for incident light to enable proper operation of the photosensor array 32 but also sufficiently reflective to appear mirror-like in the area of the hole. Alternatively, a reflective tape, which is both sufficiently transmitting and reflective to achieve the objectives described herein, may be adhered at the hole region using suitable means such as an optical adhesive and the photosensor array 32 may then be mounted behind the optical adhesive. Additionally, thin film stacks such as a solid state tri-layer of ¼ wave $TiO_2$, ¼ wave $SiO_2$ and ¼ wave $TiO_2$ or some other single thin film of a high index material may be mounted behind or coated upon the area of the hole. Finally, since the preferred photosensor array 32 is responsive to both visible light and near infrared, it is preferable to select a material which reflects a significant proportion of visible light while being essentially transparent to infrared.

As shown in FIG. 1B, the photosensor 2 may also be located in the bezel or chin of the rearview mirror 1 to view the rearward area directly without any compensation. In another preferred embodiment, the photosensor 2 may also be located on or near the channel mount or mounting bracket 1b so that the axis of the photosensor 2, which is perpendicular to the plane of the photosensor array 32, is in fixed alignment with the vehicle's centerline regardless of the adjusted position of the rearview mirror 1.

Figure 1C:
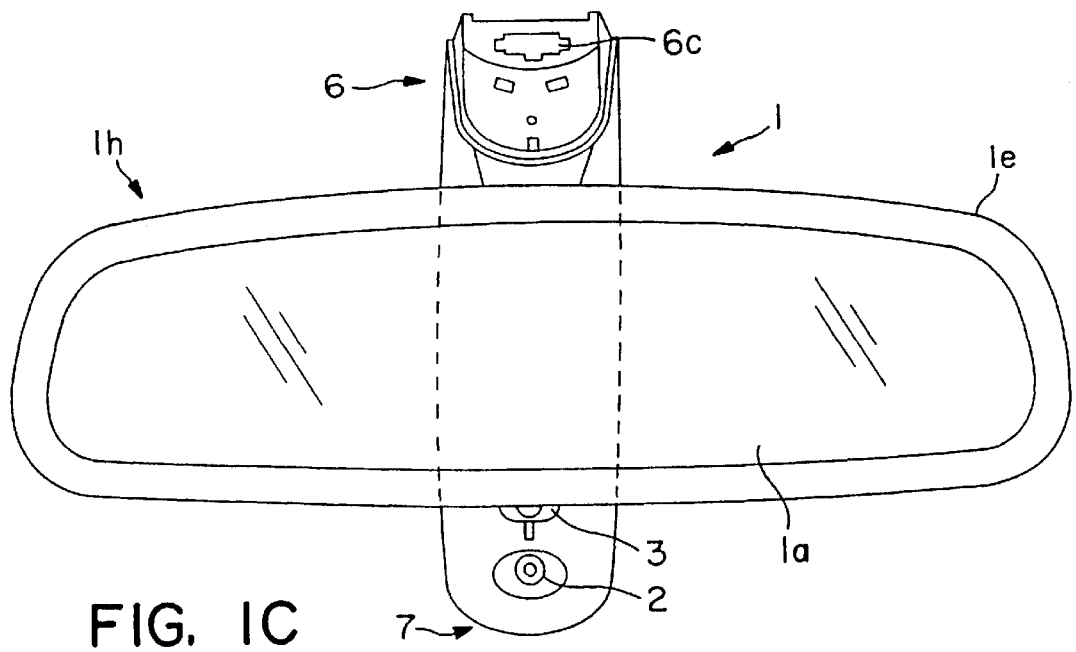
FIG. 1C is a diagram of an automatic rearview mirror of the present invention, in which the photosensor array and logic and control circuit are located in a housing or module that is attached, connected, made integral or otherwise associated with the rearview mirror mounting bracket structure.
Figure 1D:
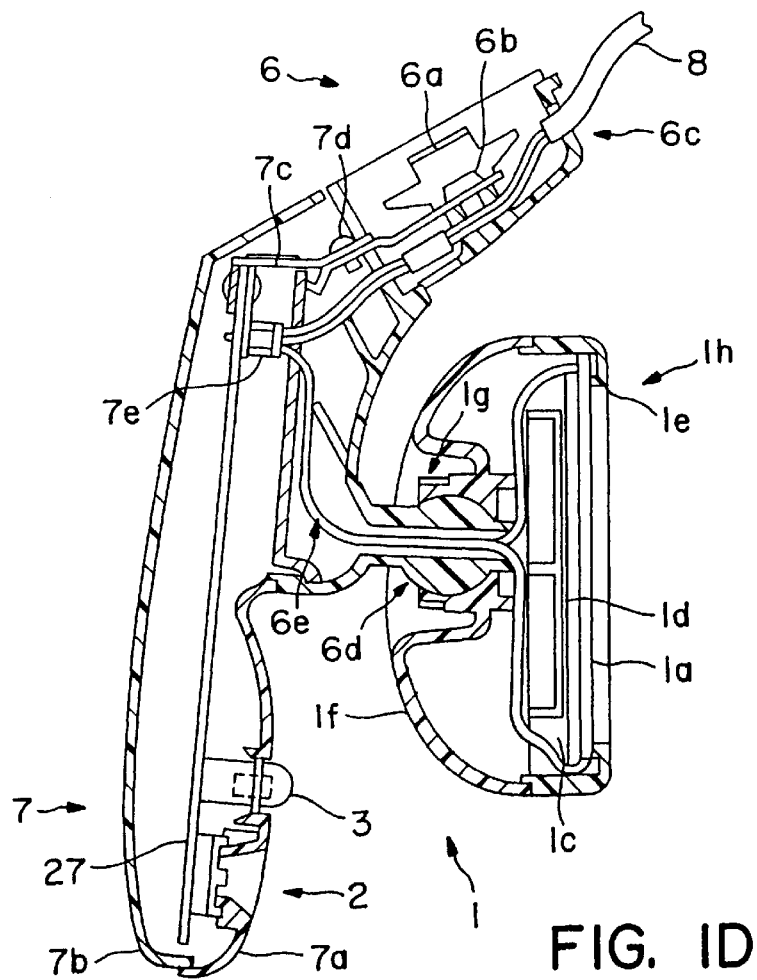
FIG. 1D is a side sectional view of the automatic rearview mirror of FIG. 1C.

In particular, as shown in FIGS. 1C and 1D, a sensing and logic circuit assembly 27, which comprises a sensing and logic circuit 26 and the photosensor 2 and switch 3 on a printed circuit board, is located in a housing or module 7 that is attached, connected, made integral or otherwise associated with the rearview mirror 1. In the embodiment shown in FIGS. 1C and 1D, a mounting bracket 6 is fixed relative to the headliner area of the vehicle body in a header mount arrangement; and a rearview mirror head assembly 1h is adjusted by a spherical pivot 6d at the interface of the mounting bracket 6 and the rearview mirror head assembly 1h. The mounting bracket 6 may also be releasably attached to a mounting button (not shown) that is attached to the windshield to provide generally improved ease of assembly and replacement, as well as safety Alternatively, the mounting bracket 6 may be attached to the windshield or headliner area of the vehicle by any of the various means well known to those skilled in the art.

In particular, the mounting bracket 6 comprises a retaining spring 6a, a retaining screw 6b, a wire harness opening 6c for receiving a wire harness assembly 8, and a spherical pivot 6d having an opening for wires 6e that are used to control the variable reflectance mirror element 1a. The housing or module 7 comprises a retaining housing or module 7a for partially mounting the sensing and logic circuit assembly 27, a rear housing or module cover 7b, a heat sink 7c for the sensing and logic circuit assembly 27, a screw 7d for securing the heat sink 7c to the mirror bracket 6, and a wire connector 7e for connecting the harness assembly 8 and wires 6e to the sensing and control circuit assembly 27. The harness assembly 8 is used, in part, to supply power to the sensing and logic circuit assembly 27.

Also, as shown in FIGS. 1C and 1D, the automatic rearview mirror 1 comprises the variable reflectance mirror element 1a, a mirror cushion support 1c, an impact absorber layer 1d, a bezel 1e, a mirror case 1f and clamp springs 1g for receiving and securing the spherical pivot 6d of the mounting bracket 6.

For other vehicles, such as trucks, the photosensor 2 may also be located with each of the external side view mirrors as will be described later.

The lens 30 is preferably a single molded plastic lens approximately 2 millimeters in diameter and is preferably bonded to or in close contact with the photosensor array 32. The lens 30 may, however, include any appropriate image focusing means such as conventional single component optics, holographic lens type optics, binary optics or a microlens. The lens 30 preferably is also designed to focus an image of the rearward scene within a field of view defined by a cone. The cone's centerline is perpendicular to the plane of the photosensor array 32 and the cone preferably has an included angle of approximately 100 degrees. Thus, the image is focused onto a circular area of the plane of the photosensor array 32. Of course, the photosensor array 32 could be positioned in other than a rearwardly facing direction so long as appropriate lenses or other optics are used to direct the light or image information from the rearward area onto the photosensitive surface of the photosensor array 32.

The pre-positioning of the photosensor array 32 in the rearview mirror 1 depends on whether the automatic rearview mirror system 20 is being used in a left hand or a right hand drive vehicle. In either case, the photosensor array 32 is preferably pre-positioned within the circular area of the focused image so that for either a left or right hand drive vehicle and with only driver adjustment of the rearview mirror 1, the rearward scene imaged onto the photosensitive surface of the photosensor array 32 includes the rear window area and at least a portion of the left and right side window areas of the vehicle.

If a sufficiently large photosensor array 32 is used, then the pre-positioning of the photosensor array 32 is not vehicle specific as described above, and a system 20 using a larger photosensor array 32 may be used for both left and right hand drive vehicles. The larger photosensor array 32 is positioned symmetrically within the circular area of the focused image described above. Using the larger photosensor array 32 involves using a pattern recognition means to determine the approximate vehicle centerline so that the appropriate portion of the larger photosensor array 32 may be selected depending on whether the automatic rearview mirror system 20 is installed in a left or right hand drive vehicle.

Figure 2:
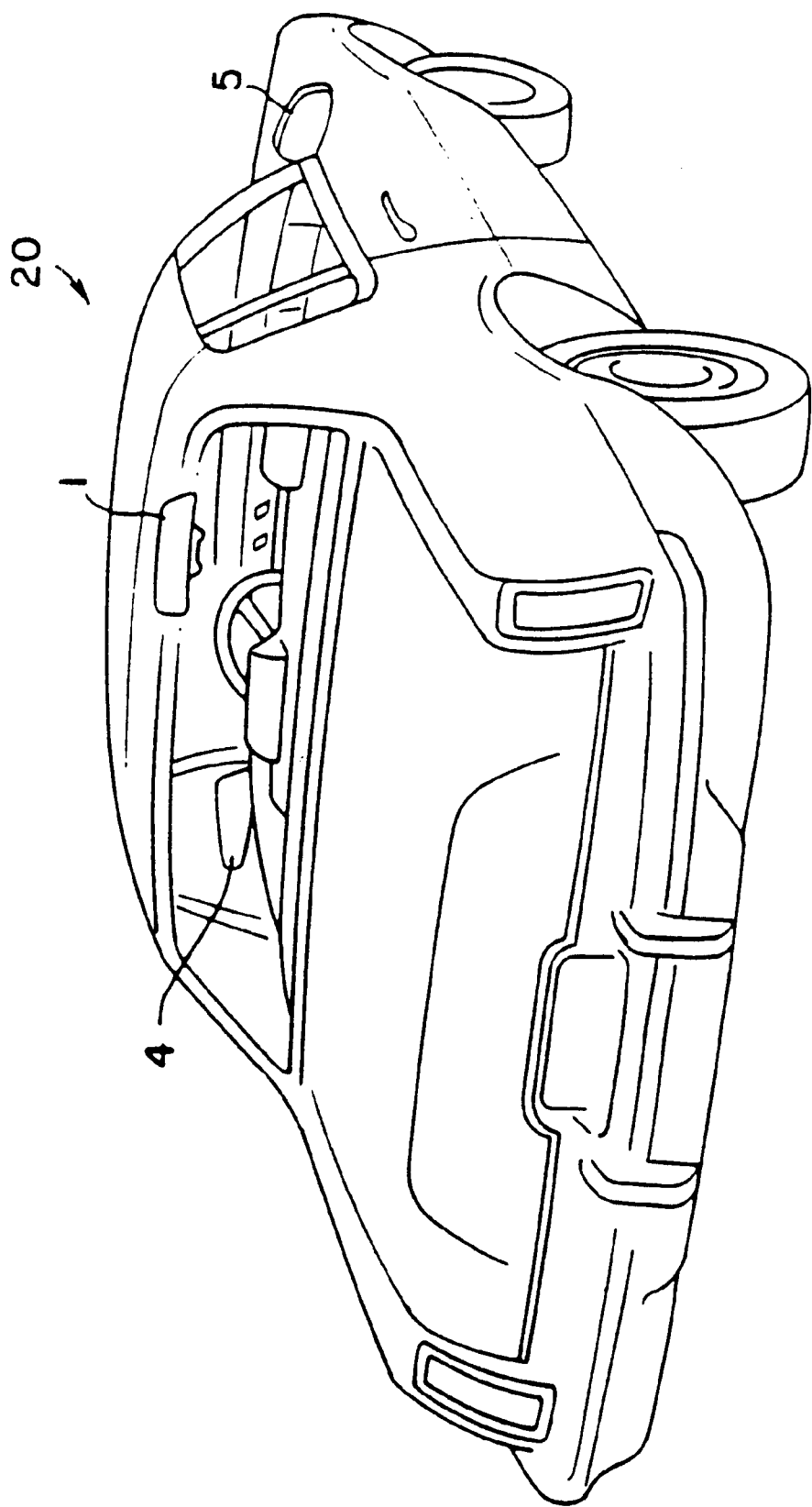
FIG. 2 is a drawing of an automotive vehicle with the automatic rearview mirror system of the present invention.

FIG. 2 illustrates an automatic rearview mirror system 20 for an automotive vehicle, comprising the rearview mirror 1, a left side view mirror 4 and a right side view mirror 5. As will be discussed below, either or both of the side view mirrors 4 and 5 may be connected to a control circuit of the rearview mirror 1. The mirrors 1, 4 and 5 may be constructed according to any of the methods known to those skilled in the art and are generally constructed according to the styling preferences and specifications of the automotive vehicle manufacturers. The means for mounting the rearview mirror 1, such as the channel mount 1b, and the electrical connectors used to connect the mirrors 4 and 5 to the control circuit of the rearview mirror 1 and the vehicle's electrical system may include any one of the many configurations known to those having ordinary skill in the art. The variable reflectance mirror element 1a of the mirrors 1, 4 and 5 may be any device having more than one reflectance level corresponding to a specific control or drive signal. Preferably, however, the variable reflectance mirror element 1a is an electrochromic mirror.

As discussed, the photosensor 2 is mounted facing rearwardly of the rearview mirror 1 so that its field of view encompasses an area comprising the rear window area and at least a portion of both the left side window area and the right side window area. The horizontal and vertical fields of view of the rearward area as seen by the photosensor 2, and more particularly by the photosensor array 32, are illustratively shown in FIGS. 3A and 3B.

As shown in FIG. 3A, the photosensor array 32 senses a field of view divided into three separate zones: a center zone a, a left zone b (generally corresponding to the left side window area) and a right zone c (generally corresponding to the right side window area). Each zone is sensed by a separate set or sub-array S(X) of photosensor elements 32a (described with respect to FIGS. 4A and 4B) within the photosensor array 32. The center zone, zone a, generally receives light from the rear window area of the vehicle. This rear window area is depicted by a trapezoidally shaped rear window figure superimposed on a first set or sub-array S(1) of photosensor elements 32a used to sense light levels in zone a. Zone b includes light from at least a portion of a left side window area. This is depicted by a trapezoidally shaped left rear side window figure and a partially shown left front side window figure superimposed on a second set or sub-array S(2) of photosensor elements 32a used to sense light levels in zone b. Similarly, zone c includes light from at least a portion of a right side window area. This is depicted by a trapezoidally shaped right rear side window figure and a partially shown right front side window figure superimposed on a third set or sub-array S(3) of photosensor elements 32a used to sense light levels in zone c. Additionally, all three zones include light reflected from whatever fixed body work and interior trim, head rests, vehicle occupants or other objects that are within the zones a, b and c.

Also as illustratively shown in FIG. 3A, the photosensor elements 32a in columns 1 to 4 comprise the third photosensor element set in zone c, the photosensor elements 32a in columns 6–11 comprise the first photosensor element set in zone a and the photosensor elements 32a in columns 13 to 16 comprise the second photosensor element set in zone b. Null zones are provided between the zones a and b and between the zones a and c to allow for driver adjustment of the rearview mirror 1. These null zones also ensure that the center zone a does not include light or other image information from the side window areas of zones b and c.

As will be discussed in more detail below, the logic and control circuit 34 selects photosensor element signals from the first photosensor element set or sub-array S(1) (shown in FIG. 4B) corresponding to zone a to control the reflectance level of the rearview mirror 1. Similarly, the control circuit 34 selects photosensor element signals from the second photosensor element set or sub-array S(2) (shown in FIG. 4B) corresponding to zone b to control the reflectance level of the left side view mirror 4, and further selects photosensor element signals from the third photosensor element set or sub-array S(3) (shown in FIG. 4B) corresponding to zone c to control the reflectance level of the right side view mirror 5. Additionally, for a variable reflectance mirror element 1a having segments, such as a center, left and right segment, appropriately defined zones a, b and c, i.e., sub-arrays S(1), S(2) and S(3), corresponding to the mirror segments may be used by the logic and control circuit 34 to control independently the individual mirror segments.

FIG. 3B illustratively shows the preferred embodiment for the zones of the photosensor array 32. In this embodiment, the logic and control circuit 34 selects photosensor element signals from three overlapping sets or sub-arrays S(1), S(2) and S(3) of photosensor elements 32a corresponding to the three overlapping zones a, b and c to control, respectively, the reflectance level of the mirrors 1, 4 and 5. More specifically, the control circuit 34 selects photosensor element signals from the photosensor elements 32a in columns 6 to 11 (zone a) to control the reflectance level of the rearview mirror 1. The control circuit 34 also selects photosensor element signals from photosensor elements 32a in columns 10 to 14 (zone b) to control the reflectance level of the left side view mirror 4, and further selects photosensor element signals from photosensor elements 32a in columns 3 to 7 (zone c) to control the reflectance level of the right side view mirror 5.

Additionally, in the FIG. 3B embodiment, the lens 30 focuses or images light information from: (1) the rear window area onto zone a; (2) at least a portion of the rear window and left side window areas onto zone b; and (3) at least a portion of the rear window and right side window areas onto zone c. Contrastingly, in the FIG. 3A embodiment, the lens 30 focuses light from: (1) the rear window area onto zone a; (2) the left side window area onto zone b; and (3) the right side window area onto zone c. The overlapping zones in the FIG. 3B embodiment are advantageous because each set of overlapping photosensor elements 32a in zones a and b and each set of overlapping photosensor elements 32a in zones a and c, as well as the logic and control circuit 34, is able to "preview" the light information that may, for example, first appear in the rear window area (and correspondingly in the rearview mirror 1), but which may appear shortly thereafter in the left or right side view mirrors 4 and 5. By examining at least a portion of the rear window area, the automatic rearview mirror system 20 is able to more quickly respond to annoying glare light from approaching vehicles or other sources. Overlapping zones are also generally preferred because a glare light source located in a common or overlapping area of the rearview mirror 1 and one of the side view mirrors 4 or 5 can influence both mirrors.

II. The Light Sensing Device

Figure 5:
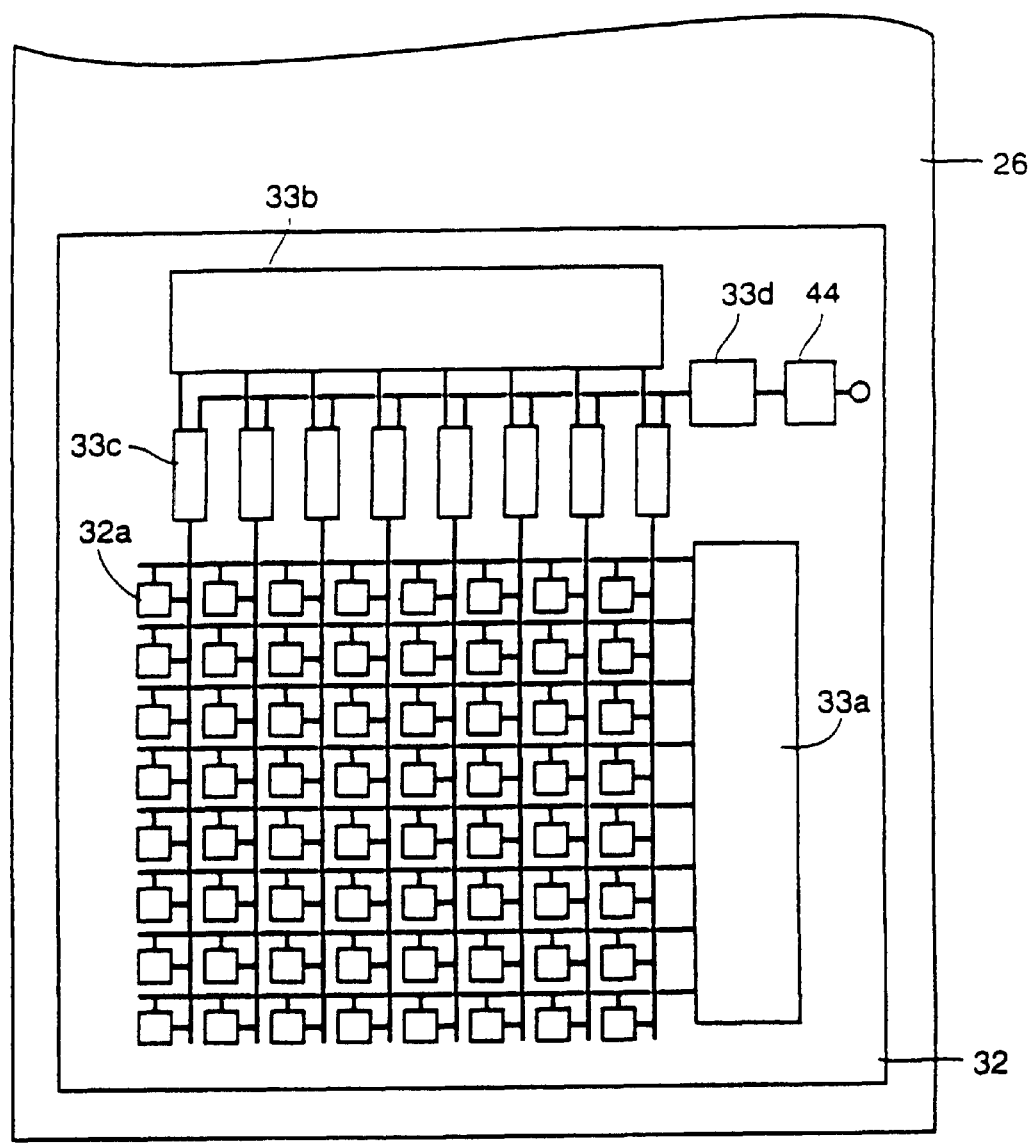
FIG. 5 is another schematic diagram of the photosensor array commonly located on a light sensing and logic circuit.
Figure 6:
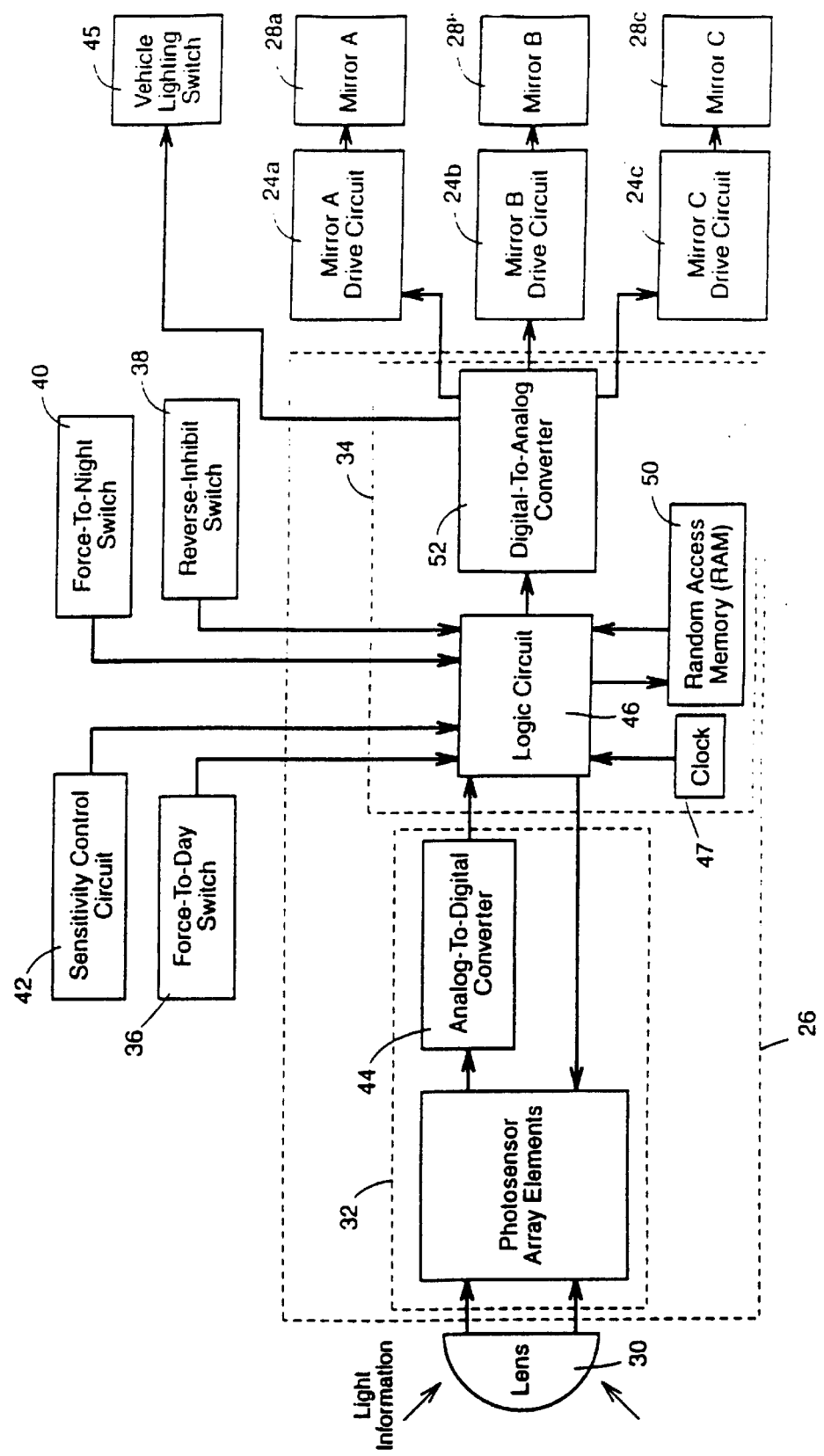
FIG. 6 is a schematic block diagram of the automatic rearview mirror system.

The light sensing device of the light sensing and logic circuit 26 is preferably the photosensor array 32 shown in FIG. 5. The photosensor array 32 has sufficient resolution to view the real image of a scene but may also use a spatial distribution of light intensities as an approximation of the imaged scene. An example of such a photosensor array 32 is the VLSI Vision Limited (VVL) Single Chip Video Camera Model #ASIS 1011.

Since a photosensor array 32 of the type described, namely the VVL Single Chip Video Camera, is capable of providing image information having sufficient resolution for displaying an actual image or for some other purpose, it will be readily understood that additional features or functions may be incorporated by adding circuitry to provide video output from the photosensor array 32 in addition to the primary control functions described herein. For example, the video output may be output to a CRT, flat LC panel display or other appropriate display device, located within the vehicle, to provide a display of the imaged scene for viewing by the driver.

The photosensor array 32 may be located in any of the mirrors 28 or in any other appropriate location, whether local or remote, such as on the vehicle's rear bumper, thereby extending significantly the effective field of view normally available to the driver either directly or through the vehicle's mirrors 28. Additionally, the photosensor array 32 may even replace one or more of the side view mirrors 4 and 5 of the automatic rearview mirror system 20, thereby reducing the aerodynamic drag on the vehicle while providing sufficient information to the driver comparable to that available through the side view mirrors 4 and 5.

A video signal from the photosensor array 32 may also be used by the logic and control circuit 34 to determine the presence of a vehicle or other object within the field of view of the photosensor array 32 to provide a visual signal warning such as through a display panel, or even an audible warning, based on certain parameters, such as distance and speed of the object. Additionally, if the photosensor array 32 is located in the rearview mirror 1, the video signal may be used to monitor the vehicle's interior to detect unauthorized intrusion into the vehicle. This may be achieved by providing electrical power to the mirror's logic and control circuit 34 from a vehicle power supply and by activating a vehicle intrusion monitoring mode when a signal indicates that the vehicle's door and trunk locks have been activated. The logic and control circuit 34 may be used to continuously monitor the image from the vehicle's interior thereby allowing detection of objects or persons moving within the vehicle, and if movement is detected, another signal from the logic and control circuit 34 may then activate an intrusion alarm.

Thus, the photosensor array 32 may be used to monitor the vehicle interior or compartment in a vehicle interior monitoring system. This monitoring capability may be used in a vehicle intrusion detection system or in a compartment image data storage system, either in combination with the automatic rearview mirror system or as an independent system. Using the photosensor array 32 to monitor the vehicle interior to detect potential intruders provides an effective vehicle intrusion detection system. In an automatic rearview mirror and vehicle intrusion detection system, the photosensor array 32 in the rearview mirror 1 provides a good location for monitoring the vehicle interior because the rearview mirror 1 is: (1) centrally located along the vehicle axis; (2) forward of the front seat; and (3) relatively high in the vehicle interior. This location is sufficiently high and far forward so as to provide a very good view of the vehicle interior, including the front and rear seat areas, front and rear door areas and hatchback or rear cargo door areas. The photosensor array 32 may also be positioned in other locations, including the headliner and headliner console areas, for example, or any other appropriate location depending on the particular application.

As is discussed later, when the vehicle interior monitoring system is used as a vehicle intrusion detection system, the logic and control circuit 34 processes image data to detect motion or movement in the vehicle interior, establishes an intrusion condition if such motion is detected and outputs one or more control signals to vehicle hardware or to a vehicle controller system. Vehicles today are often equipped with such controller systems. These vehicle controller systems may be used to control the exterior lights, interior lights, horn (or siren), ignition or other such vehicle hardware. The logic and control circuit 34 therefore outputs one or more control signals to various vehicle hardware or to the vehicle controller system to activate the interior and exterior lights, horn or siren or to disable the ignition to deter intruders from stealing the vehicle or its contents. Other control output signals may activate RF beacon devices or similar devices within the vehicle so that the vehicle may be tracked, as will be further described later.

It is, however, within the scope of the present invention for the light sensing device to comprise any similarly appropriate image or array sensor. When the light sensing and logic circuit 26 is formed as a very-large-scale-integrated (VLSI) complementary-metal-oxide-semiconductor (CMOS) device, as is known to those skilled in the art, the light sensing device will share a common semiconductor substrate with the logic and control circuit 34.

Preferably, for the described three mirror system, the photosensor array 32 comprises a plurality of photosensor elements 32a arranged in 160 columns and 40 rows (a 160×40 array) providing a horizontal field of view of approximately 100 degrees and a vertical field of view of approximately 30 degrees. As discussed, FIGS. 3A and 3B illustratively show a 16×4 photosensor array 32. The photosensor array 32 may, however, comprise any appropriately sized array having an appropriate field of view. For example, the field of view may be narrower when controlling the segments of only one mirror. Each photosensor element 32a is preferably about 10 microns square.

Figure 4A:
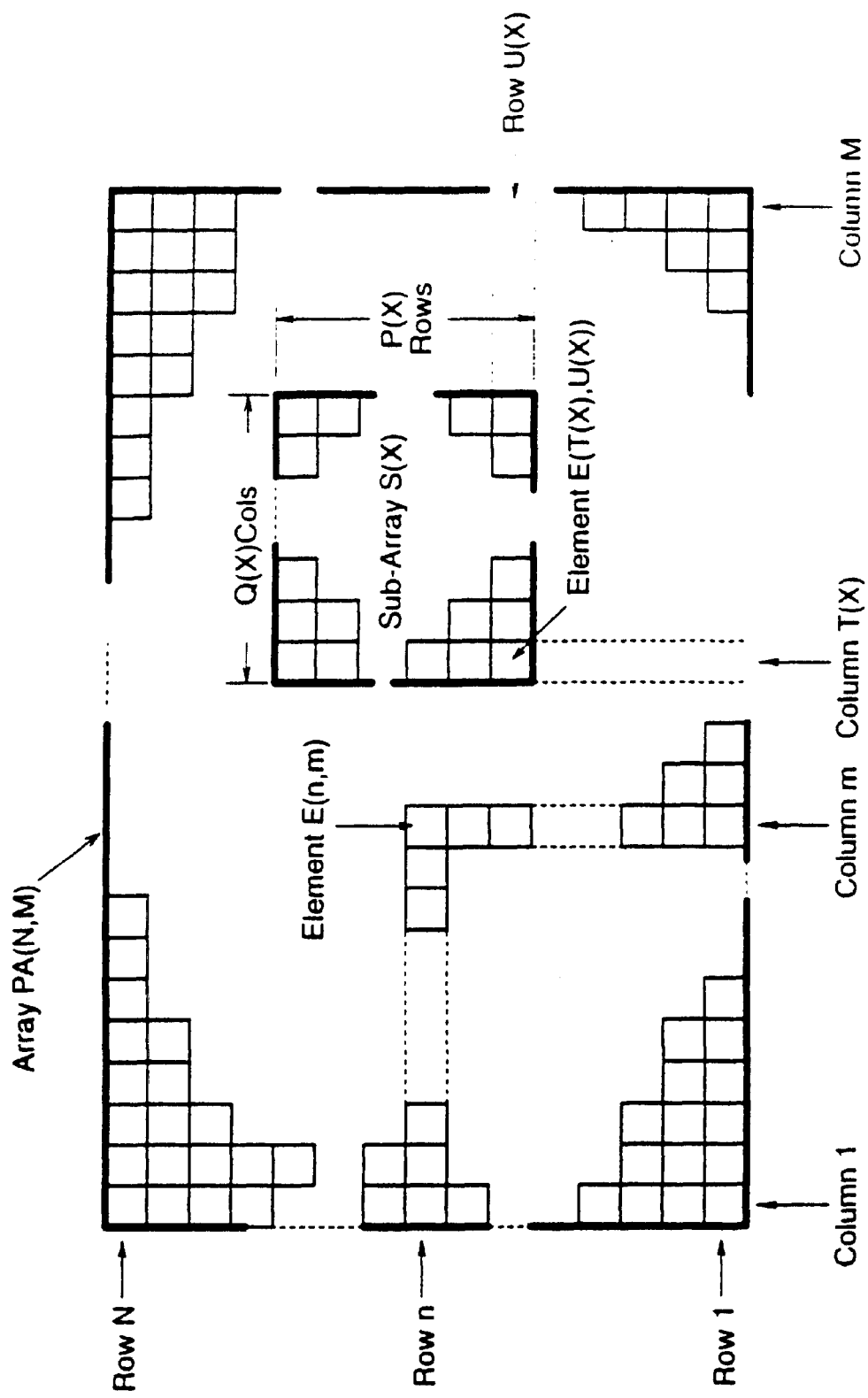
FIG. 4A is a generalized diagram of a photosensor array PA(N,M) having a sub-array S(X)

As shown in FIG. 4A, the photosensor array 32 generally comprises a plurality of photosensor elements 32a arranged in a photosensor array PA(N,M) having N rows of M columns. When viewing the photosensitive surface of the photosensor array PA(N,M) in a vertical plane, the lower row is row 1, the top row is row N, the left hand column is column 1, and the right hand column is column M. A specific photosensor element is identified as E(n,m) and the signal indicative of a light level incident thereon is L(n,m). Also, the sub-array S(X), where X=0, 1, 2, . . . , Z, is a rectangular array having P(X) rows of Q(X) columns of photosensor elements 32a and is located such that its lower left hand element is photosensor element E(T(X), U(X)).

Figure 4B:
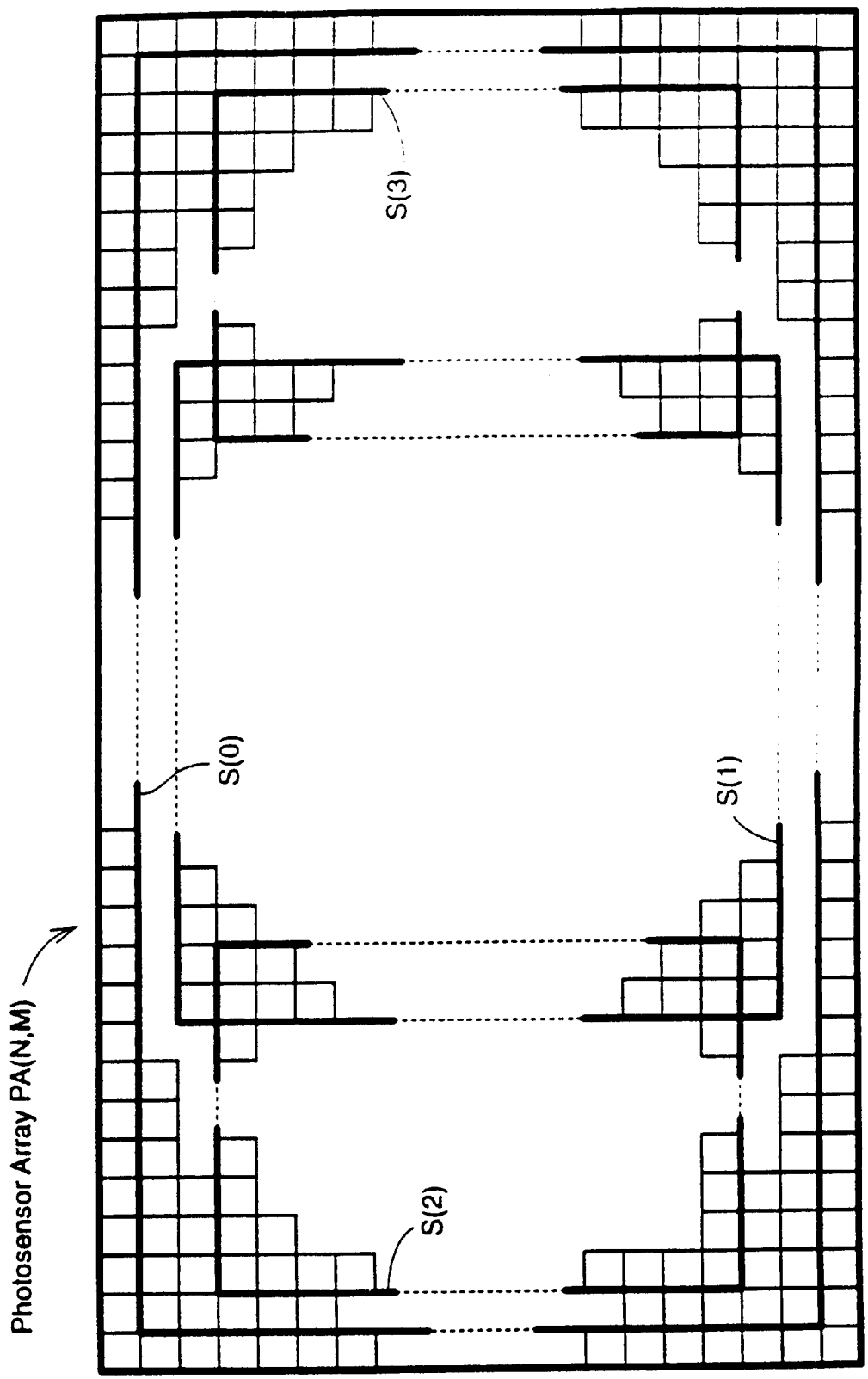
FIG. 4B is a generalized diagram of the photosensor array PA(N,M) and sub-arrays S(0), S(1), S(2) and S(3)

As shown in FIG. 4B, a background sub-array S(X) designated S(0) is used to determine a general background light level B. Signals from the photosensor elements 32a of each peak sub-array S(X), designated S(1), S(2), . . . , S(Z), are used to determine a peak light level P(z) incident on each peak sub-array S(1), S(2), . . . , S(Z). The general background light level B for background sub-array S(0) and the peak light level P(z) for each peak sub-array S(X) are then used to determine a mirror control signal $V_c(z)$ for controlling at least one mirror or mirror segments associated with each zone.

FIG. 5 generally illustrates a logic layout of the photosensor array 32. The logic and control circuit 34 generates array control signals to control the photosensor array 32. As is well known in the art, the photosensor array 32 is typically accessed in scan-line format, with the array 32 being read as consecutive rows, and within each row as consecutive columns or pixels. Each photosensor element 32a is connected to a common word-line 33e. To access the photosensor array 32, a vertical shift register 33a generates word-line signals for each word-line 33e to enable each row of photosensor elements 32a. Each column of photosensor elements 32a is connected to a bit-line 33f which is connected to a charge-to-voltage amplifier 33c. As each word-line 33e is accessed, a horizontal shift register 33b uses a line 33g to output the bit-line signals on consecutive bit-lines 33f to an output line 33h connected to the logic and control circuit 34. Also shown is a voltage amplifier 33d used to amplify the resulting analog photosensor element signals. The analog photosensor element signals are then output on line 33h to the analog-to-digital converter 44 and converted to digital photosensor element signals.

Figure 11A:
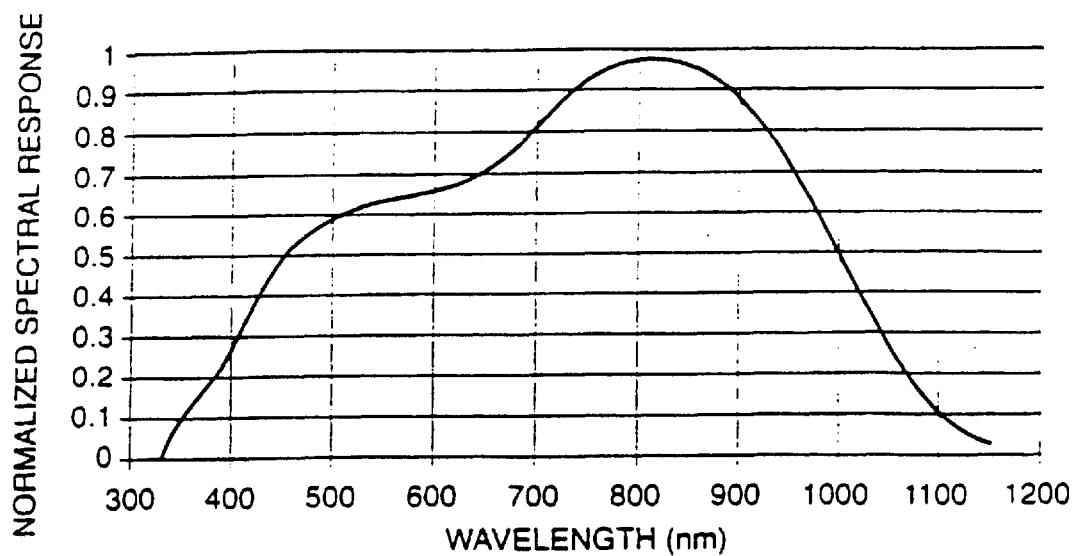
FIG. 11A illustrates the normalized spectral response of the photosensor array made using a non-epitaxial silicon process.
Figure 11B:
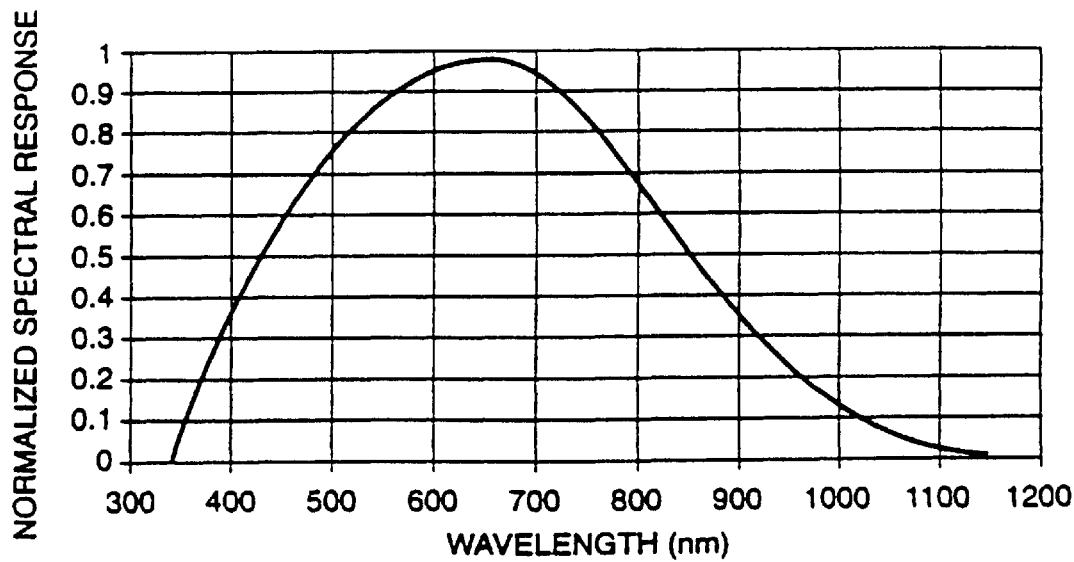
FIG. 11B illustrates the normalized spectral response of the photosensor array made using an epitaxial silicon process.

As discussed above, the photosensor array 32 is responsive to or senses both visible light and near infrared illumination. FIGS. 11A and 11B illustrate the normalized spectral response for two versions of the preferred photosensor array 32. In FIGS. 11A and 11B, visible light generally covers the wavelengths from about 400 nm to about 750 nm, while near infrared illumination or light generally covers the wavelengths from about 750 nm to about 3000 nm (not shown). More particularly, FIG. 11A illustrates the normalized spectral response of the preferred photosensor array 32 made using a non-epitaxial silicon process, where the peak spectral response occurs at about 800 nm. FIG. 11B shows the normalized spectral response of the preferred photosensor array 32 made using an epitaxial silicon process, where the peak spectral response occurs at about 650 nm. As shown, the non-epitaxial silicon photosensor array is more sensitive to near infrared illumination having wavelengths on the order of about 800 nm. The photosensor array 32 made using the non-epitaxial silicon process and having the normalized spectral response of FIG. 11A is most preferred in both the particular automatic rearview mirror and vehicle interior monitoring systems described herein. For automatic rearview mirror systems as described herein, this is because vehicle headlights generally provide significant levels of near infrared illumination. For vehicle interior monitoring systems as described herein, either natural sources (such as sunlight) or supplemental sources of near infrared illumination may be used to enhance the image information available to and the performance of such systems, as will be further discussed below.

The field of view and resolution of the photosensor array 32 depends on the number and physical dimensions of the photosensor elements 32a and on the design or geometry of the lens 30. For the lens type illustrated in FIG. 1A, the lens 30 may, for example, be designed to have an included angle on the order of up to about 140°. For the automatic rearview mirror system previously described, the effective field of view of approximately 100° horizontal and approximately 30° vertical is preferred. For the automatic rearview mirror and vehicle interior monitoring system described herein, an effective field of view of approximately 100° horizontal and approximately 75° vertical is preferred. Also as discussed for the automatic rearview mirror system, the lens 30 preferably focuses an image within a field of view defined by a cone having an included angle of approximately 100 degrees. Accordingly, when the lens 30 focuses the image onto the focal plane of the 160×40 photosensor array 32, the photosensor array 32 only falls within a segment of the focused image area.

FIG. 2A generally illustrates a view of a vehicle interior 100 (which includes the window areas of FIGS. 3A and 3B) as focused by the lens 30 and as viewed by a 160×120 photosensor array 32. Also shown are a driver or left seat 101, a front passenger or right seat 102, a rear window area 103a, a right side window area 103b and a left side window area 103c. The 160×40 photosensor array 32, however, only sees a portion or segment of the vehicle interior 100, as is shown in FIGS. 3A and 3B. In a dedicated automatic rearview mirror system, the 160×40 sized array is generally preferred since it provides sufficient image information for providing effective automatic rearview mirror control and because it reduces the cost of the photosensor array 32. If the photosensor array 32 is also used to monitor the vehicle interior 100 (or for other applications) as is described herein, then the larger 160×120 array size may be used to view the vehicle interior 100 as is generally illustrated in FIG. 2A.

Finally, it should be understood that the spatial resolution of the photosensor array 32 may also be increased. This may be done by making the photosensor elements 32a smaller so as to increase the number of photosensor elements 32a in a photosensor array 32 having the same physical dimensions. Additionally, spatial resolution may be increased by varying the lens 30 to decrease the included angle of the image cone so that the photosensor array 32 views a smaller portion of an image on the vehicle interior 100.

In summary, the array size of the photosensor array 32 and the number and physical dimensions of the size of the photosensor elements 32a and the lens design or geometry of lens 30 may all be varied to optimize the effective field of view of the photosensor array 32 depending on the application.

As is discussed later, an exposure time or exposure period EP of the photosensor array 32 may be varied over some range depending on the light level. Thus, the value of EP is increased for decreasing light levels and approaches a maximum for low light levels, and it is decreased for increasing light levels and approaches a minimum for high light levels. For a given value $EP_V$ of the exposure period, there is a light level $LL_{MIN}$ that is sufficiently distinct from low signal noise in the photosensor element signal L(n,m) of each photosensor element E(n,m) so that it may be accurately sensed, and there is also a light level $LL_{MAX}$ for which the photosensor element signal L(n,m) of each photosensor element E(n,m) is a maximum. The ratio of $LL_{MAX}/LL_{MIN}$ at $EP_V$ may be used to represent a dynamic range of DR(n,m) in decibel (dB) units of each photosensor element E(n,m), where $DR(dB)=10 \ LOG(LL_{MAX}/LL_{MIN})$. The image data is preferably optimized such that it is approximately centered within the dynamic range DR(N,M) of the photosensor array 32. This may be done by determining an array response AR of RA(N,M), which is described later, where the minimum and maximum digital values of AR correspond to the minimum and maximum digital values possible for Val RA(n,m) (e.g., 0 and 255 for 8-bit data resolution). The exposure period is varied or adjusted until AR approaches the center or mid-point of the possible data value range (e.g., 127 for 8-bit data resolution).

Since there is a minimum photosensor element signal that may be accurately measured, a supplemental source of illumination may be desirable or necessary to enhance the effective sensing capabilities of the photosensor array 32 by providing supplemental source illumination SSI. Although the photosensor array 32 is able to monitor the vehicle interior 100 over a range of background lighting levels from about 0.1 lux (a dark garage) to about 30–60K lux (a bright, sunny day), using either visible or near infrared SSI to illuminate the vehicle interior 100 generally (or specific areas therein) significantly enhances the effectiveness or performance of the photosensor array 32 in various applications. Also, SSI is preferably provided only during the exposure period EP of the photosensor array 32 rather than continuously. Pulsed SSI reduces power consumption, extends the life of the supplemental source of illumination and provides generally higher instantaneous illumination than may be provided by continuous illumination. Also, pulsed infrared SSI is generally more difficult to detect by infrared illumination sensing apparatus that may be used by potential intruders.

For the specific vehicle interior monitoring system applications described herein, near infrared illumination between about 700 and 1200 nm is preferred because: (1) it is visible to the photosensor array 32 but not to the human eye (see FIGS. 11A and 11B); and (2) it does not affect adaption of the human eye. There are a number of readily available near infrared illumination sources, including solid-state sources such as light emitting diodes (LEDs) and lasers, flash lamps such as xenon or krypton lamps, incandescent lamps such as tungsten lamps, as well as many others. Preferred, however, are gallium arsenide (GaAs) or gallium aluminum arsenide (GaAlAs) LEDs because they provide a relatively narrow band (about 750 to 950 nm) of near infrared illumination (see FIGS. 11A and 11B). Such illumination sources are also typically packaged with a lens to distribute the illumination. Depending on the particular application, the illumination distribution characteristics of readily available lens/source packages may range from narrow so as to provide spot or collimated illumination to very diffuse so as to cover about 160°. In the vehicle interior monitoring system described herein, the lens/source package preferably provides illumination coverage on the order of about 100°.

Other illumination sources providing broad-band illumination (ultraviolet through infrared) may also be used, but it may be desirable or necessary to filter such broad-band illumination using absorption or interference type filters, or any other appropriate filter. In particular, an interference filter known as a long-wave pass filter or cold mirror reflects visible light, transmits infrared illumination and looks like the normal silvered mirrors typically used in the rearview mirror 1. Unlike cold mirrors, however, silvered mirrors reflect near infrared illumination. Since the cold mirror resembles the silvered mirror in the rearview mirror 1, it may be used to replace a section or even all of the silvered mirror. In particular, the supplemental source of illumination may be located behind the cold mirror element and adjacent to the photosensor array 32 with an opaque barrier separating the two to prevent supplemental illumination reflections within the rearview mirror 1 from directly affecting the photosensor array 32.

Alternatively, a long-wave pass absorption filter may be used with a supplemental source of broad-band infrared illumination. Long-wave pass absorption filters may be fabricated using a wide variety of polymers having appropriate optical transmission characteristics such as epoxies, acrylics, polycarbonates, as well as a variety of glasses. The acrylic and polycarbonate polymers are preferred because they are environmentally stable, cost effective and because they may be used to injection mold parts having various geometric shapes or polished or textured surfaces. Using absorption filter materials, the photosensor array 32 and supplemental source of illumination may be integrated into the rearview mirror 1 or elsewhere within or on the vehicle so that they are not readily apparent to vehicle occupants, passers-by or potential intruders.

III. The Logic and Control Circuit

FIG. 6 shows the light sensing and logic circuit 26 comprising the photosensor array 32 and the logic and control circuit 34. The logic and control circuit 34 comprises a logic circuit 46, a clock 47, a random-access-memory (RAM) 50, or other appropriate memory, and a digital-to-analog converter 52. The logic circuit 46 is preferably a dedicated configuration of digital logic elements constructed on the same semiconductor substrate as the photosensor array 32. Alternatively, the logic circuit 46 may also be a microprocessor comprising a central processing unit (CPU) and a read-only-memory (ROM). The logic circuit 46 may also be implemented using gate array technology or any other appropriate hardwired logic circuit technology.

The logic circuit 46 interfaces with the clock 47, provides array control signals to the photosensor array 32, manages data flow to and from the RAM 50 and converters 44 and 52, and performs all computations for determining a digital mirror control signal $V_{DAC}(Z)$ for causing the variable reflectance mirror element 1a to assume a desired reflectance level. As discussed, the analog-to-digital converter 44 converts the analog photosensor element signals to the digital photosensor element signals processed by the logic circuit 46. It has been found that an eight-bit analog-to-digital converter 44 provides adequate data resolution for controlling the mirrors 1, 4 and 5. Preferably, the analog-to-digital converter 44 is constructed on the same semiconductor substrate as the photosensor array 32 as shown in FIG. 5.

The digital photosensor element signals output to the logic and control circuit 34 are generally stored in the RAM 50 for processing. The values of the digital photosensor element signals for the photosensor array PA(N,M) are correspondingly stored in an array in the RAM 50 designated RA(N,M). The logic circuit 46 processes the values of each of the digital photosensor element signals, which are designated Val RA(n,m), to determine an instantaneous or substantially real-time background light signal $B_t$ for a time period t and at least one peak light signal P(z). The logic circuit 46 uses these signals, which may also be temporarily stored in the RAM 50, to determine a digital control signal $V_{DAC}(Z)$ to cause at least one mirror or mirror segment to assume a desired reflectance level. The digital mirror control signal $V_{DAC}(Z)$ is then output to the digital-to-analog converter 52, which outputs a corresponding analog mirror control signal $V_C(z)$ to a mirror drive circuit 24. Alternatively, the digital-to-analog converter 52 need not be used if the logic circuit 46 generates a pulse-width-modulated (PWM) mirror control signal to control the mirror drive circuit 24.

The mirror drive circuit 24 comprises mirror drive circuits 24a, 24b and 24c. The drive circuit 24 drives mirrors 28, which comprises a rearview mirror 28a (mirror A), a left side view mirror 28b (mirror B) and a right side view mirror 28c (mirror C). Mirrors A, B and C correspond, respectively, to the rearview mirror 1, the left side view mirror 4 and the right side view mirror 5 shown in FIG. 2. It is, of course, within the scope of the present invention for the mirror A to be a mirror other than the rearview mirror 1. It is similarly within the scope of the present invention for the mirror B to be a mirror other than the left side view mirror 4, and for the mirror C to be a mirror other than the right side view mirror 5. It is also within the scope of the invention for the mirrors A, B and C to be mirror segments or zones of the variable reflectance mirror element 1a where the peak sub-array S(X) for each zone corresponds to a segment of the variable reflectance mirror element 1a. Thus, for example, S(1) may correspond to a center mirror segment, S(2) may correspond to a left mirror segment and S(3) may correspond to a right mirror segment. Any other appropriate mirror segmentation scheme may also be used.

A sensitivity control circuit 42 is used to input a sensitivity signal S to the logic and control circuit 34. In addition, signals from a force-to-day (maximum reflectance) switch 36, a reverse-inhibit (maximum reflectance) switch 38 and a force-to-night (minimum reflectance) switch 40 may also be input to the logic and control circuit 34. The switch 3 of FIGS. 1A and 1B may include the sensitivity control circuit 42, as well as the force-to-day switch 36 and the force-to-night switch 40.

The switches 36, 38 and 40 each generate a signal causing the logic circuit 46 to override its normal operation, as will be described with respect to FIGS. 7, 8A and 8B, and to output mirror control signals $V_C(z)$ to the mirror drive circuit 24 causing the variable reflectance mirror 28 to assume a maximum or minimum reflectance level in accordance with the appropriate signals from the switches 36, 38 or 40.

Finally, the logic and control circuit 34 may also be used to control a vehicle lighting switch 45 to automatically turn on and off a vehicle's headlights and sidelights. This feature will be further described later.

Figure 6A:
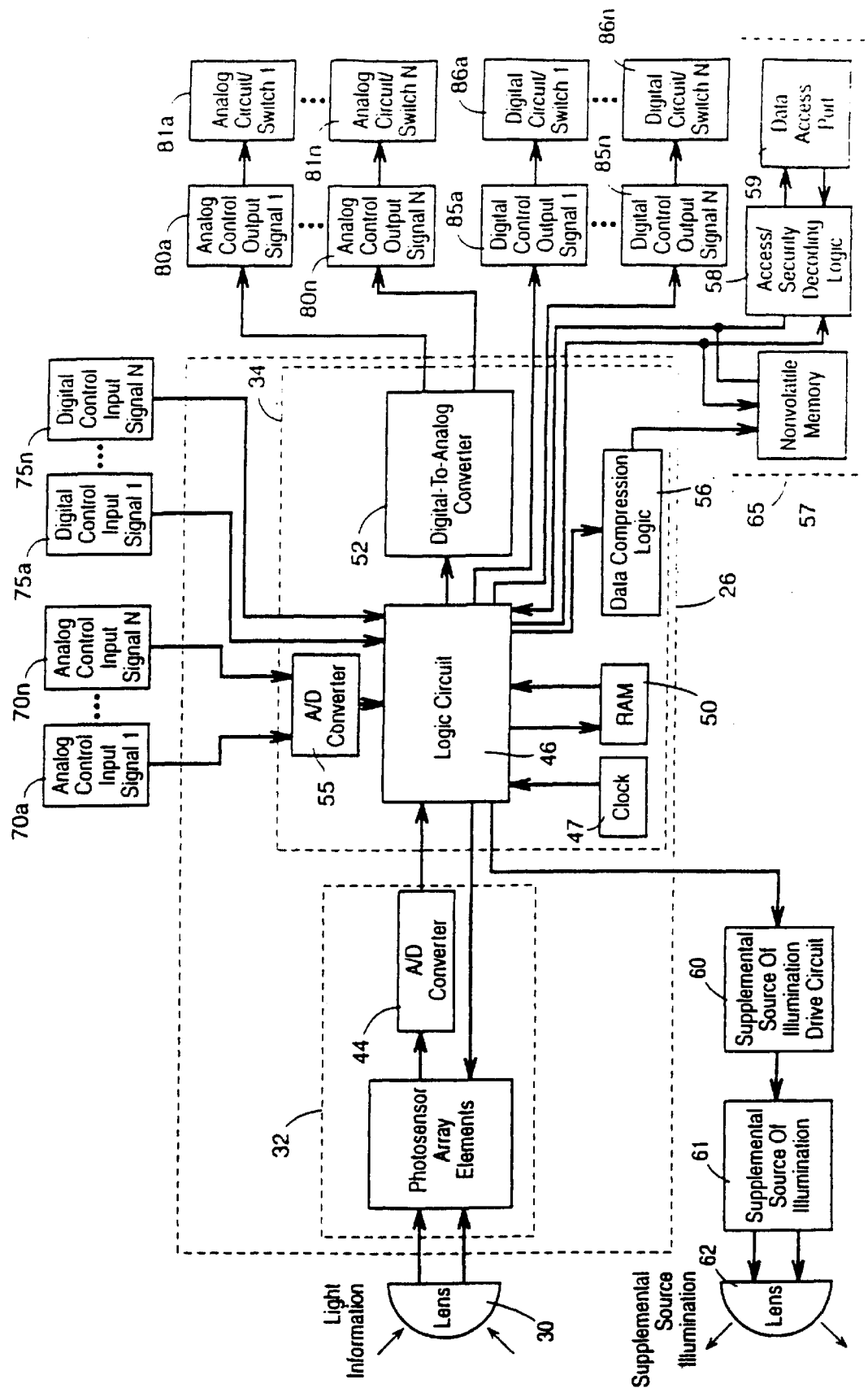
FIG. 6A is a schematic block diagram of the automatic rearview mirror and vehicle interior monitoring system.

FIG. 6A shows the block schematic diagram of the automatic rearview mirror and vehicle interior monitoring system. The previous description of FIG. 6 applies here except as follows. First, the logic and control circuit 34 includes an analog-to-digital converter 55 for converting one or more analog control input signals 70 (1, 2, ..., N; blocks 70a to 70n) to digital signals that are input to the logic circuit 46.

With respect to the automatic rearview mirror system, the analog control input signals 70 may include any analog control input signal used therein, including, for example, analog versions of the control input signals provided by the force-to-day-switch 36, reverse-inhibit-switch 38, force-to-night-switch 40 or sensitivity control circuit 42 of FIG. 6. Of course, digital versions of these same control input signals may also be input to the logic circuit 46 as digital control input signals 75 (1, 2, ..., N; blocks 75a to 75n). The analog control output signals 80 (1, 2, ..., N; blocks 80a to 80n) may include any analog control output signal used in the automatic rearview mirror system, including the analog mirror control signals $V_C(z)$. The analog circuits/switches 81 (1, 2, ..., N; blocks 81a to 81n) may include the drive mirror circuits 24 that are used to drive the variable reflectance mirrors 28. As discussed with respect to FIG. 6, the analog mirror control signal $V_C(z)$ is output to the mirror drive circuit 24 causing the variable reflectance mirror 28 to change reflectance levels. Of course, digital control output signals 85 (1, 2, ..., N; blocks 85a to 85n) may also be output to digital circuits/switches 86 (1, 2, ..., N; blocks 86a to 86n) to the extent that the control output signals are digital and not analog.

With respect to the vehicle interior monitoring system configured as a vehicle intrusion detection system, analog control input signals 70 and digital control input signals 75 may include, respectively, analog and digital versions of control input signals used to "arm" or "alert" the vehicle intrusion detection system, as will be further described later. The analog control output signals 80 may include any analog control signals output to analog circuits/switches 81 that are used in the above system, including analog circuits or switches used to actuate various vehicle hardware, such as the vehicle horn (or siren), exterior and interior lights or ignition control devices. of course, digital control output signals 85 (1, 2, ..., N; blocks 85a to 85n) may also be output to digital circuits/switches 86 (1, 2, ..., N; blocks 86a to 86n) to the extent that the control output signals are digital and not analog. In particular, the digital control output signal 85 may include a digital word provided to a digital circuit/switch 86 that is a vehicle controller system that interfaces with such vehicle hardware.

When the vehicle interior monitoring system is configured as a compartment image data storage system, a nonvolatile memory 57, as shown in FIG. 6A, is included. The nonvolatile memory 57 interfaces with the logic circuit 46. The nonvolatile memory 57 is used to store image data, as will be further described later. The nonvolatile memory 57 may be an EEPROM or other appropriate nonvolatile memory. An access/security decoding logic circuit 58 interfaces with a data access port 59 and the logic circuit 46. The access/ security decoding logic circuit 58 and data access port 59 are used to access the image data stored in the nonvolatile memory 57, as will be further described later. Optionally, this system may include a data compression logic circuit 56 for compressing image data received from the logic circuit 46 before it is stored in the nonvolatile memory 57. The data compression logic circuit 56 may be integral with the logic circuit 46.

Finally, whether configured as a vehicle intrusion detection system or as a compartment image data storage system, the vehicle interior monitoring system preferably includes a supplemental source of illumination 61 having a lens 62 as shown in FIG. 6A. A supplemental source of illumination drive circuit 60 is connected to the supplemental source of illumination 61. The drive circuit 60 also interfaces with and receives control signals from the logic circuit 46 to drive the supplemental source of illumination 61.

IV. Operation of the Invention

Figure 7:
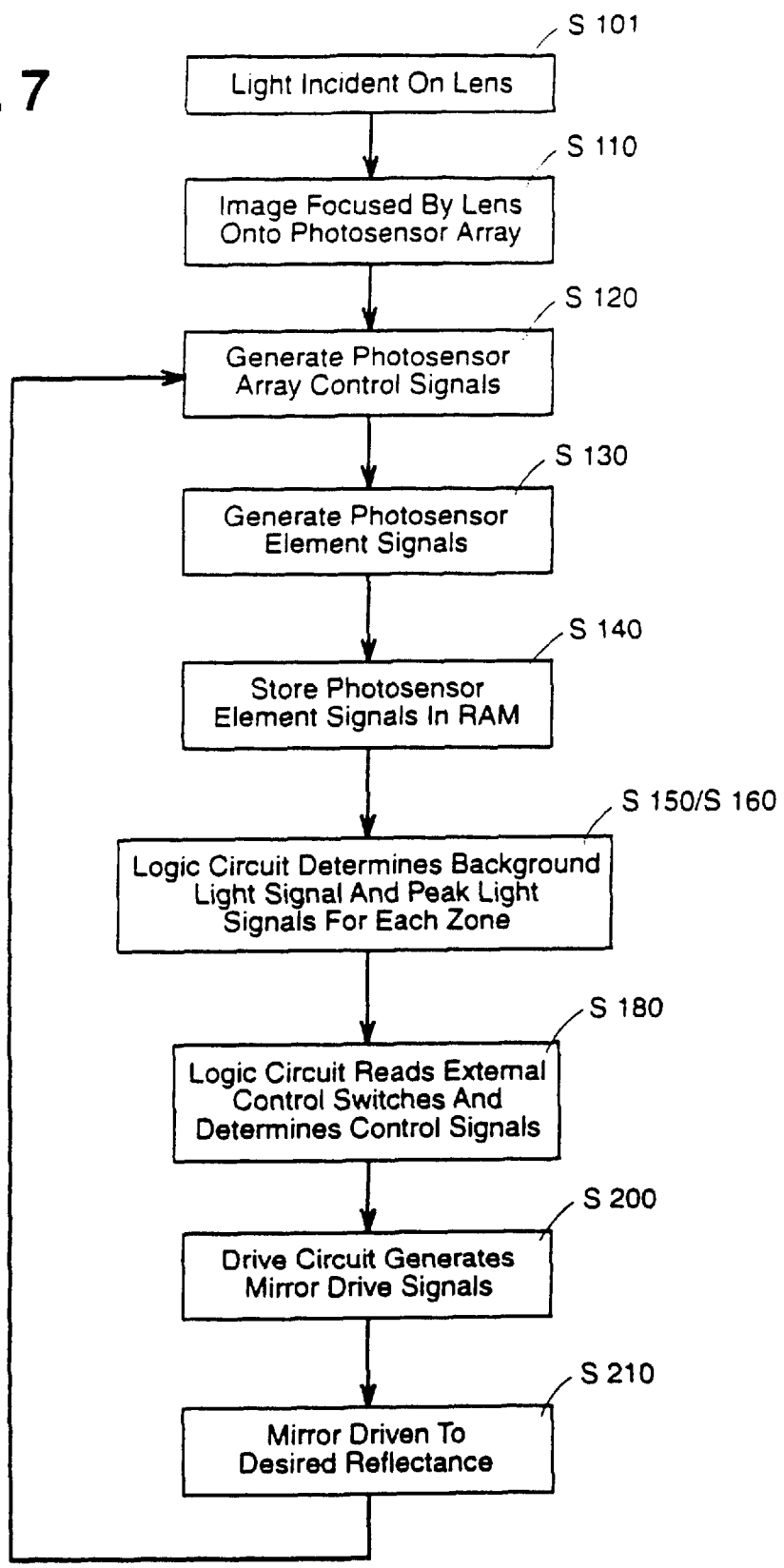
FIG. 7 is a flow chart illustrating the method of the present invention for controlling the reflectance of a rearview mirror or mirrors.

FIG. 7 shows an overview of the logic flow chart and method for controlling the reflectance levels of any one or all of the mirrors or mirror segments 28a, 28b or 28c. It should be understood that the reflectance level of each of the mirrors 28a, 28b and 28c in the automatic rearview mirror system of the present invention may be commonly or independently controlled. FIGS. 8A, 8B and 9 provide more detail on the logic and method of FIG. 7.

In step S101 of FIG. 7, light information seen rearwardly of the rearview mirror 1 is incident on the lens 30. In step S110, light passing through the lens 30 is refracted such that the light information is imaged or focused onto the photosensitive surface of the photosensor array 32. In step S120, the logic circuit 46 generates and outputs the array control signals to the photosensor array 32. In step S130, photosensor element signals indicative of the light levels incident on each of the photosensor elements 32a are generated. In step S140, these photosensor element signals are temporarily stored in RAM or any other appropriate memory. In steps S150 and S160, the logic circuit 46 determines values for the background light signal and the peak light signal for each zone corresponding to each of the mirrors 28. In step S180, the logic circuit 46 uses the background and peak light signals of step S150 to determine the control signals required to cause each of the mirrors 28 to achieve a desired reflectance level. Also, the logic and control circuit 34 in step S180 reads and processes the states of the optional sensitivity control circuit 42, force-to-day switch 36, force-to-night switch 40 and reverse-inhibit switch 38. In step S200, the mirror drive circuits 24 use the control signals determined in step S180 to generate drive signals to cause the mirrors 28 to assume the desired reflectance levels in step S210.

In one embodiment of the invention, the logic circuit 46 determines the background light signal $B_t$ in steps S150 and S160 by calculating the average value of the photosensor element signals, previously stored in RAM in step S140, for the photosensor elements 32a in a lowest row or rows of the photosensor array 32 corresponding to an area below the rear window. With respect to FIGS. 3A and 3B, this means that the background light signal $B_t$ is determined from photosensor element signals generated by the photosensor elements 32a located in row D of the photosensor matrix array 32. The logic circuit 46 may then output $B_t$ to the RAM 50 for later processing. The logic circuit 46 may also determine $B_t$ by calculating an average value of all of the photosensor element signals in the entire photosensor array 32. More generally, the background light signal $B_t$ for the rearward scene may be determined by calculating the average value of X percent of the lowest photosensor element signal values in the RAM array RA(N,M), where X is preferably 75, but typically may be in the range of 5 to 100. Alternatively, an exposure period EP, as is described herein, may be used to determine the background light signal $B_t$. An array response AR may be determined using an array average method, as is also described herein, for the photosensor element signal values corresponding to a sub-array S(X) of the photosensor elements 32a of the photosensor array 32 that correspond to an area below the rear window. The exposure period EP may be varied within an operating point range OP±R, where OP is 10 and R is 5 (8-bit data), but where OP may be from 5 to 175 and R may be from 2 to 15. The exposure period is varied to maintain AR within OP±R. The background light signal $B_t$ may therefore be determined where $B_t$ varies inversely with EP.

Additionally, the background light signal $B_t$ is preferably change-limited to determine a limited background light signal $B_{Lt}$. The signal $B_t$ may be change-limited, for example, by limiting changes in the background light signal $B_t$ to 2% per time frame. A time frame may be, for example, 250 milliseconds or any other time relating to the rate at which the logic circuit 46 samples the photosensor element signals from the photosensor array 32. The logic circuit 46 determines the change-limited value $B_{Lt}$ used to determine the digital mirror control signal $V_{DAC}(Z)$ as follows: $B_{Lt} = B_{L(t-1)} + C_L \times (B_t - B_{L(t-1)})$, where $B_{Lt}$=the change-limited background light signal for a current time frame t, $B_t$=the actual or substantially real-time background light signal for the current time frame t, $B_{L(t-1)}$=the change-limited background light signal for a previous time frame (t−1) and $C_L$=the change-limit value. Additionally, the background light signal $B_t$ from step S150 may be processed by the logic circuit 46 to determine whether the change limited background light signal $B_{Lt}$ is less than or greater than $B_{L(t-1)}$. If $B_{Lt}$ is greater than $B_{L(t-1)}$, then the logic circuit 46 may use a higher change-limit value $C_{LH}$ to determine $B_{Lt}$. If the background light signal $B_{Lt}$ is less than or equal to $B_{L(t-1)}$, then the logic circuit 46 may use a lower change-limit value $C_{LL}$ to determine $B_{Lt}$. The values $C_{LH}$ and $C_{LL}$ are in the range of 0.01 to 2, but are preferably on the order of about 0.02 or 2%.

The logic circuit 46 in step S150 also determines the peak light signal P(z) for each zone or sub-array S(X) of the photosensor matrix array 32. The peak light signal P(z) used to determine the appropriate mirror control signal $V_C(z)$ for the mirror 28 may be determined by counting or summing the number of occurrences where the digital value for a photosensor element signal is greater than a peak threshold value F for each zone or sub-array S(X). For the preferred analog-to-digital converter having eight-bit data resolution, the logic circuit 46 generates digital values indicative of light levels of light incident on each photosensor element 32a in the range of 0 to 255 ($2^8-1=255$), with headlights resulting in values in the range of about 200 to 255, so that the peak threshold value F is selected to be in the range of about 200 to 255 but is preferably 245. The resulting count or sum P(z) provides a measure of the peak light level for the following reasons.

One design objective of the lens 30 and the photosensor array 32 combination is to be able to measure background light levels in the approximate range of 0.01 to 0.1 lux when driving on sufficiently dark roads. This is achieved by ensuring that the lens 30, photosensor elements 32a and charge-to-voltage amplifiers 33c are able to measure such light levels and by providing a maximum exposure time. The maximum exposure time determines the operating frequency or sampling rate of the system 20. In the case of the described system, 1.5 MHz has been found to be appropriate.

By varying the exposure time relative to a general background light level B and using a substantially constant sampling rate, a wide range of background light levels in the range of 0.01 to 1000 lux can be measured. Thus, when the background light level is low, the exposure time is relatively long such that headlights within the rearward area cause the affected photosensor elements 32a to saturate. Correspondingly, for higher background light levels, the exposure time is reduced. Saturation occurs when the incident light charges the photosensor element 32a to capacity so that any excess charge will leak or transfer to adjacent photosensor elements 32a. This charge leakage effect is commonly referred to as "blooming." It has been found that a count of the number of photosensor elements 32a at or near saturation, i.e., those having digital values greater than the peak threshold value F, provides an excellent approximation of the peak light levels and is further described in FIG. 8A. The above described method effectively extends the range of measurable light levels for the photosensor array 32.

As discussed, photosensor element signals are indicative of the incident light level or intensity and the time period for which they are exposed to such light. By operating the photosensor array 32 for a known exposure time or exposure period EP, the incident light intensity may be determined from the photosensor element signal generated by each photosensor element 32a. After the exposure period, the logic and control circuit 34 processes all of the photosensor element signals for each photosensor element 32a of the photosensor array 32. This signal processing at least includes the process of storing the digital value of each photosensor element signal to obtain RA(N,M), but normally includes all other processing for each image data set RA(N,M) up to and including the generation of output control signals, such as the mirror control signal $V_C(Z)$. The time from the beginning of the exposure period EP through the processing of each image data set RA(N,M) and the generation of the appropriate output control signals is referred to as the operating or sampling period, and the frequency thereof is referred to as the operating frequency or sampling rate. The frequency at which the process is repeated may also be referred to as the frame rate or the image sampling frequency. The rate of each sub-process (e.g., exposure period) within the sampling period is controlled by the system clock 47. Thus, the frame rate or image sampling frequency is essentially fixed for a particular system clock frequency. The total period corresponds to a maximum exposure period EP and the total processing time relating to an image data set RA(N,M). The system clock frequency may be adjusted to scale the image sampling frequency, thereby adjusting EP. In summary, the maximum exposure period, the operating or sampling period, the signal processing time and the frequency of the system clock 47 should be considered in each application.

Alternatively, if an anti-blooming device is incorporated in the photosensor array 32, such as is well known to those skilled in the art, then the peak light signal P(z) may be determined by calculating an average value of Y percent of the highest photosensor element signal values for each zone, where Y is preferably 10, but may be in the range of 1 to 25. When using this approach for determining P(z), it is also preferable to include logic to adjust the sampling rate or operating frequency of the logic circuit 46 to an appropriate value depending on $B_{Lt}$.

The general background light signal B, whether $B_t$ or $B_{Lt}$, and the peak light signal P(z) for each zone of the photosensor array 32, as determined in steps S150 and S160, are then used by the logic circuit 46 to determine a mirror control signal $V_C(z)$ as a function of the ratio of $B^n$ (n preferably has a value of one but may typically range from 0.8 to 1.3) to P(z), i.e., $V_C(z)=f(B^n/P(z))$. The control signal $V_C(z)$ is then output to the mirror drive circuits 24 in step S180 to drive the mirrors 28 or segments thereof to their desired reflectance level in the steps S200 and S210.

FIG. 12 shows the logic flow chart and method for the vehicle interior monitoring system or mode.

In step S301, the logic circuit 46 initializes the system, sets EP to its maximum and if used, SSI to a predetermined minimum, such as zero. Next in step S310, the logic circuit 46 reads any analog control input signals 70 (70a to 70n of FIG. 6A) and/or digital control input signals 75 (75a to 75n of FIG. 6A) that may be used in the vehicle interior monitoring mode.

In step S315, the photosensor element signals are enerated, processed and stored in RAM 50 by the logic circuit 46 (see steps S101 to S140 of FIG. 7). The logic circuit 46 also applies the lens correction factor LC(n,m) to each digital value Val RA(n,m) indicative of the photosensor element signal L(n,m) of each photosensor element 32a in the RAM array RA(N,M) to correct for the effect of lens 30. This results in RA(N,M) containing the lens corrected digital value Val $RA_{LC}(n,m)$ indicative of the photosensor element signal of each photosensor element 32a.

Next, in step S320, the logic circuit 46 determines the array response AR, which is indicative of either RA(N,M) (an entire image data frame or set $RA_{(t)}$ at time t) or of a selected sub-array or sub-set thereof $RS(N_S,M_S)$ (a partial image data frame or set $RS_{(t)}$ at time t), where $N_S$ and $M_S$ are the row and column dimensions corresponding to a selected sub-array S(X) of the photosensor array 32. The logic circuit 46 processes the image data frame $RA_{(t)}$ using one of the methods described below to determine the array response AR. An appropriate operating point range OP±R is associated with each AR calculation method.

The preferred method for determining AR is the array average method, in which the logic circuit 46 determines AR by averaging all of the data values Val $RA_{LC}(n,m)$ in the image data frame $RA_{(t)}$ (or selected sub-array $RS_{(t)}$ where:

$$AR = \frac{1}{N \cdot M} \sum_n \sum_m Val\,RA_{LC}(n, m),$$

for n=1 to N, m=1 to M. Using the array average method, it has been found that appropriate OP and R values are 127 and 20 (8-bit data resolution), respectively; however, the operating point range may be non-symmetrical for some tasks by using non-symmetrical R values, such as +20 and −10.

An alternative method is the "no saturation" method, in which EP is set to its highest level at which there is no saturation or blooming in any photosensor element 32a. In this case, the logic circuit 46 reduces EP until the peak value of $RA_{(t)}$ or $RS_{(t)}$ is within the operating point range OP±R. It has been found that appropriate OP and R values are 249 and 5, respectively. Still another method involves maximizing the useful image area, in which the logic circuit 46 determines AR by determining the difference between the number of photosensor elements 32a having digital values of 0 and the number having digital values of 255 (8-bit data resolution). In this case, appropriate OP and R values are 0 and 5% of the number of photosensor elements 32a corresponding to the image data set $RA_{(t)}$ or sub-array $RS_{(t)}$. It should be understood that the specific values, such as 127 and 255, are based on 8-bit data resolution and would be appropriately scaled for other data resolutions.

In step S330 and S360, it is determined whether AR is in the operating point range OP±R. If AR is outside the range, then the image data frame is either too bright (AR>OP+R) or too dim (AR<OP−R) and EP and SSI are incrementally increased or decreased according to steps S340, S341, S342 or S350, S351, S352. This is repeated for every image data frame $RA_{(t)}$. The system thus optimizes EP and SSI for the particular circumstances at system startup, and thereafter continues to adjust EP and SSI to maintain AR within the operating point range OP±R as lighting conditions change.

Figure 12A:
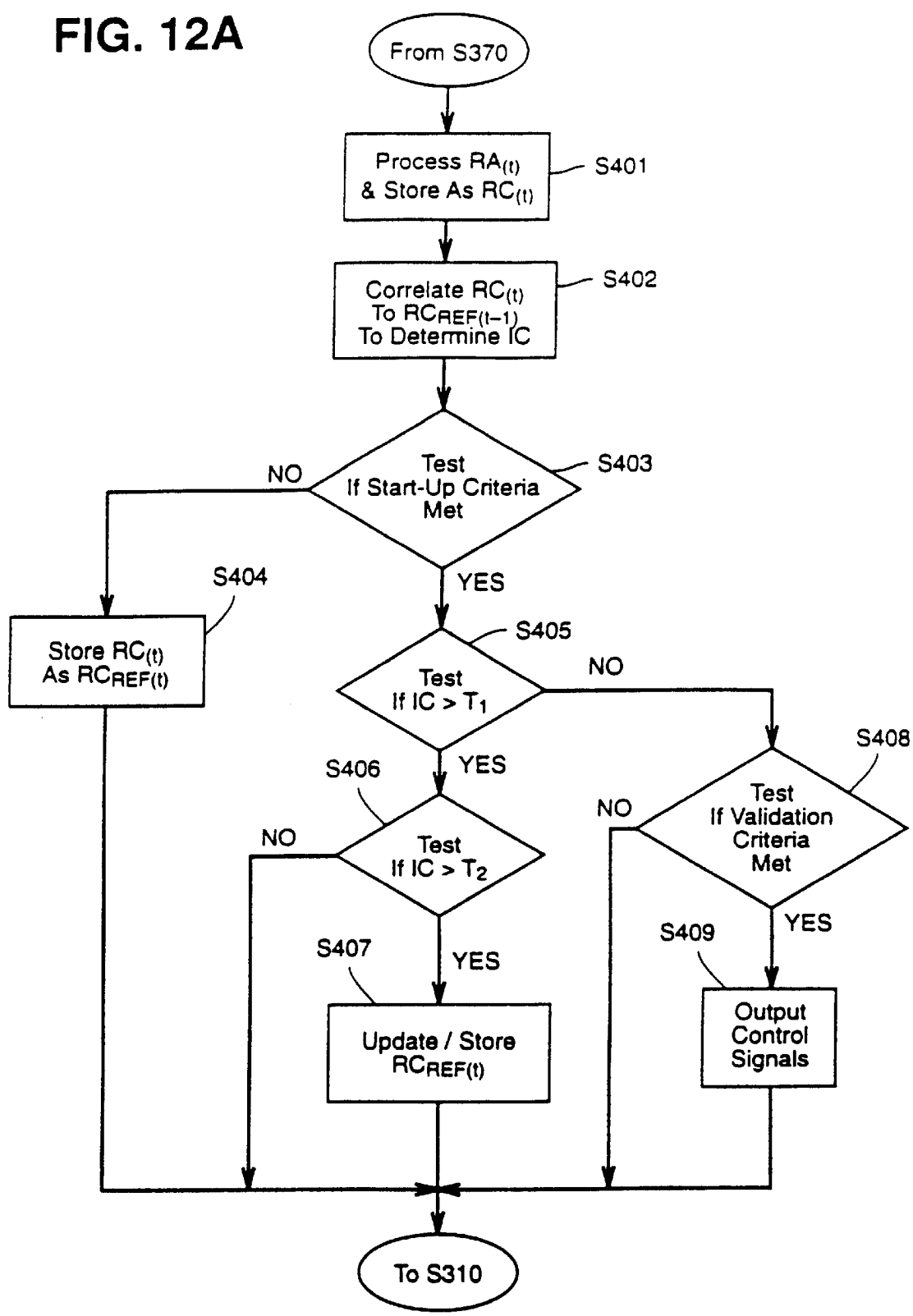
FIG. 12A is a flow chart illustrating the method of the present invention for a vehicle intrusion detection system configuration of the vehicle interior monitoring system of FIG. 12.
Figure 12B:
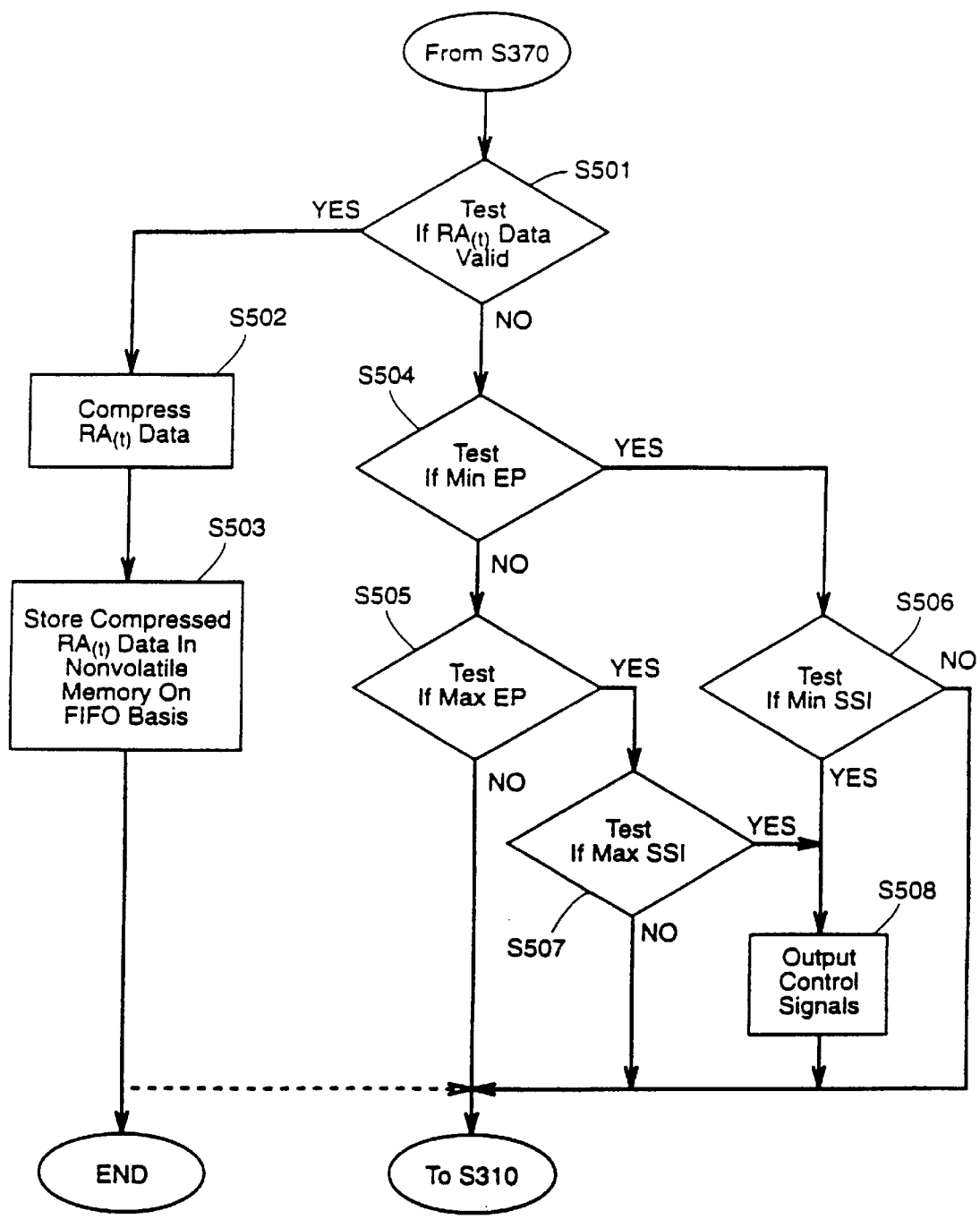
FIG. 12B is a flow chart illustrating the method of the present invention for the compartment image data storage system configuration of the vehicle interior monitoring system of FIG. 12.

If AR is within the operating point range OP±R, then the vehicle interior monitoring system/mode enters a primary task routine or mode in step S370, such as the vehicle intrusion detection system/mode (S400) of FIG. 12A or the compartment image data storage system/mode (S500) of FIG. 12B. After completing the primary task routine, the program returns to the vehicle interior monitoring mode to generate and store another image data frame $RA_{(t)}$.

V. The Preferred Embodiments

The general lighting conditions of the rearward scene can be defined as follows: the background light level of the viewed rearward scene is B and the peak light level for each zone or sub-array S(X) is P(z). A contrast ratio C(z) may be defined as the ratio of the peak light level P(z) for each zone to the general background light level B; thus, C(z)=P(z)/B. Given the background light level B, the human eye can tolerate varying peak light levels in the viewed rearward scene up to a particular contrast ratio tolerance $C_T$. Contrast ratios greater than $C_T$ initially cause discomfort and are generally known as glare. As the eye adjusts its light sensitivity to protect itself from the discomforting peak or glare light levels, vision is reduced and the glare may become disabling. Thus, the maximum tolerable peak light level $P_T$ of the viewed rearward scene is equal to the product of the contrast ratio tolerance $C_T$ and the background light level B, i.e., $P_T = C_T \times B$.

The desired reflectance $R_d(z)$ of a variable reflectance mirror for each zone is that reflectance level which reduces a peak light level P(z) to a value equal to the maximum tolerable peak light level $P_T$, i.e., $P_T = R_d(z) \times P(z)$ or $R_d(z) = P_T/P(z)$, and substituting the expression for $P_T$, $R_d(z) = (C_T \times B)/P(z)$. However, the maximum tolerable contrast ratio $C_T$ varies across the population due to aging and other factors; accordingly, a sensitivity factor S may be used to account for this variation in contrast tolerance sensitivity so that $R_d(z) = (S \times C_T \times B)/P(z)$. Selecting the desired reflectance $R_d(z)$ for each zone provides maximum information from the rearward scene viewed in each mirror or mirror segment while reducing discomforting or disabling peak light levels to tolerable levels.

The mirror control signal $V_C(z)$ required to obtain the desired reflectance $R_d(z)$ depends on the particular variable reflectance mirror element that is used. For electrochromic mirrors, a voltage-reflectance relationship can be approximated and generally defined. In general, an electrochromic mirror has a reflectance level R having a maximum value of $R_1$ with an applied voltage $V_{app}$ of 0 volts. As the applied voltage $V_{app}$ is increased, the reflectance level R perceptually remains on the order of $R_1$ until $V_{app}$ reaches a value of approximately $V_1$. As $V_{app}$ is further increased, the reflectance level R decreases approximately linearly until a minimum reflectance of approximately $R_2$ is reached at a voltage $V_2$. Thus, the applied voltage $V_{app}$ can be approximately defined as:

$$V_{app} = V_1 + (R_1 - R) \times (V_2 - V_1)/(R_1 - R_2)$$

Substituting desired reflectance $R_d(z)$ for the reflectance R results in the mirror control signal, the voltage of which is determined as follows:

$$V_C(z) = V_1 + (R_1 - S \times C_T \times B/P(z)) \times (V_2 - V_1)/(R_1 - R_2).$$

To obtain a digital value $V_{DAC}(z)$, $V_C(z)$ is scaled by a factor that is the ratio of the maximum digital value to the value $V_2$; thus, for eight-bit data resolution $V_{DAC}(z) = 255 \, V_C(z)/V_2$, and substituting for $V_c(Z)$:

i $V_{DAC}(z) = 255(V_1 + (R_1 - S \times C_T \times B/P(z)) \times (V_2 - V_1)/(R_1 - R_2))/V_2$.

Figure 8A:
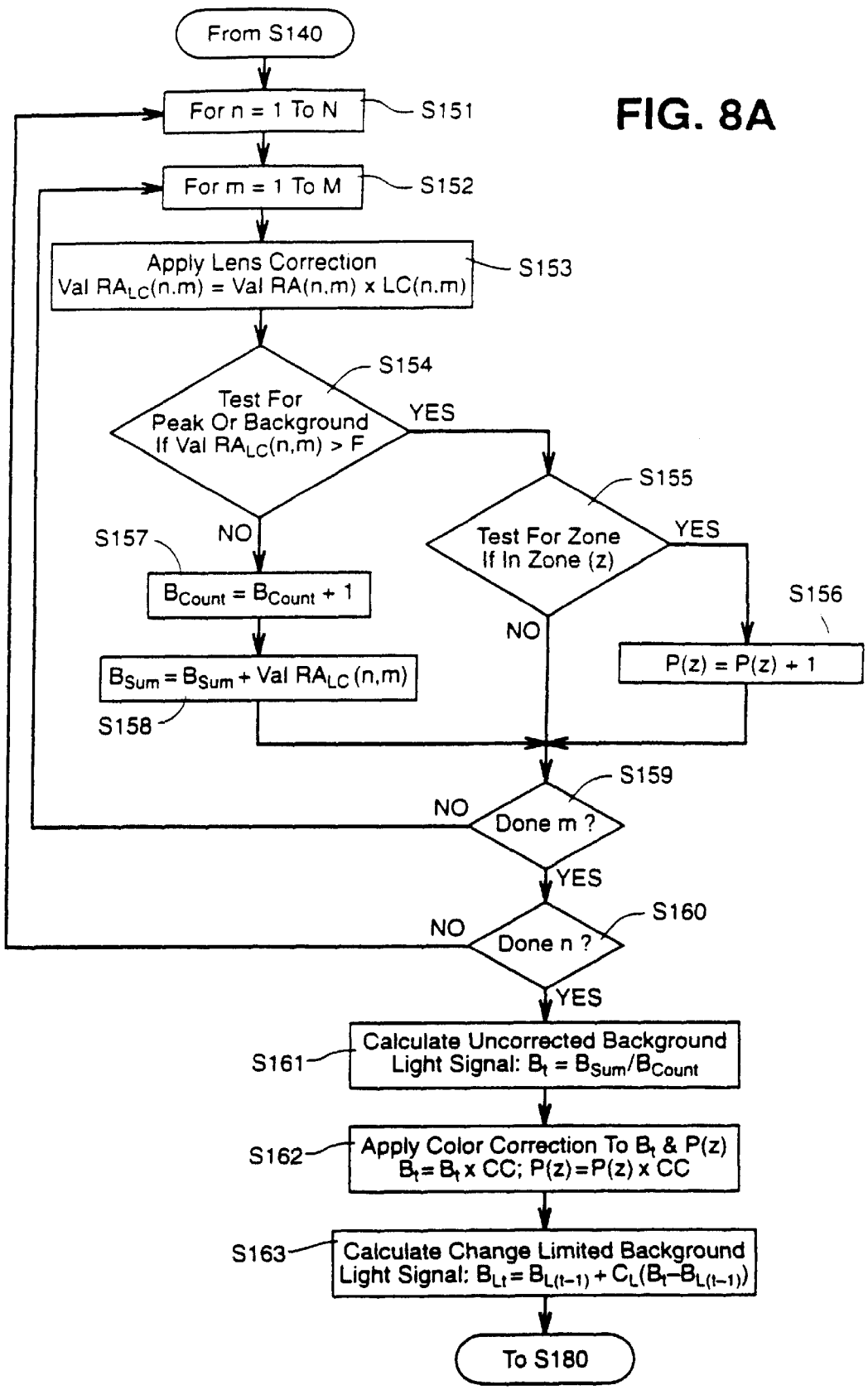
FIGS. 8A and 8B are detailed flow charts for steps S150, S160 and S180 of FIG. 7.
Figure 9:
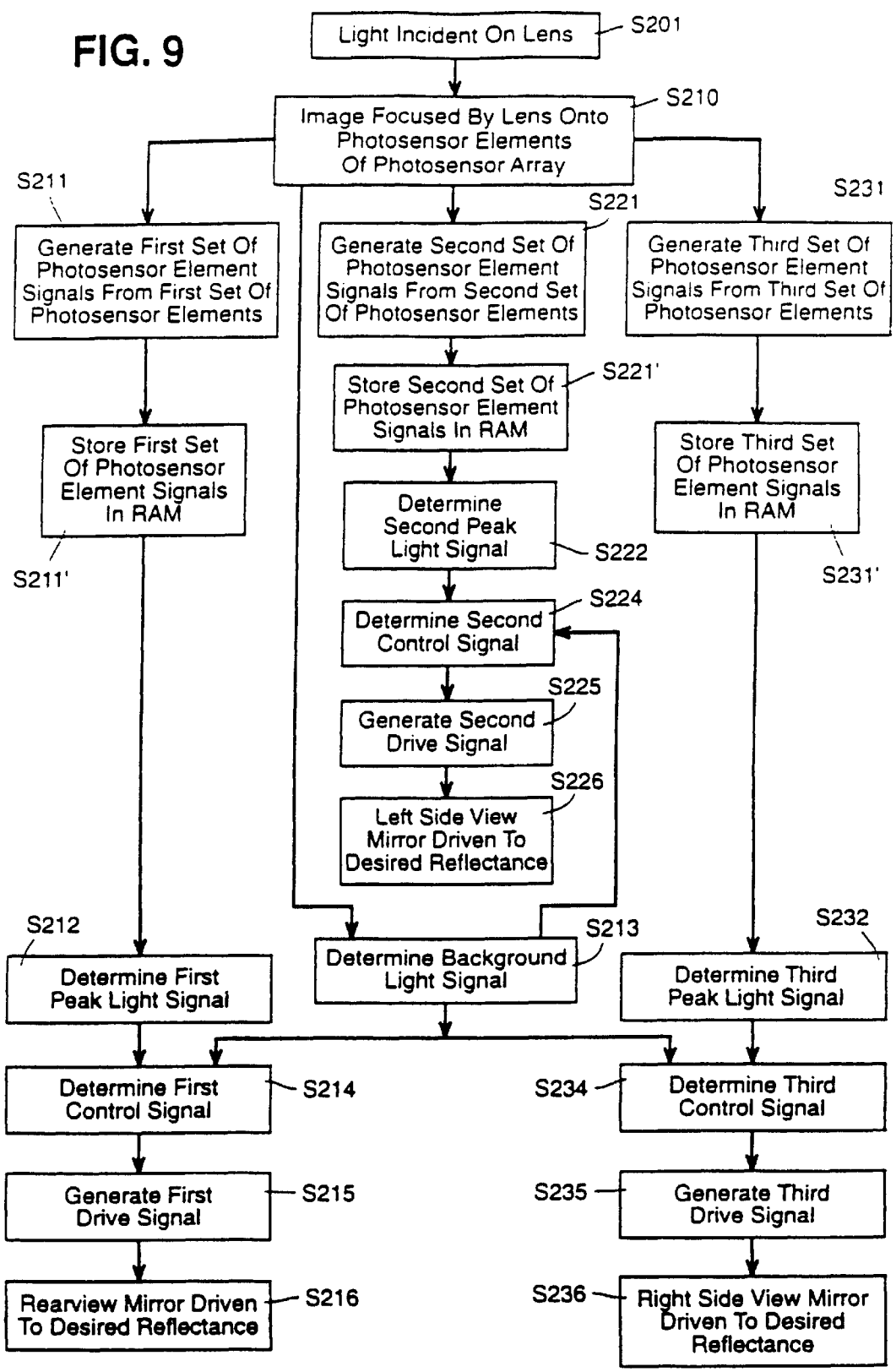
FIG. 9 is a flow chart of the general logic flow of FIGS. 7, 8A and 8B for controlling the reflectance of three mirrors.

FIG. 8A provides further detail on the steps S150 and S160 where the logic circuit 46 determines the background and peak light signals. More particularly, steps S151, S152, S159 and S160 provide two processing loops for sequentially determining the digital values indicative of the photosensor element signals, Val RA(n,m), in the RAM array RA(N,M) for each of the photosensor elements 32a of the photosensor array PA(N,M).

In step S153, a lens correction factor LC(n,m) is applied to each digital value indicative of the photosensor element signal, Val RA(n,m), to correct for the effects of lens 30, which results in a lens corrected digital value of the photosensor element signal Val $RA_{LC}(n,m)$. These effects are typically referred to as cosine effects or Lambert's Law effects. The lens correction factor LC(n,m) depends on the radial distance of the photosensor element 32a from a central axis of the lens 30, and is typically in the range of 1 to 15 but will depend on the geometry of the lens and the selected photosensor array. The lens correction factor LC(n, m) applied to each Val RA(n,m) may be calculated according to Lambert's Law each time Val RA(n,m) is processed. More preferably, the logic circuit 46 initially stores an array of values LC(n,m) in the RAM 50 for each photosensor element 32a of the photosensor array PA(n,m) during an initialization routine. Alternatively, the size of the photosensor elements 32a of the photosensor array 32 may be adjusted to correct for the lens effects at each photosensor element 32a.

As discussed, it has been found that light levels for headlights generally result in an eight-bit digital value greater than a peak threshold value F having a value of about 245. correspondingly, during non-daylight operation of the automatic rearview mirror system 20, background light levels generally result in eight-bit digital values indicative of the light levels incident on the photosensor elements 32a that are less than or equal to the peak threshold value F.

Accordingly, the lens corrected value Val $RA_{LC}(n,m)$ is compared in step S154 to the peak threshold value F. If Val $RA_{LC}(n,m)$ is less than or equal to F it is used to increment a counter $B_{Count}$, in the logic circuit 46, by 1 in step S157 (thereby indicating that a value less than or equal to F has been identified) and by increasing a value $B_{Sum}$ by the value of Val $RA_{LC}(n,m)$ in step S158, where $B_{Sum}$ is the sum of all the values of Val $RA_{LC}(n,m)$ which are less than or equal to F. The background light signal $B_t$ is then determined in step S161 as follows: $B_t = B_{Sum}/B_{Count}$. If Val $RA_{LC}(n,m)$ is greater than F in step S154, then the logic circuit 46 uses a counter P(z) indicative of the peak light levels for each of the zones or sub-arrays S(X) of the photosensor array PA(N,M), which is incremented by 1 as previously described. More particularly, Val $RA_{LC}(n,m)$ is tested in step S155 to determine whether it originates from a particular zone or sub-array S(X), where X=1 to Z. If Val $RA_{LC}(n,m)$ does not fall within a defined zone or sub-array S(X), then P(z) is not incremented; otherwise, P(z) is incremented in step S156 for the appropriate zone.

If the photosensor array 32 is arranged to view the rearward area through the active layer of the variable reflectance element 1a, then a color correction factor CC is applied in step S162 to $B_t$ and P(z) to compensate for any reduction in transmittance when the reflectance level (and transmittance) of the rearview mirror 1 is reduced. The value of CC is determined from the last calculated value indicative of the digital mirror control signal $V_{DAC}(z)$ applied to the rearview mirror 1. In step S163, a change-limited background light signal $B_{Lt}$ is determined as has been described previously.

Figure 8B:
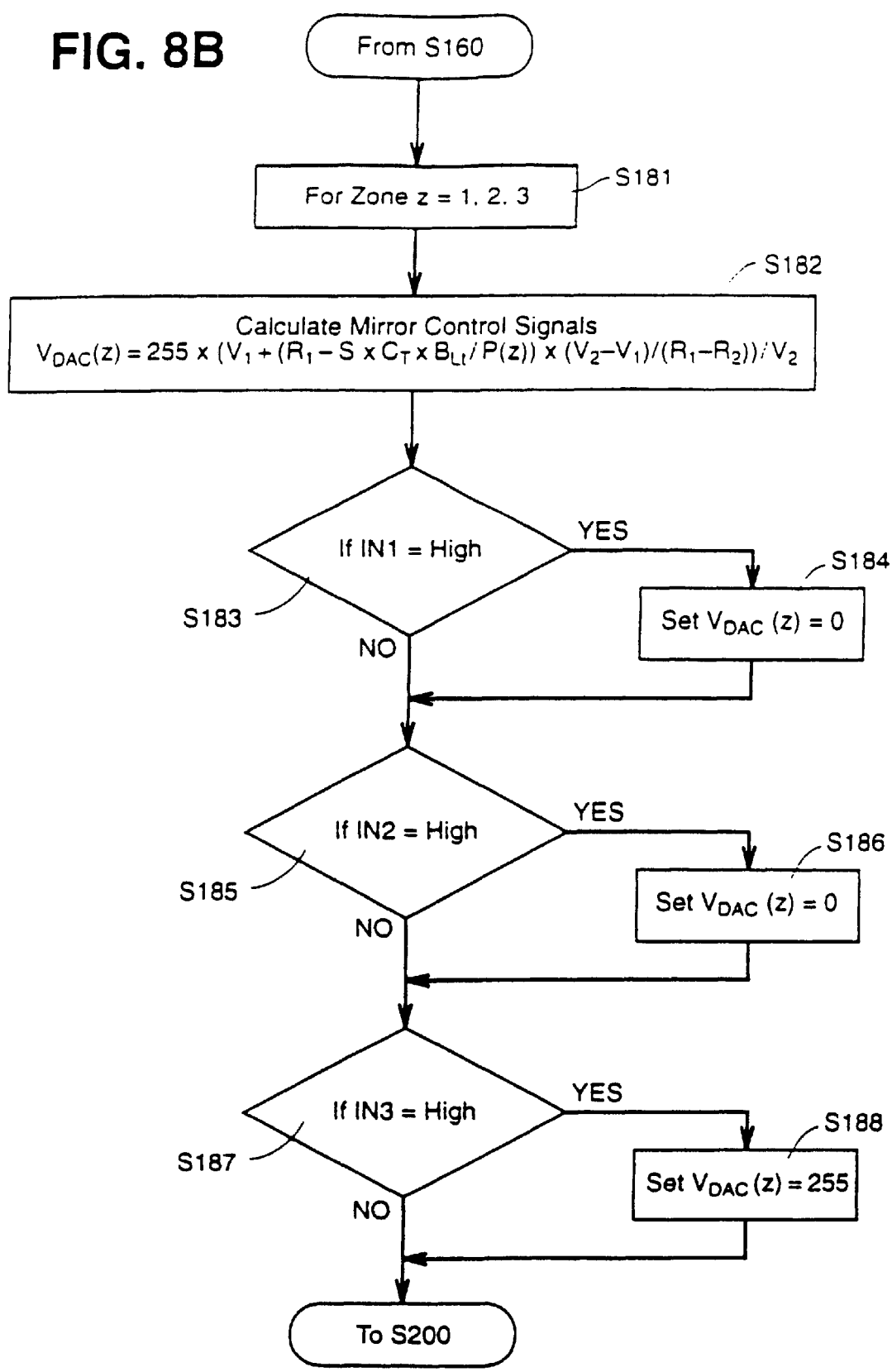

FIG. 8B provides further detail on step S180 where the logic circuit 46 determines the appropriate digital mirror control signal $V_{DAC}(z)$ for each zone or sub-array S(X) and corresponding mirror 28. In steps S181 and S182, $V_{DAC}(z)$ is calculated for each mirror 28. In step S183, the logic circuit 46 reads a state IN1 of the reverse-inhibit switch 38 and if the vehicle is in reverse gear so that IN1 is high, then all digital mirror control signals $V_{DAC}(z)$ are set to 0 in step S184 forcing the mirror 28 to its maximum reflectance level. In step S185, a state IN2 of the force-to-day switch 36 is read and if IN2 is high, then all digital mirror control signals $V_{DAC}(z)$ are set to 0 in step 186 forcing the mirror 28 to its maximum reflectance level. Finally, in step S187, a state IN3 of the force-to-night switch 40 is read and if IN3 is high, then all digital mirror control signals $V_{DAC}(z)$ are set to 255 (the maximum digital value for eight-bit data resolution) in step S188 forcing the mirror 28 to its minimum reflectance level.

FIG. 9 shows another view of the logic flow whereby the rearview mirror, the left side view mirror and the right side view mirror (or alternatively three mirror segments) are independently driven to their desired reflectance levels by the independent and separate control and drive signals using photosensor element signals from three photosensor element sets (i.e., the sub-arrays S(1), S(2) and S(3) of photosensor elements 32a in the photosensor array PA(n,m)). The specific subroutines shown in FIGS. 8A and 8B corresponding to the general steps shown in FIG. 7 are also used with the general steps shown in FIG. 9.

In step S201, light incident on the lens 30 is focused in step S210 onto the photosensor array 32 comprising the first, second and third sets of photosensor elements 32a in zones a, b and c, respectively. Next, in step S211, the light incident on the first photosensor element set in zone a generates a first set of photosensor element signals, which, in step S211', are then stored in RAM and later used by the logic circuit 46 to determine a first peak light signal in step S212.

In step S221, the light incident on the second photosensor element set in zone b generates a second set of photosensor element signals, while in step S231, the light incident on the third photosensor element set in zone c generates a third set of photosensor element signals. The second set of photosensor element signals, generated in step S221 are also stored in step 221' in RAM and then used by the logic circuit 46 to determine a second peak light signal in step S222. Similarly, the third set of photosensor element signals, generated in step S231, is next stored in step S231' in RAM and then used by the logic circuit 46 to determine a third peak light signal in step S232.

In step S213, photosensor element signals generated from selected photosensor elements on which light is incident in step S210 are used to determine the background light signal.

In step S214, the logic circuit 46 uses the background light signal determined in step S213 and the first peak light signal determined in step S212 to determine a first control signal. Similarly, the logic circuit 46 uses the background light signal of step S213 and the second peak light signal determined in step S222 to determine a second control signal in step S224. In the same manner, the background light signal of step S213 and the third peak light signal of step S232 are used by the logic circuit 46 to determine a third control signal in step S234.

The first control signal determined in step S214 is used by the drive circuit 24a to generate a first drive signal in step S215. This first drive signal drives the rearview mirror 28a to a desired reflectance level in step S216. Likewise, the second control signal determined by the logic circuit 46 in step S224 is used by the drive circuit 24b to generate a second drive signal in step S225, which is then used to drive the left side view mirror 28b to a desired reflectance level in step S226. Finally, the third control signal determined by the logic circuit 46 in step S234 is used by the drive circuit 24c to generate a third drive signal to drive the right side view mirror 28c to a desired reflectance level in step S236. Of course, the first, second and third control signals may also be used to control the segments of a mirror 28.

Finally, as previously discussed, one advantage of the present invention is that it is able to use a single photosensor array 32 to determine both a background light level and a peak light level for controlling the reflectance level of a mirror. This is especially advantageous where the sensor must be placed outside the interior of the vehicle to view the rearward scene. This may be required, for example, in certain truck type vehicles where only exterior side view mirrors may be used and automatic operation is desired.

Accordingly, the photosensor array 32 may be located with each side view mirror. The other electronics for the automatic rearview mirror system 20, described previously, may be located either with the photosensor array 32 in each side view mirror, inside the vehicle cab or elsewhere in or on the vehicle. A desired reflectance level for each exterior side view mirror may then be accurately determined using both the determined background light level and peak light level using only a single photosensor array 32 for each mirror.

FIGS. 12 and 12A show the logic flow charts of the vehicle interior monitoring system configured as a vehicle intrusion detection system (primary task S400).

In step S401, the current image data frame $RA_{(t)}$ is processed to enhance its contrast characteristics so that it is largely unaffected by changing light levels or shadows, etc. Preferably, the logic circuit 46 selects an appropriate sub-array $RS_{(t)}$ corresponding to the sub-array S(X) (or other appropriate set) of photosensor elements 32a of the photosensor array 32 containing the relevant image information.

As discussed, the particular area of interest or significance in the photosensor array 32 may be a sub-array S(X) of photosensor elements 32a of the photosensor array 32 (or other appropriate set not necessarily rectangular in shape, such as a trapezoid). The ability to select image data corresponding to S(X) is important because some sets of photosensor elements 32a may provide image information that is redundant, irrelevant or even damaging to a particular application and should therefore be ignored by the logic circuit 46. A significant advantage of the photosensor array 32 over other sensing technologies is its ability to provide selected image information so that the logic circuit 46 need only process $RS_{(t)}$ when, for example, the relevant sub-array S(X) and corresponding sub-array $RS_{(t)}$ contain all the image information necessary to a particular application. For example, in the automatic rearview mirror and vehicle intrusion detection system described herein, a selected sub-array S(X) of photosensor elements 32a may provide image information as shown in FIGS. 3A and 3B, which may be used by logic circuit 46 to provide information regarding the location and intensity of the headlights of following vehicles. To the extent that other areas of the photosensor array 32 do not provide such image information, they may be ignored. Likewise, since the same photosensor array 32 may be used for vehicle intrusion detection, the logic circuit 46 need only process the image information of FIG. 2A that excludes the image information of FIGS. 3A and 3B. Without this ability to select particular sets or sub-arrays, at least more intensive processing may be required to distinguish between unauthorized activity within the vehicle and irrelevant activity outside the vehicle.

After selecting the appropriate set of image data, the logic circuit 46 processes the values in $RA_{(t)}$ to enhance the contrast or robustness of that image data frame. Excluding photosensor elements 32a in the outside rows and columns of the photosensor array 32, every photosensor element E(n,m) has eight (8) adjacent photosensor elements 32a or neighbors: E(n−1,m); E(n,m−1); E(n−1,m−1); E(n+1,m); E(n,m+1); E(n+1,m−1); E(n−1,m+1); and E(n+1,m+1). Therefore, a contour value CV(n,m) for each photosensor element E(n,m) may be calculated by determining the average of the differences between the value Val $RA_{LC}$(n,m) of the photosensor element E(n,m) and the value of each neighbor. If the photosensor element value is an n-bit value, then CV(n,m) is also an n-bit value. Thus, using 8-bit data resolution, for example, if E(n,m) has a 0 value and each neighbor has a value of 255, then CV(n,m) is 255. If E(n,m) has a value of 255 and each neighbor has a 0 value, then CV(n,m) is 255. Both examples indicate a high degree of local contrast or discontinuity. On the other hand, if E(n,m) and each neighbor has a value of 127, then CV(n,m) is 0, which indicates a low degree of local contrast. Thus, the logic circuit 46 uses the above method, to determine the contrast value CV(n,m) for each value Val $RA_{LC}$(n,m) of $RA_{(t)}$ to obtain a contour enhanced image data frame $RC_{(t)}$ in which the "harder" image contours or discontinuities are emphasized or enhanced, while "softer" image contours are reduced in significance.

Next, in step S402, the logic circuit 46 correlates the current image data frame $RC_{(t)}$ and a reference image data frame $RC_{REF(t-1)}$ by comparing them to determine an image correlation factor IC. This factor is indicative of the correlation or degree of similarity (or difference) between the two image data frames independent of the particular image or photosensor array size. An IC value of 0 indicates no image similarity and an IC value of 1 indicates a perfect match. In particular, the image correlation factor IC is indicative of the number of corresponding photosensor elements 32a within the photosensor array 32 (or sub-array S(X)) having the same value Val $RA_{LC}$(n,m) within some tolerance value T for the current and reference image data frames or sets. The tolerance value T accounts for minor image variations, such as may be caused by system vibration or other system "noise". Thus, the value from the current image data frame $RC_{(t)}$ corresponding to photosensor element E(1,1) is compared with the value from the reference image data frame $RC_{REF(t-1)}$ corresponding to photosensor element E(1,1), and if:

$$Val\ RC_{(t)}(1,1) = Val\ RC_{REF(t-1)}(1,1) \pm T,$$

then the $RC_{(t)}$ and $RC_{REF(t-1)}$ values of photosensor element E(1,1) correlate. This is done for all photosensor elements 32a within the photosensor array 32 or selected sub-set thereof, and the logic circuit 46 stores and sums each correlation occurrence for each element E(n,m). The logic circuit 46 then divides the resulting sum of correlation occurrences by the number of elements E(n,m) considered in determining the image correlation factor IC.

Next, in step S403, the logic circuit 46 determines whether certain system start-up criteria are met. This is done to ensure that a stable image data frame $RC_{(t)}$ is stored as $RC_{REF(t)}$. Importantly, $RC_{REF(t)}$ must correspond to an optimized and stable image data frame $RC_{(t)}$. When power is initially supplied to light sensing and logic circuit 26, electrical and thermal transients occur as is typical for silicon integrated circuits. For the system described herein, satisfactory start-up criteria include: (1) a minimum number of image data frames that must be processed to allow electrical stabilization and the completion of the majority of EP and SSI optimization, where the minimum number of data frames is preferably 25 but may be in the range of 15 to 40; and (2) a stable reference image $RC_{REF(t)}$, where $RC_{REF(t)}$ is sufficiently stable when AR is within the operating point range OP±R and IC exceeds 0.95 for at least 2 to 10 image data frames, but preferably 4 image data frames.

If the start-up criteria are not met in stop S403, then, in step S404, the logic circuit 46 stores $RC_{(t)}$ in RAM 50 as a reference image data frame $RC_{REF(t)}$ (which is $RC_{REF(t-1)}$ where the current image data frame is $RC_{REF(t)}$ on the next system cycle) and the program returns to step S310. If the start-up criteria in step S403 are met, then the program goes to step S405.

In steps S405 and S406, threshold values $T_1$ and $T_2$ are used to determine the degree to which the current and reference image data frames match or mismatch. The values of $T_1$ and $T_2$ depend on the particular application and the degree of confidence or reliability required in the match/mismatch conditions of steps S405 and S406. For the vehicle intrusion detection system, it has been found that appropriate threshold values may range from 0.0 to 0.6 for $T_1$ and from 0.95 to 1.0 for $T_2$, but are preferably 0.6 and 0.95 for $T_1$ and $T_2$, respectively. Due to image or system variations, perfect image correlation does not normally occur; therefore, compared image data frames having an IC value greater than 0.95 are considered a match, those having an IC value less than 0.6 are considered a mismatch and those having an IC between $T_1$ and $T_2$ are neither a definite match nor a definite mismatch.

More particularly, if IC exceeds $T_1$ in step S405, then the logic circuit 46 determines whether IC exceeds $T_2$ in step S406. If IC does not exceed $T_2$, then the program returns to step S310 since there is neither a match nor a mismatch condition. If IC does exceed $T_2$, then there is a match and the logic circuit 46 updates the reference image data frame $RC_{REF(t)}$. It should be understood that $RC_{REF(t)}$ may be the same as $RC_{REF(t)}$ or may represent any appropriate combination of two or more image data frames. For example, $RC_{REF(t)}$ may be determined using a digital lag filter:

$$RC_{REF(t)} = RC_{REF(t-1)} + K \times (RC_{(t)} - RC_{REF(t-1)}),$$

where K may be a constant. After the logic circuit 46 updates $RC_{REF(t)}$ and stores it in the RAM 50, the program again returns to step S310.

If IC does not exceed $T_1$ in step S405, then the image data frames are considered a mismatch. Even though $T_1$ is selected so that only significant differences between $RC_{(t)}$ and $RC_{REF(t-1)}$ provide a mismatch condition, the logic circuit 46 determines in step S408 whether the mismatch condition is a valid intrusion condition. This is because there are conditions that result in the logic circuit 46 erroneously determining a mismatch condition. For example, automotive electrical system noise may affect the ability of the photosensor array 32 to provide accurate photosensor element signals, although this normally occurs only for short periods given the nature of such noise. While not all system applications may require the same level of confidence for a correct mismatch condition, it has been found that requiring a number of successive mismatch conditions represents a good validation test for step S408. In particular, it has been found that this validation test better ensures that the mismatch condition is valid by requiring from 2 to 300 successive mismatch conditions. Alternatively, the validation test may require from 2 to 300 initial mismatch conditions and allow a number of match conditions in step S405, where the number of match conditions may be from 1 to 15 depending on the required number of mismatch conditions.

If the logic circuit 46 determines that the mismatch condition is not valid in steps 408, then the program will go to step S310. If the mismatch condition is valid, then the logic circuit 46 outputs one or more control signals in step S409. The control output signals are generally of two types: (1) signals that may be used to control directly certain vehicle hardware (lights, horn, etc.); and (2) signals that may be used as inputs to other vehicle controller systems that directly interface with such hardware. The logic circuit 46 may output any combination of these control output signals depending on the desired level of integration between the system of the present invention and other vehicle systems. Digital control signals, such as bistable signals or digitally coded words interpreted by other vehicle systems, are typical for most applications. If the logic circuit 46 outputs bi-stable control signals directly to vehicle hardware, then the control output signal lines may be latched in a high or low state to control the vehicle hardware. If the logic circuit 46 outputs control signals to a vehicle controller system, then a higher protocol level, (such as digitally coded words) may have to be output from the logic circuit 46.

FIG. 12B shows the logic flow chart of the compartment image data storage system configuration (primary task routine S500) of the vehicle interior monitoring systems of FIG. 12.

In step S501, the image data frame $RA_{(t)}$ (although this may be $RC_{(t)}$) is tested to determine whether it is valid. To determine whether $RA_{(t)}$ is valid in step S501, the logic circuit 46 may determine whether the array response AR is within the operating point range OP±R. More stringent validity tests may include vehicle feature recognition, in which the system attempts to identify reference vehicle features, such as the seats or window pillars, and if the logic circuit 46 cannot identify these reference features in $RA_{(t)}$, then it determines that $RA_{(t)}$ is invalid. If $RA_{(t)}$ is valid, then $RA_{(t)}$ may be optionally compressed in step S502 using any appropriate digital compression method to reduce the amount of image data. Next, in step S503, the logic circuit 46 stores the image data in the- nonvolatile memory 57 on a first-in-first-out (FIFO) basis. As will be described further below, the program may end or return to step S310 to obtain and process additional image data frames depending on the particular application. If $RA_{(t)}$ is not valid, then in steps S504, S505, S506 and S507, the logic circuit 46 determines whether the photosensor 2 has been intentionally defeated so that an accurate image data frame of the vehicle interior or compartment cannot be generated and stored in the nonvolatile memory 57.

More particularly, in steps S504 and S506, if it is determined that both EP and SSI are minimums, then the photosensor 2 is probably being defeated by an intruder or vehicle thief who is blinding the photosensor 2 by directing a light source, such as a bright flashlight, directly at the photosensor 2. This action saturates the photosensor array 32 so that the image data frame appears "white". Since the photosensor array 32 normally does not saturate when both EP and SSI are at their minimums, a "white" image data frame would not normally occur. In steps S505 and S507, if it is determined that both EP and SSI are maximums, then the photosensor 2 is probably being defeated by an intruder who is blinding the photosensor by placing a piece of tape or other opaque material over the lens 30 (or window) which the photosensor array 32 uses for "seeing" the vehicle interior 100. This action results in a "black" image data frame. Since SSI is maximized to allow the photosensor array 32 to generate images even if there is insufficient natural light, a "black" image data frame would also not normally occur.

If steps S504, S505 and S507 result in a "black" image condition or steps S504 and S505 result in a "white" image condition, then the logic circuit 46 outputs a control signal in step S508 to the vehicle controller to disable the ignition control device and/or to the vehicle controller system to activate the horn and lights. Otherwise, EP and SSI have not reached their adjustment limits, and the system attempts to optimize them and generates another image data frame which is then again tested to determine its validity in step S501.

VI. Integrated Headlight Control System

It is generally important for driver safety reasons that the headlights and sidelights of operating vehicles are turned on as night approaches or when background lighting levels fall below approximately 500 lux. More particularly, it is desirable to have the vehicle's headlights and sidelights automatically turn on when background lighting levels fall to a sufficiently low level and automatically turn off when background lighting levels rise sufficiently.

While there are other automatic headlight control systems, such systems require that the photocells, which are used to control the headlights, be located and positioned so that they generally face upward either to avoid the effects of oncoming headlights for generally forward facing photocells or to avoid the effects of following headlights for generally rearward facing photocells.

An advantage of the automatic rearview mirror system 20. is that the background light signal $B_{Lt}$ may be used to automatically turn on and off a vehicle's headlights and sidelights by controlling the vehicle lighting switch 45. Importantly, since $B_{Lt}$ is determined regardless of the presence of peak light sources, such as oncoming or following headlights, the directional constraints on how and where the sensor is located or positioned are avoided. Accordingly, using the photosensor array 32 of the present invention to provide additional vehicle lighting control functions results in lower costs and improved reliability over other headlight control systems.

The limited background light signal $B_{Lt}$ has been described for the purpose of controlling the reflectance levels of an automatic rearview mirror system 20. Additionally, the logic circuit 46 may use $B_{Lt}$ to generate a vehicle lighting control signal to control the vehicle lighting switch 45 to turn on and off automatically the vehicle's headlights and sidelights. The ability to use $B_{Lt}$ is important because the vehicle lighting switch 45 should not be responsive to rapid or small fluctuations in background light levels in the region of the desired point at which the vehicle lighting switch is turned on or off, i.e., the switch point. Such fluctuations can be caused by the shadowing effect of overhanging trees or structures or the lighting differences between the eastern and western skylines at dawn and dusk which may be encountered when turning the vehicle.

Additionally, hysteresis is also provided between the switch-on and switch-off conditions of the vehicle lighting switch 45 to further stabilize operation of the switch 45 in such fluctuating light conditions. More specifically, if the required switch point for falling light The levels is SP, then the switch point for rising light levels is SP×(1+H), where H is a hysteresis factor typically in the range of about 0.005 to 0.5, but is preferably 0.2. Thus, if $B_{Lt}$ is less than SP, then the vehicle lighting control signal to the vehicle lighting switch 45 is set high to turn on the vehicle's headlights and sidelights. If $B_{Lt}$ is greater than SP×(1+H), then the vehicle lighting control signal to the vehicle lighting switch 45 is set low to turn off the vehicle's headlights and sidelights.

Additionally, if the photosensor array 32 and logic circuit 46 are both powered directly by the vehicle's electrical system through the ignition switch, then a time delay $t_d$ may be provided such that if the ignition switch is turned off when the headlight control signal is set high, the vehicle lighting control signal will remain high for a time $t_d$ and thereafter fall to a low value to turn off the vehicle's headlights and sidelights. A manual control may also be provided to allow the driver to adjust the time delay $t_d$.

The vehicle lighting control signal and, more specifically, the lighting control switch 45 may also be used to inhibit automatic control of the automatic rearview mirror system 20. For example, if the vehicle lighting control signal indicates that the vehicle lighting should be turned off, then the logic and control circuit 34 may be used to enable sensitivity switch 42 or some other switch allowing the driver to manually adjust the reflectance level of the mirrors 28. Thus, the driver may manually select a lower reflectance level during daylight conditions to provide protection against peak light sources, such as a bright setting sun. As background light levels fall or during non-daylight conditions, the vehicle lighting control signal would indicate non-daylight conditions and the logic and control circuit 34 may then be used to disable manual control and return the automatic rearview mirror system 20 to full automatic control.

Figure 6B:
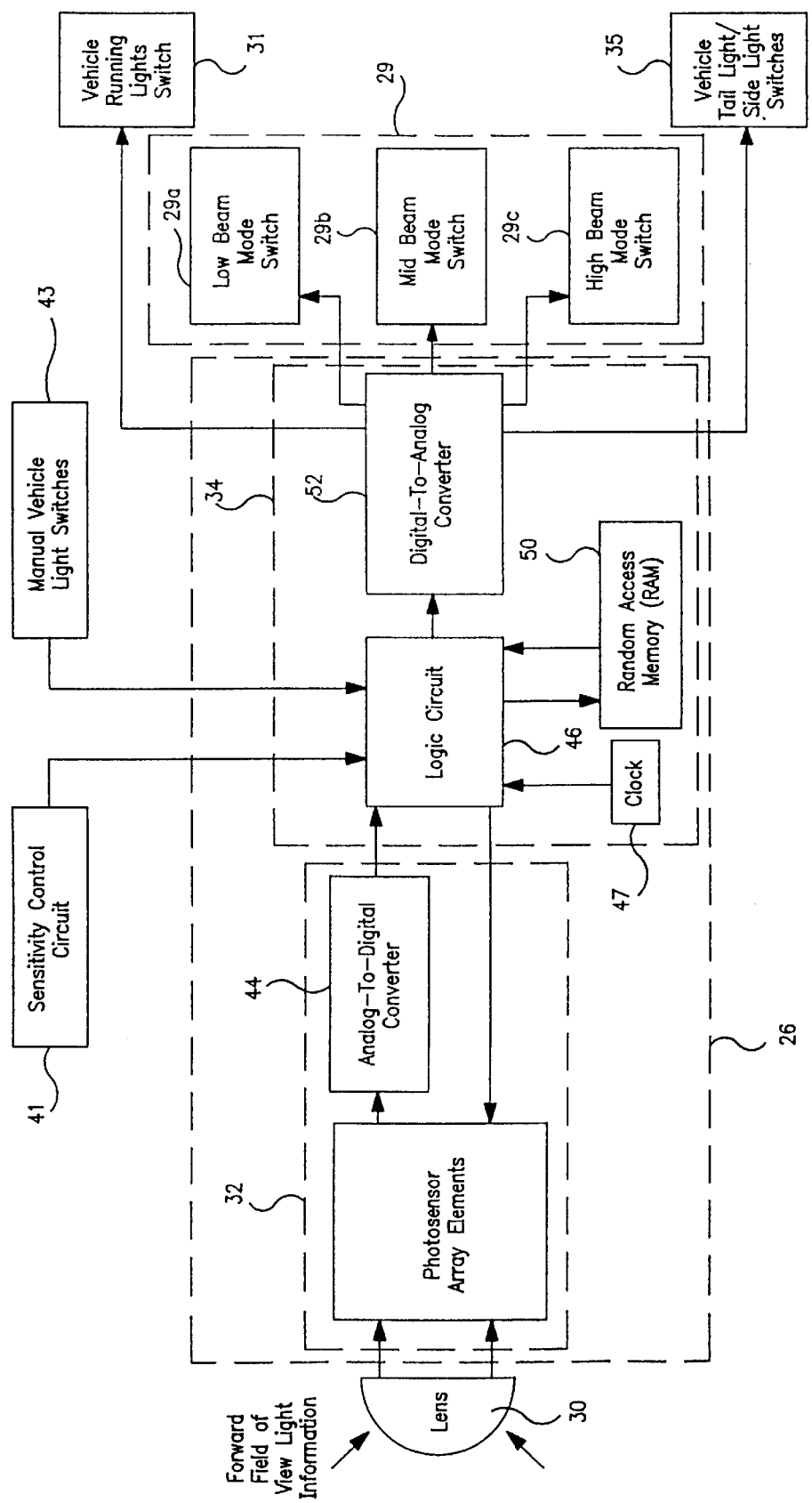
FIG. 6B is a schematic block diagram of a vehicle lighting control system having a photosensor array that has a forward field of view.

FIG. 6B shows another embodiment of a stand-alone vehicle lighting control system, which has a number of the components identified with respect to FIG. 6. The vehicle lighting control system of FIG. 6B may also be integrated with automatic rearview mirror system and vehicle interior monitoring system described herein. In FIG. 6B, however, the photosensor array 32 is directed generally forward of the vehicle so that it may sense a field of view forward of the rearview mirror 1. The forward field of view is through the vehicle's front windshield and generally in line with the primary vehicle direction. In the embodiment of the vehicle lighting control system as described herein, the photosensor array 32 comprises a plurality of photosensor elements 32a arranged in 160 columns and 120 rows (a 160×120 array) and has a forward field of view of approximately 50 degrees centered at the vehicle center line and a vertical field of view of approximately 30 degrees, where the vertical field of view is approximately 10 degrees above and 20 degrees below the horizon in the forward field of view. It should be understood that the forward field of view may also be provided to the photosensor array 32 by using any appropriate image directing optics or other appropriate means for directing a forward field of view onto the photosensor array 32 regardless of its orientation.

The logic and control circuit 34 processes the photosensor array signals corresponding to the forward field of view to determine an appropriate vehicle lighting configuration depending on the light information in the forward field of view. The methods used by the logic and control circuit 34 to determine the appropriate vehicle lighting configuration are described below. After determining the appropriate vehicle lighting configuration, the logic and control circuit 34 generates and applies control signals to headlight switches 29, which comprise a low beam mode switch 29a, a mid beam mode switch 29b and a high beam mode switch 29c, and to a vehicle running lights switch 31 and tail lights and side lights switches 35. Also shown in FIG. 6B is a sensitivity control circuit 41, which may be used to control the level of hysteresis in the vehicle lighting control system, and manual vehicle light switches 43 for manually controlling the vehicle lights.

The photosensor array 32 is preferably located within the vehicle interior since this provides protection against the outside elements, including dirt, moisture, rain and snow, as well as reduced exposure to ultraviolet light, and generally provides a relatively controlled environment, including temperature environment. It should be understood, however, that the photosensor array 32 may also be located in one or both of the external sideview mirrors 4 and 5, or in any other appropriate location on the vehicle.

The methods defined for determining the change-limited background light signal $B_{Lt}$ may also be used to determine a change-limited background forward light signal $B_{Lt}$ that may be used to control the vehicle lighting system. Also, the methods previously described for determining and identifying peak light levels may generally be used to determine and identify whether there are other headlights and taillights in the driver's forward field of view. The logic and control circuit 34 uses this information to control automatically the vehicle headlights (low beam, mid beam and high beam modes) so as to limit the annoyance or debilitation of other vehicle drivers forward of the vehicle. The method for processing the forward field of view image is the same as that shown through step S140 in the flow chart of FIG. 7A, and is generally the same as to steps S150 and S160 as detailed in the flow chart FIG. 8A, except that steps S155, S156 and S162 are excluded. FIGS. 13A, 13B, 13C and 13D are the flow charts that show the methods used by the logic and control circuit 34 to determine the appropriate vehicle lighting configuration and to control the vehicle lighting system. The methods detailed in FIGS. 13A, 13B, 13C and 13D may generally be described as follows:

After the logic and control circuit 34 determines $B_{LFt}$, it determines whether $B_{LFt}$ exceeds a threshold $B_{DD}$, which corresponds to the light level at dawn, dusk or a comparable lighting condition. If $B_{LFt}$ exceeds $B_{DD}$, then a flag $F_{DAY}$ corresponding to a daytime condition, which indicates that the vehicle running lights, if any, may be turned on but that vehicle headlights and taillights should otherwise be off, and resets to zero flags $F_{FLOW}$, $F_{MID}$ and $F_{HIGH}$, which respectively correspond to the low, mid and high beam modes for the vehicle headlights. If $B_{LFt}$ is less than $B_{DD}$ and exceeds a threshold $B_N$, which corresponds to a light level at night below which the mid or high beam modes may be operated, then the logic and control circuit 34 sets $F_{LOW}$ to 1 and resets $F_{DAY}$, $F_{MID}$ and $F_{HIGH}$.

If $B_{LFt}$ is less than $B_N$, then the logic and control circuit 34 processes a mid zone, which corresponds to a Sub-Array S(X) within the Array PA(N,M) of the photosensor array 32. This mid zone or zone of interest represents an appropriate area of the forward field of view image, in which the vehicle headlights may be set to their mid beam mode if there are no other vehicles as indicated by other vehicle light sources (headlights or taillights) within the mid zone. If there are no other vehicle light sources, then the logic and control circuit 34 sets $F_{MID}$ to 1 and resets $F_{LOW}$. Otherwise, $F_{LOW}$ remains set, and the logic and control circuit 34 determines and processes the next set of photosensor element signals.

If, however, $F_{MID}$ is set to 1, then the logic and control circuit 34 processes a high zone corresponding to the Array PA(N,M). The high zone represents an appropriate area of the forward field of view image, in which the vehicle headlights may be set to their high beam mode if there are no other vehicle light sources within the high zone. If there are no other vehicle light sources, then the logic and control circuit 34 sets $F_{HIGH}$ to 1 and resets $F_{MID}$. Otherwise, $F_{MID}$ remains set, and the system determines and processes the next set of photosensor element signals.

More complex vehicle lighting configurations may be controlled by determining an appropriate zone of interest for each available vehicle lighting mode or pattern.

Also, as discussed above with respect to the first embodiment of a vehicle lighting control system, hysteresis is used to moderate the frequency of transitions between the various beam modes and is reflected in FIGS. 13A, 13B, 13C and 13D by low beam counter LC, mid beam counter MC, high beam counter HC and night counter NC, each having corresponding hysteresis values LC1, MC1, HC1 and NC1, respectively. The hysteresis values may correspond to about 1 to 30 forward field of view image frames, and therefore correspond to a certain period of time since each image frame takes on the order of about 0.1 seconds to process. It should also be understood that in the described embodiment, hysteresis has only been provided for transitions from low to mid or mid to high transitions, while transitions from high to mid or mid to low occur after the processing of only one image frame. Of course, hysteresis may also be used for transitions from high to mid or mid to low. Also, transitions to the initial low beam mode may be delayed on the order of 15 seconds to five minutes, rather than occurring within one image frame as described herein. Further, in addition to or alternatively to hysteresis, specific time delays of from about 1 to 15 seconds, or any other appropriate delay be used for transitions between beam modes.

Also, the vehicle driver may use the sensitivity control circuit 41 to adjust the level of hysteresis. The vehicle driver may also use the manual vehicle light switches 43 to override the vehicle lighting control system.

Figure 13A:
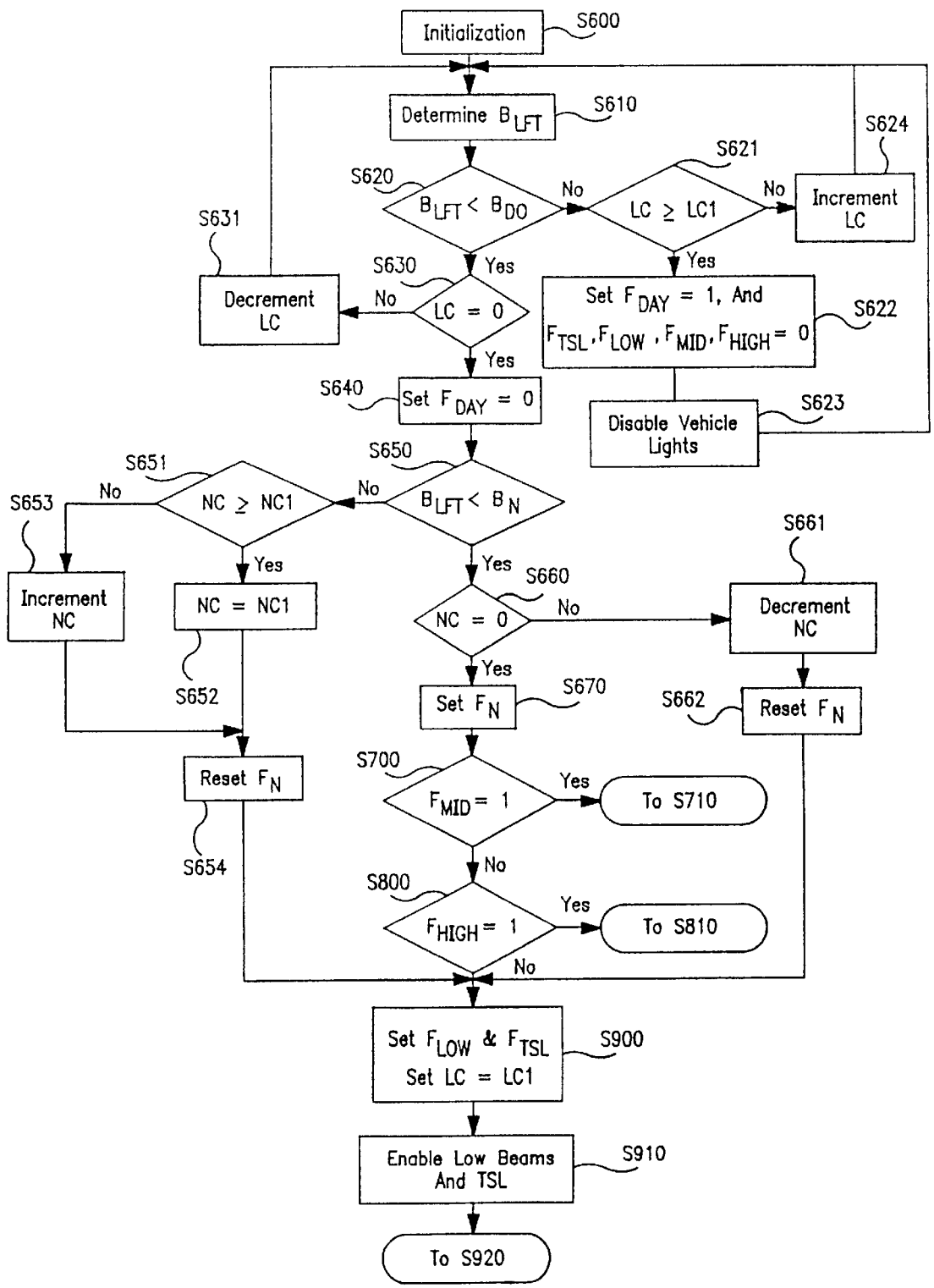
FIGS. 13A, 13B, 13C and 13D are flow charts illustrating the method of the present invention for controlling a vehicle lighting system.
Figure 13B:
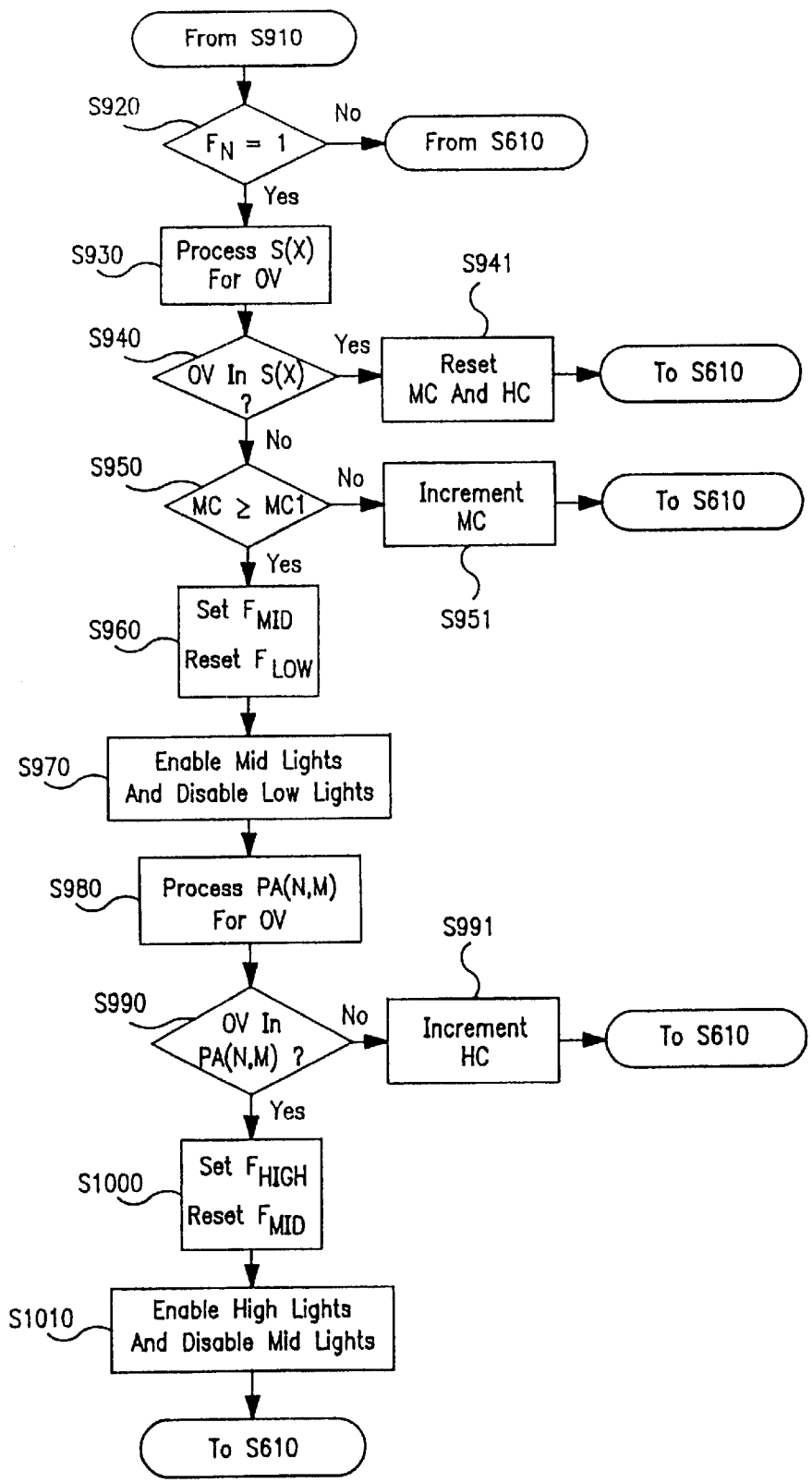
Figure 13C:
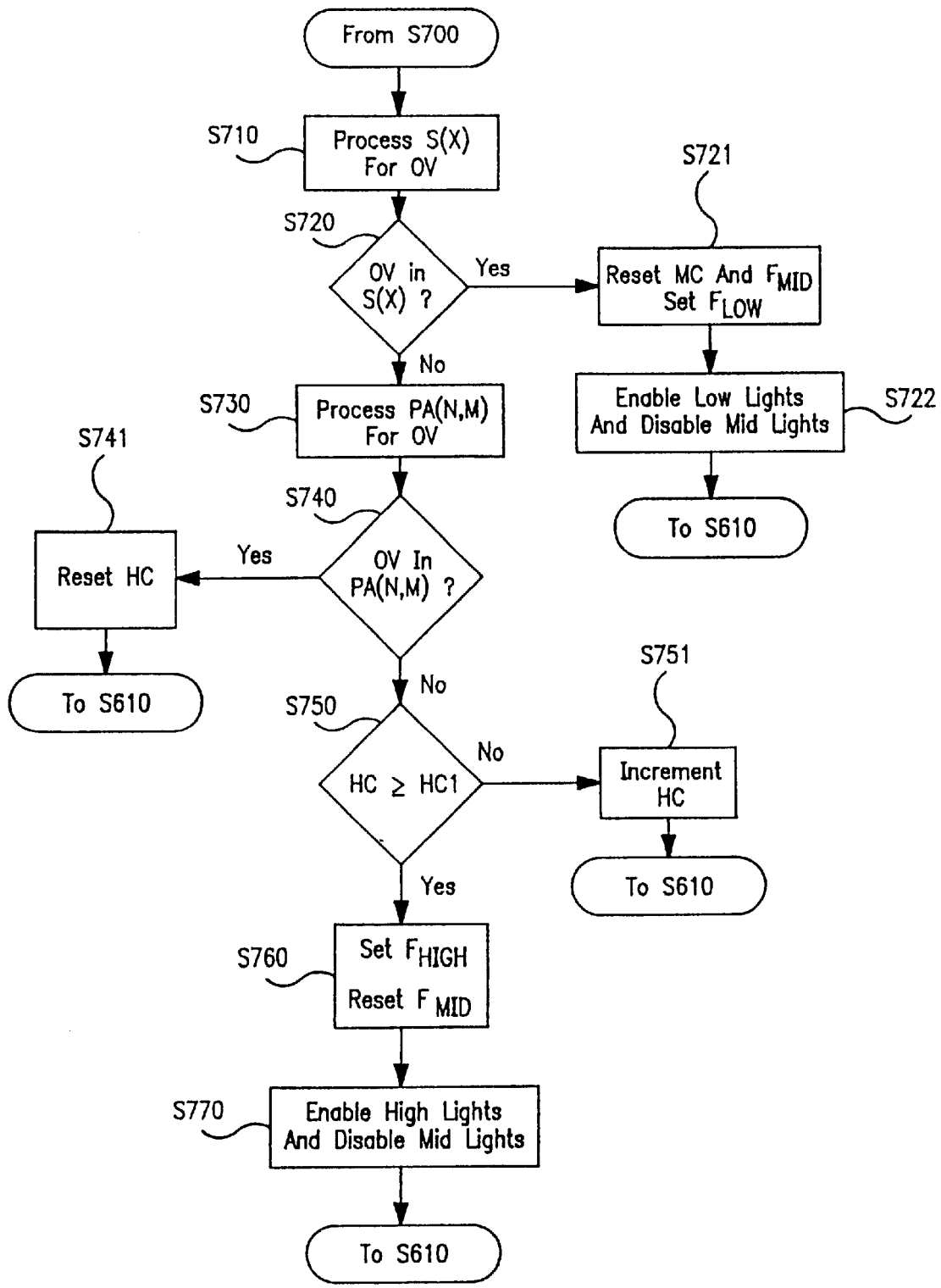
Figure 13D:
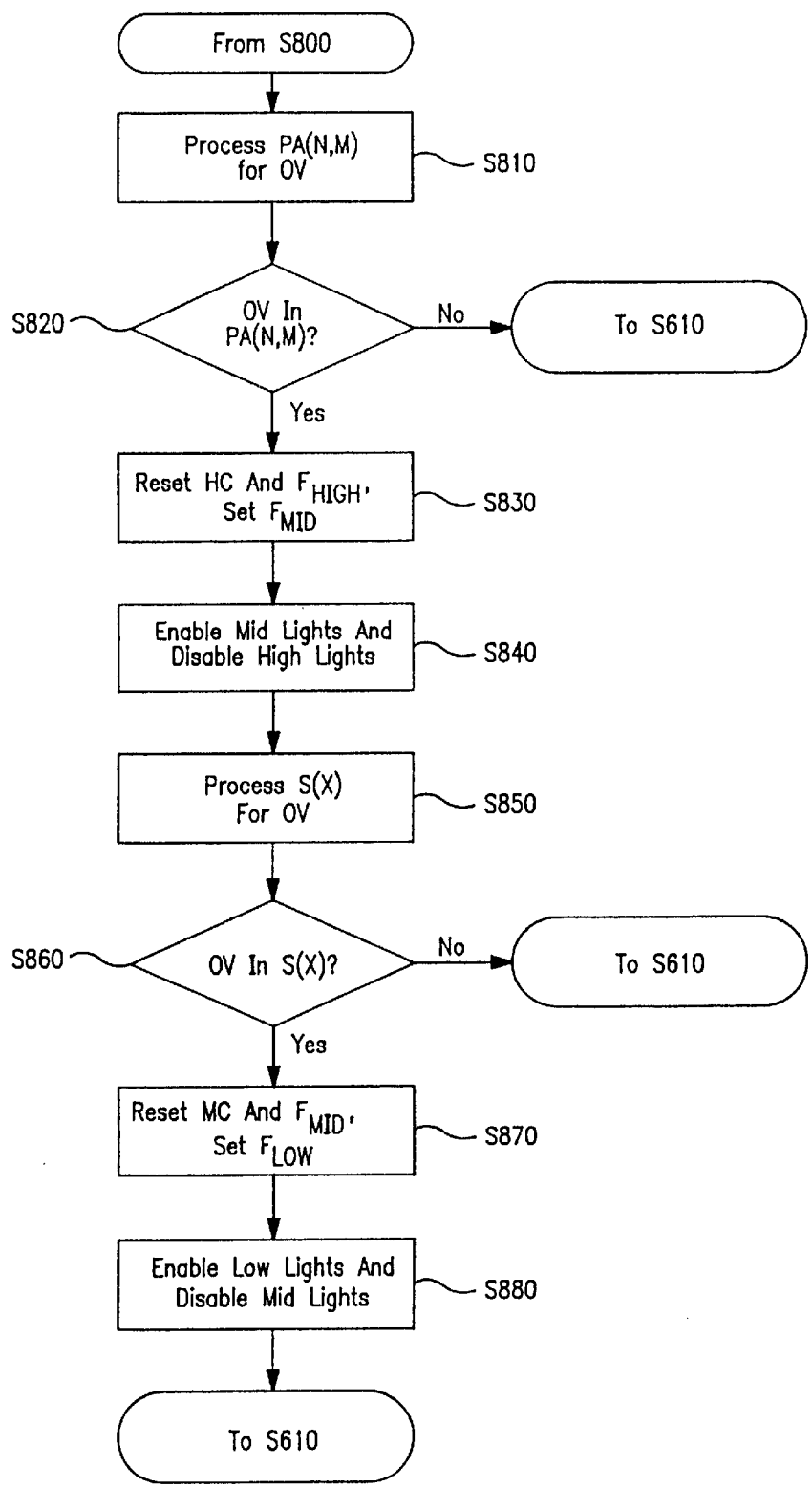

As discussed, FIG. 13A shows the initialization of the system and the initial low beam mode determination, FIG. 13B shows the initial mid and high beam mode determinations, FIG. 13C shows subsequent transitions from the mid beam mode to either the low or high beam modes, and FIG. 13D shows subsequent transitions from the high beam mode to the mid and low beam modes.

As to FIG. 13A, in the initialization step S600, the logic and control circuit 34 sets flag $F_{Day}$ to 1, sets flags $F_{LOW}$, $F_{MID}$, $F_{HIGH}$ and $F_N$ to 0, and sets counters LC, MC, HC and NC to 0.

Next, in step S610, the logic and control circuit 34 determines $B_{LFt}$ as previously described. In step S620, if $B_{LFt}$ is not less than $B_{DD}$, then the logic and control circuit 34 determines whether LC equals or exceeds LC1 in step S621. If LC is less than LC1, then LC is incremented in step S624 and the processing is returned to step S610. If LC equals or exceeds LC1, then the logic and control circuit 34 in step S622 sets $F_{Day}$ to 1, resets flags $F_{LOW}$, $F_{MID}$ and $F_{HIGH}$ to 0 and also resets a flag $F_{TSL}$, which corresponds to the status of the vehicle tail lights and side lights. Next, in step S623, the logic and control circuit outputs control signals to disable all vehicle night lights, including he headlights, side lights and tail lights.

If in step S620, $B_{LFt}$ is less than $B_{DD}$, then the system goes to step S630. In step S630, if LC exceeds 0, then LC is decremented in step S631 and the system returns to step S610. If LC equals 0 in step S630, then the logic and control circuit 34 sets $F_{Day}$ to 0 in step S640, and then goes to step S650. In step S650, if $B_{LFt}$ is not less than $B_N$, then the logic and control circuit 34 determines whether NC equals or exceeds NC1 in step S651. If not, then NC is incremented in step S653. If yes, then NC is set to NC1 in step S652. In either case, $F_N$ is then reset and the system goes to step S900. If $B_{LFt}$ is less than $B_N$, the system goes to step S660. If NC exceeds 0 in step S660, then NC is decremented in step S661 and $F_N$ is reset in step S662, after which the system goes to step S900. If NC equals 0 in step S660, then $F_N$ is set to 1 in step S670. Next, in steps S700 and S800, if $F_{MID}$ and $F_{HIGH}$ are not 1, then the system also goes to step S900. In step S900, $F_{LOW}$ and $F_{TSL}$ are set and LC is set to LC1. Next, in step S910, the logic and control circuit 34 enables the tail and side lights (TSL) and low beam mode, and proceeds to step S920.

Next, FIG. 13B shows the logic for making an initial transition from the low beam mode to the mid beam mode and for making an initial transition from the initial mid beam mode to the initial high beam mode. Thus, in step S920, if $F_N$ equals 1, then the system returns to step S610. Otherwise, the logic and control circuit 34 processes the Sub-Array S(X) in step S930 to determine whether there are any other vehicles (OV) in S(X) in the forward field of view, as previously described. In step S940, if OV is in S(X), then MC and HC are reset in step S941 and the system returns to step S610. If not, then the system goes to step S950. If MC does not equal or exceed MC1, then MC is incremented in step S951 and processing returns to step S610. Otherwise, $F_{MID}$ is set and $F_{LOW}$ is reset in step S960, and the logic and control circuit 34 outputs control signals to enable the mid beam mode and disable the low beam mode in step S970. Next, in step S980, the logic and control circuit 34 processes PA(N,M) to determine if there are any other vehicles (OV) in PA(N,M). In step S990, if OV is not in PA(N,M), then HC is incremented and the system returns to step S610. Otherwise, $F_{HIGH}$ is set and $F_{MID}$ is reset in step S1000, after which the logic and control circuit 34 outputs control signals to enable the high beam mode and disable the mid beam mode in step S1010, and the system returns to step S610.

As discussed, FIG. 13C shows the logic for making transitions from the mid beam mode to either low or high beam modes. Thus, if $F_{MID}$ equals 1 in step 5700 of FIG. 13A, then the logic and control circuit 34 processes S(X) for OV in step S710. If OV is in S(X) in step S720, $F_{LOW}$ is set and $F_{MID}$ and MC are reset in step S721, after which the logic and control circuit 34 outputs control signals to enable the low beam mode and disable the mid beam mode in step S722 and the system returns to step S610. If OV is not in S(X) in step S720, then the logic and control circuit 34 processes PA(N,M) for OV in step S730. In step S740, if OV is in PN(N,M), then HC is reset in step S741 and the system returns to step S610. Otherwise, in step S750, if HC does not equal or exceed HC1, then HC is incremented in step S751 and processing returns to step S610. If HC equals or exceeds HC1 in step S750, then $F_{HIGH}$ is set and $F_{MID}$ is reset, after which the logic and control circuit 34 outputs control signals to enable the high beam mode and disable the mid beam mode in step S770 and then returns to step S610.

Finally, FIG. 13D shows transitions from the high beam mode to the mid beam and low beam modes. Thus, if $F_{HIGH}$ equals 1 in step S800 of FIG. 13A, then the system goes to step S810, in which the logic and control circuit 34 processes PA(N,M) for OV. In step S820, if OV is not in PA(N,M), the system returns to step S610. Otherwise, $F_{MID}$ is set and $F_{HIGH}$ and HC are reset in step S830, after which the logic and control circuit 34 outputs control signals to enable the mid beam mode and disable the high beam mode in step S840. Next, in step S850, the logic and control circuit processes S(X) for OV. In step S860, if OV is not in S(X), then the system returns to step S610. Otherwise, $F_{LOW}$ is set and $F_{MID}$ and MC are reset in step S870, after which the logic and control circuit 34 outputs control signals to enable the low beam mode and disable the high beam mode in step S880 and then returns to step S610.

Additionally, the above system may also be used to determine an appropriate vehicle lighting configuration and then controlling the vehicle lighting systems so as to improve the driver's forward field of view. For example, by providing the photosensor array 32 with a forward field of view, the system may be used to recognize veiling glare caused by scattered light that may be caused by fog, snow, rain or other adverse conditions. In particular, the logic and control circuit 34 may be used to determine a contrast factor representing the level of contrast within the forward field of view. This information may then be used to select the appropriate vehicle lighting configuration so as to reduce the level of veiling glare.

The system may also be used to monitor varying windshield surface conditions caused by condensation, dirt, rain or snow. In particular, the system may be used to identify these conditions by analyzing the forward field of view image frames for distortion, or degradation. This capability may be enhanced by using infra-red supplemental source illumination (SSI) having wavelengths within the responsive range of the photosensor array 32.

More particularly, since the photosensor array 32 may have a forward field of view that includes at least the windshield area, which is swept by the windshield wipers, the logic and control circuit 34 may be used to generate control signals to operate the vehicle's windshield wiper system, windshield washer system, defogger system or windshield de-icing system so as to improve forward viewing conditions.

Also, for a forward field of view, the photosensor array 32 may be used to generate image frame data that controls or supplements the control of vehicle collision avoidance systems or other automatic vehicle systems using forward field of view information. Additionally, since the photosensor array 32 responds to a portion of the non-visible electromagnetic spectrum, as previously described, it may be used to receive non-visible, spatially or time varying data from objects in the forward field of view, such as vehicles or road signs having an infra-red source emitter, and to provide vehicle-to-vehicle or road-to-vehicle communications, which may be used to support intelligent vehicle and highway systems (IVHS), which are designed to improve road travel safety and efficiency.

VII. The Automatic Rearview Mirror And Vehicle Interior Monitoring System

Figure 10:
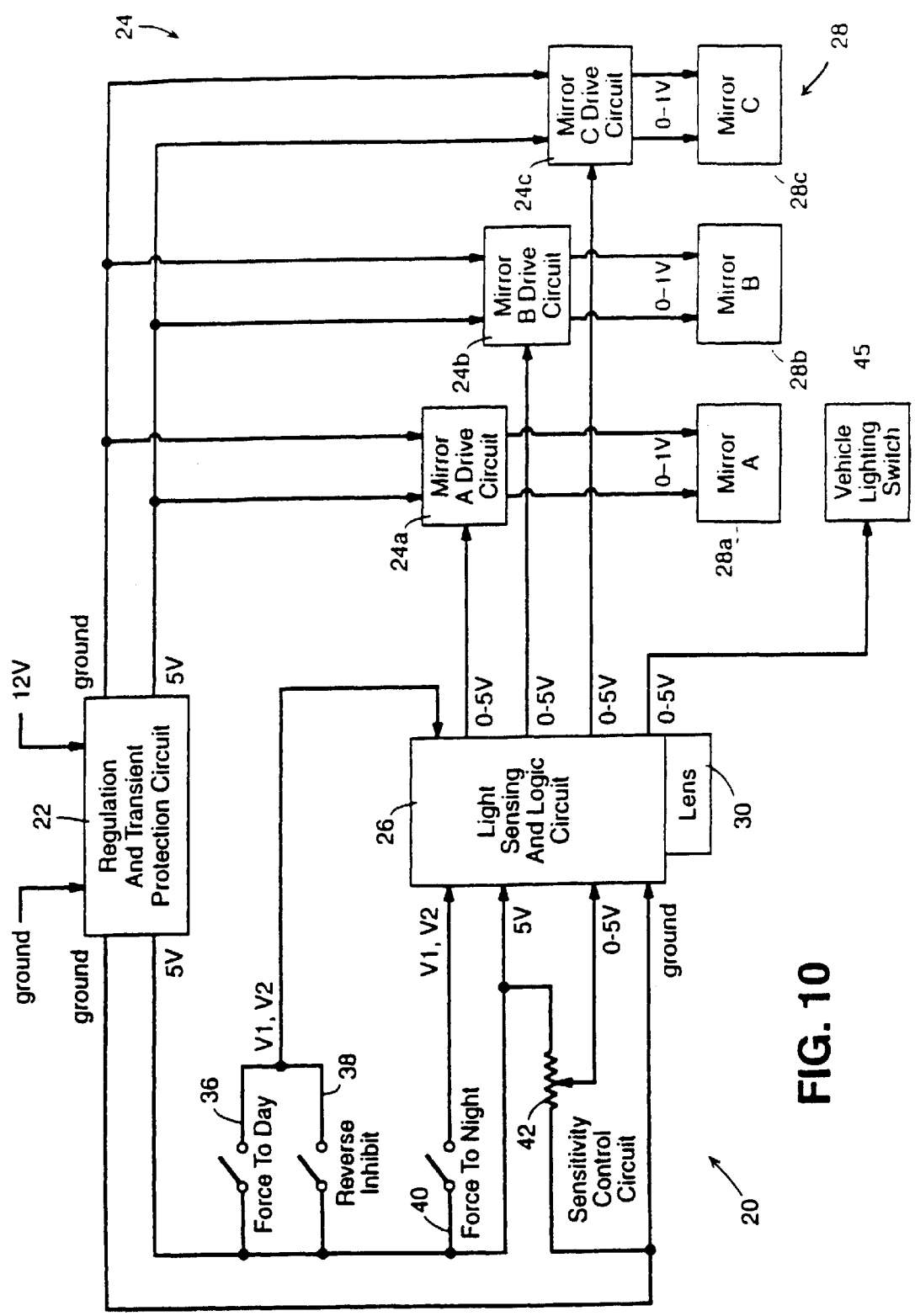
FIG. 10 is another schematic block diagram of the automatic rearview mirror system of the present invention.

FIG. 10 also shows the automatic rearview mirror system 20 of the present invention. The system 20 is powered by the vehicle's electrical system (not shown) to which the system 20 is connected. A voltage regulation and transient protection circuit 22 regulates power and protects the system 20 from voltage transients as is well known in the art. The circuit 22 is connected to the vehicle's electrical system and to ground, and outputs a voltage of up to about 5 volts to power the mirror drive circuits 24 and the light sensing and logic circuit 26. The circuit 22 also has a ground line connected to the light sensing and logic circuit 26.

The 5 volt line is also connected to the force-to-day switch 36 and the reverse-inhibit switch 38 (connected in parallel to the light sensing and logic circuit 26) which are used to force the mirrors 28 to their maximum reflectance level. More particularly, when either of these switches is closed, they generate a high level signal $V_H$ such as a 3 volt signal, which is input to the light sensing and logic circuit 26. This high level signal overrides the normal operation of the light sensing and logic circuit 26 causing it to output a control signal to the drive circuits 24 to drive the mirrors 28 to their maximum reflectance level. Conversely, when these switches are open, they each generate a low level signal $V_L$ such as a signal of less than 3 volts, thereby permitting normal operation of the light sensing and logic circuit 26, as has been discussed with respect to FIGS. 7, 8A and 8B. The force-to-day switch 36 and the reverse-inhibit switch 38 may be alternatively configured to generate a low level signal when closed and a high level signal when open. The force-to-day switch 36 is a manually operated switch and is preferably placed on the rearview mirror 28a and may be switch 3. The reverse-inhibit switch 38 is connected to a reverse inhibit line in the vehicle's electrical system (not shown) so that the reverse-inhibit switch 38 is actuated automatically whenever the vehicle is in reverse gear.

The force-to-night switch 40, used to force the mirrors 28 to their minimum reflectance level, generates a high level signal $V_H$ when closed and a low level signal $V_L$ when opened. The signal $V_H$ or $V_L$ is then input to the light sensing and logic circuit 26. The high level signal may, for example, be between 3 to 5 volts and the low level signal may be below 3 volts. The high level signal overrides the normal operation of the light sensing and logic circuit 26, as discussed with respect to FIGS. 7, 8A and 8B, causing the circuit 26 to output a control signal to the drive circuits 24 to drive the mirrors 28 to their minimum reflectance level. The low level signal, on the other hand, permits normal operation of the light sensing and logic circuit 26. Alternatively, the force-to-night switch 40 may be configured to generate a low level signal when closed and a high level signal when open. The force-to-night switch 40 is also a manually operable switch, preferably located on the rearview mirror 28a, and may also be switch 3.

The light sensing and logic circuit 26 is also connected to the sensitivity control circuit 42. The circuit 42 enables the operator to manually adjust the sensitivity of the mirrors 28 using the switch 3 (shown in FIGS. 1A and 1B). The sensitivity control circuit 42 (switch 3) may comprise a potentiometer whose voltage may be varied from zero to five volts. Alternatively, a single resistor may be used to provide a single preset sensitivity setting that cannot be changed by the driver.

As previously discussed with respect to FIGS. 5 and 6, the light sensing and logic circuit 26 comprises the photosensor array 32 (or other light sensing device) and the logic and control circuit 34. These two devices may be either separate or commonly located on a single semiconductor substrate. The light sensing and logic circuit 26 is preferably a single VLSI CMOS circuit.

Also shown in FIG. 10, the light sensing and logic circuit 26 outputs analog mirror control signals having voltages varying from zero to approximately 5 volts to the mirror drive circuits 24 and a vehicle lighting control signal of 0 to 5 volts to the vehicle lighting switch 45. Alternatively, as previously discussed the light sensing and logic circuit 26 may output a 5 volt pulse-width-modulated (PWM) signal to the mirror drive circuits 24. The mirror drive circuits 24 then generate and apply drive voltages varying from a low voltage on the order of 0 volts to a high voltage on the order of 1 volt to drive the mirrors 28. The actual driving voltage (or current) may, of course, be significantly lower or higher depending on the variable reflectance mirror element 1*a* used.

Each of the mirrors 28 preferably comprises a reflective electrochromic (EC) cell whose reflectance level may be varied from a maximum of anywhere from approximately 50 to 90 percent to a minimum of approximately 4 to 15 percent, and having a maximum driving voltage on the order of about 1 to 2 volts. As is well known in the art, electrochromic devices change their reflectance level when a voltage or other appropriate drive signal is applied to the electrochromic device. The mirrors 28 alternatively may comprise any other suitable variable reflectance mirror.

As previously discussed, it is also within the scope of the present invention for the light sensing and logic circuit 26 to be located remotely from the mirrors 28 of the system 20. However, depending on vehicle design and styling requirements, it may be preferred that the light sensing and logic circuit 26 be integral with the rearview mirror 28*a* such that: (1) the center line of the field of view of the photosensor array 32 is substantially perpendicular to the reflective surface of the rearview mirror 28*a;* and (2) the horizontal field of view of the photosensor array 32 is aligned with the horizontal axis of the rearview mirror 28*a*. As a result, the photosensor array 32 receives the light that will be incident on the rearview mirror 28*a* as shown in FIG. 6.

As has been discussed, the automatic rearview mirror system containing the photosensor array 32 may be extended to include a vehicle interior monitoring system configured as a vehicle intrusion detection system by vertically extending the effective field of view of the photosensor array 32 and by providing vehicle intrusion detection logic in the logic circuit 26. Importantly, the automotive rearview mirror and vehicle interior monitoring systems do not have to function simultaneously in both the vehicle intrusion detection mode and automatic rearview mirror mode. Therefore, the operation of the vehicle intrusion detection mode may be described independently of the operation of the automatic rearview mirror mode. As is described further below, a switch is used to input a mode select signal to the logic circuit 46 to select the desired operating mode.

In the vehicle intrusion detection mode, those photosensor elements 32*a* corresponding to the image segment below the lower edge of the vehicle window areas (i.e., the image information of FIG. 2A excluding the image information FIGS. 3A and 3B) are considered significant. Each photosensor element 32*a* is associated with a small and unique portion of the imaged scene. In particular, each photosensor element 32*a* senses light within its own image cone. For the preferred photosensor array 32, each photosensor element 32*a* is responsive to an area approximately one (1) inch square at 100 inches, which is about the maximum distance from the photosensor array 32 mounted in the rearview mirror 1 to most vehicle cabin interior surfaces within the area of interest. For the photosensor array 32 described above, one set of about 6,400 (160×40 sub-array) photosensor elements 32*a* are used in the automatic rearview mirror mode and another set of about 12,800 (160×80 sub-array) photosensor elements 32*a* are used in the vehicle intrusion detection mode. The ability of the photosensor array 32*a* to resolve the area of interest into a number of data values and to select particular image information, while ignoring other image information, is significant and distinguishes this vehicle intrusion detection system from other vehicle intrusion detection systems and technologies.

Figure 10A:
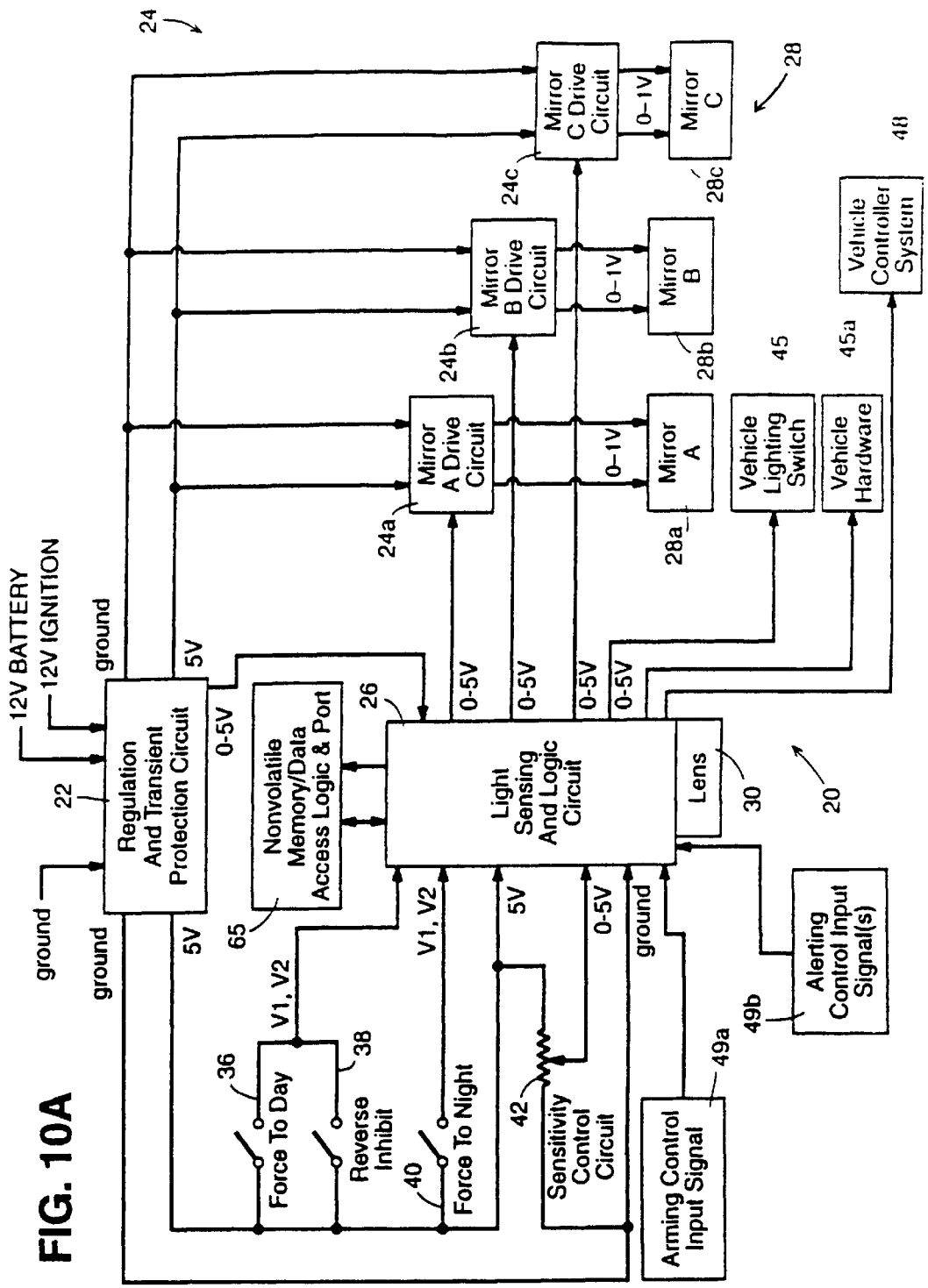
FIG. 10A is a schematic block diagram of the automatic rearview mirror and/or vehicle interior monitoring system of the present invention.

The automatic rearview mirror and vehicle interior monitoring system as shown in the schematic block diagram of FIG. 10A is identical to the automatic rearview mirror system shown in the schematic block diagram of FIG. 10 except as follows. First, as explained above, the array size required for an independent automatic rearview mirror system must be expanded from 160×40 to 160×120 to provide a larger effective field of view that includes most of the vehicle interior 100. Second, additional logic or control circuitry is incorporated in logic circuit 46 to process the vehicle intrusion detection logic of FIGS. 12 and 12A. The light sensing and logic circuit 26 includes additional control input lines for the "arming" and "alerting" control input signals and control output lines to interface with vehicle hardware or vehicle controller systems. Finally, the regulation and transient protection circuit 22 also has an additional vehicle power supply line (12V BATTERY), and a switch or other logic for providing a mode select signal that is input to the light sensing and logic circuit 26.

Normally, power is provided to vehicle hardware through the ignition switch controlled power supply circuits to avoid battery drain. Since the automatic rearview mirror system operates when the vehicle is being driven, it is normally connected to an ignition switch controlled power supply circuit as shown in FIG. 10. Since the vehicle intrusion detection system operates when the ignition switch is off, the regulation and transient protection 22 includes the additional vehicle battery power supply line for supplying power directly from the vehicle battery. The regulation and transient protection circuit 22 also includes a switch or other logic circuit (not shown) to output a mode select signal to the light sensing and logic circuit 26. The mode select signal is low (0 volts) when power is not available through the ignition switch controlled power supply circuit and high (5 volts) when it is.

The light sensing and logic circuit 26 includes an input line to receive an "arming" input signal 49*a* to actively arm the vehicle intrusion detection system.

Although not shown in FIG. 10A, other vehicle systems are typically used to supply an "arming" input signal. Such systems may be actuated by using conventional infrared or RF type remote control or by the activation of central door locking systems using the door key or entry combination keypad.

The light sensing and logic circuit 26 also includes input lines to receive an "alert" input signal(s) 49*b* to increase the sampling rate, such as when a trunk lid opening has been detected and increased monitoring may be required. The light sensing and logic circuit 26 also includes one or more output signal lines to the vehicle hardware 45*a* and/or to the vehicle controller system 48, for activating the horn and lights or disabling the ignition control device. The control output signal is normally low (0 volts) and goes high (5 volts) when there is an intrusion condition, but may also be a data word providing more detailed information, (such as the location of the intrusion) to the vehicle controller system.

When power is supplied to the automatic rearview mirror system through the ignition switch controlled power supply circuit, the regulation and transient protection circuit 22 outputs a high (5 volts) mode select signal to the logic circuit

46. This causes it to select the automatic rearview mirror mode and the system functions as an automatic rearview mirror system as previously described.

When the ignition switch is turned off, the mode select signal goes low (0 volts) and the logic circuit 46 sets the system to a low power mode, in which the logic circuit 46 only monitors the status of the mode select and "arming" control input signals. In this state, the vehicle intrusion detection mode is available, but the system is not "armed" and it is not monitoring the vehicle cabin. When in this state and when the "arming" control input signal is active, then the logic circuit 46 enters the vehicle intrusion detection mode described with respect to FIGS. 12 and 12A.

As previously described, in step S301, the logic circuit 46 initializes the system (e.g., resets the counters, etc., used in the automatic rearview mirror mode) and sets EP to its maximum value and SSI to its minimum level. Since the lighting levels are not known and may be at any level within the full operating range of the system at the time of arming, the system must determine the optimum combination of EP and SSI by maximizing the number of photosensor elements 32a providing useful image data. To minimize system power consumption, the method is biased to minimize SSI and maximize EP. In step S310, the status of the mode select, "arming" and "alerting" signals is monitored to confirm the appropriate operating mode. For example, if the "arming" signal goes inactive, then the system returns to a disarmed, low power mode and only monitors the mode select and "arming" signals. If there is no status change, then the system generates and stores $RA_{(t)}$ (using steps S101 to S140 of FIG. 7). The logic circuit 46 ignores RAM array data corresponding to the 160×40 array of photosensor elements 32a generally associated with the window areas as shown in FIGS. 3A and 3B, and processes the RAM array data corresponding to the 160×80 array of photosensor elements 32a generally associated with the vehicle cabin interior generally excluding the window areas of FIGS. 3A and 3B. It should be understood that a trapezoidal sub-set of RAM array data, corresponding to the same sub-set of photosensor elements 32a, may be selected so as to better correspond to the vehicle cabin interior excluding the window areas.

In step S320, the logic circuit 46 determines AR by calculating the average value of all the values in the selected sub-set of RAM array data. In the system described, AR may be in they range 0 to 255 (8-bit data esolution), but it is preferably at the operating point OP of 127 (mid-point of the range); however, for system stability purposes the range factor R results in an operating point OP range of 127±20. In step S330 and S360, it is determined whether AR is in the range OP±R. If AR is outside the range, then EP and SSI are incrementally increased or decreased according to steps S341, S342 or S351, S352. This is repeated for every image data frame. The system thus optimizes EP and SSI for the particular circumstances at system startup, and thereafter continues to adjust EP and SSI to maintain AR within the range OP±R as lighting conditions change. If AR is within the range, then the program enters the primary task S400 in block S370.

The vehicle intrusion detection system is designed to be responsive or sensitive to movement or motion within the vehicle interior 100 and insensitive to changes in general lighting conditions, moving shadows, etc. The system does this by reducing every image data frame to its robust and unique characteristics, largely unaffected by random light sources or changes in general lighting conditions. After sufficient image data frames have been processed to allow electrical stabilization and optimization of EP and SSI, the contour enhanced image data frame $RC_{(t)}$ is stored as the reference image data frame. Every image data frame is processed in the same way as the reference image and is then compared to the reference image. Decisions are reached after several images have been compared producing the same result. Three conclusions are possible after comparing images in the manner described. Images may be essentially the same, significantly different or neither similar enough nor different enough to make a decision. If this first condition exists for long enough, changes to the reference image are considered. Confirmation of the differences over several images result in a concluded intrusion.

More particularly, in step S401, the logic circuit 46 converts $RA_{(t)}$ to its contour enhanced form $RC_{(t)}$ by calculating the average difference between the value of $RA_{(t)}$ for each element E(n,m) and each of its eight (8) neighbors. As discussed, at system start-up, the system must electrically stabilize and must also adjust EP and SSI to optimize the image data frame stored as $RC_{REF(t-1)}$. This is done by cycling at least several times from step S310 through steps S403 and S404 and then returning to step S310. In step S404, the image data frame $RC_{(t)}$ is stored in RAM 50 as $RC_{REF(t)}$ so that $RC_{(t)}$ and $RC_{REF(t-1)}$ are available in step S402 in RAM 50 for comparison. In step S402, the correlation factor IC for $RC_{(t)}$ and $RC_{REF(t-1)}$ is determined. During this start-up period, EP and SSI become stable.

In step S403, the start-up criteria are tested, as previously described, and if the count is greater than 25 and the images $RC_{(t)}$ and $RC_{REF(t-1)}$ correlate (IC exceeds 0.95), then the system continues through step S405. Otherwise, it continues through step S404 until the image is stable. In the normal monitoring mode, IC is tested against $T_1$ in step S405, where $T_1$ is 0.6 ($T_1$ may be less than 0.6). If the degree of correlation or correspondence between the current and reference image data frames is poor (IC is less than 0.6), then the image data frames are judged to be sufficiently different to suggest that vehicle intrusion has occurred. Vehicle intrusion detection systems are evaluated on their ability to detect intrusion conditions and to avoid false intrusion conditions. To avoid false intrusion conditions, in step S408, the number of successive mismatch conditions is counted and compared to a preset value of 20 (which may be in the range 2 to 300), and a valid intrusion detection condition is established in step S408 after 20 successive mismatch conditions. In step S409, the logic circuit 46 outputs control signals to vehicle hardware 45a or to the vehicle controller system 48 for further processing, which may result in an alarm sounding, vehicle immobilization or other appropriate action. The system continues to monitor the vehicle interior or compartment by returning to step S310. If the number of successive mismatch conditions falls below 20 in step S408, then the system returns to step S310.

In step S405, if IC is greater than 0.6, then the images are not sufficiently different to confirm an intrusion condition. It is desirable to update the reference image data frame $RC_{REF(t)}$ if changes occur due to minor and slowly changing conditions outside the vehicle, such as changing light levels or slowly moving shadows due to the sun tracking across the sky. Accordingly, in step S406, IC is compared to $T_2$ (where $T_2$ is 0.95 but may be in the range 0.95 to 1), and if IC exceeds $T_2$, then the logic circuit 46 updates and stores the reference image data frame $RC_{REF(t)}$ in step S407. The logic circuit 46 may replace $RC_{REF(t-1)}$ with $RC_{(t)}$ or modify $RC_{REF(t-1)}$ as previously described. The system continues to monitor the vehicle interior by returning to step S310 until the "arming" control input signal goes inactive.

It should be understood that the larger field of view provided by the 160×120 array of the vehicle intrusion detection system enables further analysis of the rearward scene. Specifically, the background light signal $B_t$ may be determined using a larger set of photosensor array elements 32a. The combination of the automatic rearview mirror detection system and vehicle intrusion detection system additionally provides an opportunity for using SSI to illuminate the vehicle interior under dark conditions for the purpose of precise identification of specific vehicle features such as those indicated in FIG. 2A.

Vehicle feature identification is useful in the automatic rearview mirror system because it allows the logic circuit 46 to select each of the sub-arrays S(X) of photosensor elements 32a corresponding to zones a, b and c indicated in FIGS. 3A and 3B. This is useful when the photosensor array 32 is positioned in the rearview mirror 1. Active adjustment allows the logic circuit 46 to select sets or sub-arrays S(X) of photosensor elements 32a such that zones a, b and c are indicative of identical vehicle regions independently of driver rearview mirror 1 adjustment.

Finally, to minimize battery power drain, the system described may be operated in a low power mode by reducing the sampling rate at which images are obtained and processed, such as one image data frame per second. However, if the logic circuit 46 receives an "alerting" control input signal such as may be received from a vibration, motion, trunk lid or door opening sensor, then the system described herein may return to its normal sampling rate. Alternatively, this may also be achieved by having the system use the lower sampling rate until the logic circuit 46 establishes a poor. image correlation (i.e., IC <0.6) in step S406 and selects the higher sampling rate.

The vehicle interior monitoring system may also be configured as a compartment image data storage system to store any compartment image, such as the driver image, in the nonvolatile memory 57. The automatic rearview mirror and vehicle interior monitoring system configured as a compartment image data storage system is shown in the schematic block diagram of FIG. 10A and the previous description of FIGS. 10 and 10A applies except as follows. First, in the specific embodiment described herein, the light sensing and logic circuit 26 does not use control input lines for receiving the "arming" control input signal 49a and the "alerting" control input signal(s) 49b as in the vehicle intrusion detection system. Second, the additional vehicle power supply line (12V BATTERY) and mode select signal line are also not used in the specific embodiment described herein. This is because the compartment image data storage system may be limited to operating when the vehicle has been started since both authorized and unauthorized drivers actuate the ignition switch to start the vehicle (the vehicle thief may, of course, break the steering column ignition lock system to do this). Thus, power is always supplied through the ignition switch controlled power supply (12V IGNITION) when the vehicle is started. Finally, the light sensing and logic circuit 26 includes input/output lines to interface with the nonvolatile memory/data access logic and port 65, which comprises the nonvolatile memory 57, access/security decoding logic 58 circuit and data access part 59 of FIG. 6A. To reduce data storage requirements, the image data frame may be compressed using any appropriate digital image compression technique as discussed with respect to FIG. 6A. The image data frame is then stored in the nonvolatile memory 57, such as an EEPROM or any other appropriate nonvolatile memory, which has sufficient storage to store a predetermined number of image data frames.

The compartment image data storage system may be configured to store a single image data frame in the non-volatile memory 57 for each ignition cycle. When power is supplied to the automatic rearview mirror system through the ignition switch controlled power circuit, the regulation and transient protection circuit 22 supplies 5 volts to the light sensing and logic circuit 26, which begins system initialization for a set period of between zero (0) seconds and two (2) minutes, but preferably 30 seconds. This delay condition or wait state reduces the opportunity for vehicle thieves to detect SSI which may be emitted during the image optimization process of FIG. 12. After the wait state has ended, the compartment image data storage system operates as has already been described with respect to FIGS. 12A and 12B. The nonvolatile memory 57 should be sufficiently large to store a number N of valid image data frames $RN_{(t)}$ to document N sequential ignition cycles where N is in the range of 2 to 10, but is preferably 5. The image data frames are addressed via pointers that select a general memory location which are used to store each valid image data frame $RA_{(t)}$. The pointer addressing scheme is cycled on a first-in-first-out (FIFO) basis so that the most recent valid image data frames replace the "oldest" image data frames in the nonvolatile memory 57. After storing a valid image data frame $RA_{(t)}$, the system ends cycling and enters a dormant state waiting for the next ignition cycle.

Alternatively, multiple valid image data frames may be stored for a single ignition cycle. This second version of the compartment image data storage system performs exactly as the first description except as follows. After storage of the initial image data frame, the system returns to step S310 and the logic circuit 46 generates a random wait state ranging from 8 to 15 minutes during which the system stops generating image data frames. After the wait state has ended, the system proceeds to attempt generate another valid image data frame. This cycle of randomly waiting and then attempting to generate valid image data frames is continued as long as the ignition supplies power to the system. This approach is more difficult for thieves to defeat. This system may also be configured as a real-time image data storage system (e.g., 30 frames per second). of course, since at least several hundred image data frames may need to be processed, compressed and stored in the nonvolatile memory 57, the processing and nonvolatile memory storage requirements are significantly greater than for the other image data storage systems described above. An initiation sensor, such as accelerometers, motion sensors, vibration sensors or any other sensor capable of detecting vehicle motion, inputs an initiation signal, and after receiving the initiation signal, the light sensing and logic circuit 26 generates and stores in real-time the image data frames for a predetermined period, such as 10 seconds.

The nonvolatile memory 57 is preferably housed in a separate module in a physically difficult to access location within the vehicle, such as high on the fire wall behind the instrument cluster. The module is preferably a durable metal housing or other housing sufficiently durable so that it will protect the nonvolatile memory 57 from extreme shock or heat, such as might occur in a vehicle accident. To better ensure that the image data frames in the nonvolatile memory 57 are not accessed by unauthorized personnel, access may be limited by the security access/decoding logic 58. The security access codes necessary to access the image data frames may, for example, be distributed only to authorized persons. When the proper security access code is entered, the image data frames may be accessed through the access port 59; typically, the access port 59 is a multi-pin connector to which a data retrieval system may be connected.

It should be understood that the vehicle interior monitoring system described above, including the vehicle intrusion detection system and the compartment image data storage system configurations, may be implemented as an independent or stand-alone system in a module (without the automatic rearview mirror system), and that it may be mounted independently within the vehicle, such as in the headliner, headliner console or other appropriate areas.

The performance of the vehicle interior monitoring systems described herein may be enhanced by providing enhanced infrared reflectance characteristics in certain areas within the vehicle interior 100. For example, some fibers (such as cotton and silk) tend to reflect near infrared illumination better than other fibers (such as nylon and rayon) which tend to absorb near infrared illumination. Therefore, a pattern may be established in the vehicle interior 100 such as on the driver seat 101 or passenger seat 102 or front or rear seats or on the vehicle's interior door panels, etc., by using different fibers or other materials to establish a pattern, such as a grid or any other appropriate pattern. Near infrared illumination of the pattern provides a higher contrast image to the photosensor array 32. This better ensures that the logic circuit 46 accurately determines, for example, the presence of an intruder, an occupant or other object (such as a child restraint system in the front passenger seat).

Using fibers or materials having better infrared reflectance characteristics as described above is useful both during the day and at night. During the day, any near infrared reflective pattern in the vehicle will generally provide a higher contrast pattern to the photosensor array 32 because of natural sources (sunlight) or supplemental sources of near infrared of illumination. In particular, if light levels fall below some predetermined level (typically in the range of about 0.1 lux to 5 lux), then near infrared SSI may be used to provide a higher contrast image pattern to the photosensor array 32.

The vehicle interior monitoring system may also be used to monitor the vehicle interior 100 to determine whether there is an adult occupant, a child restraint system or no occupant in the front or rear passenger seat areas. Various mechanical and electrical sensors have been considered or used for detecting or sensing the size and presence of vehicle occupants, particularly those in the front passenger seat. These sensors include pressure sensors (mechanical and solid-state), accelerometers, ultrasonic sensors and mechanical or electrical switch mechanisms for indicating seat belt use. As air bags are becoming more prevalent, vehicle owners, insurance companies and automotive companies have a strong interest in having air bags deploy properly at all times, since replacing deployed airbags is costly. Additionally, there has been some discussion as to whether air bags should deploy when there is a child restraint system that is positioned rearwardly facing in the front passenger seat. Since performance requirements are stringent for safety related components, it is problematic to make appropriate airbag deployment decisions using currently known sensor technologies. The vehicle interior monitoring system may be configured as a vehicle occupant detection system that may be used to aid in the intelligent deployment of air bags depending, for example, on the status of the vehicle occupant. Image information, such as size, shape, contour and motion may be processed by the logic circuit 46 to determine whether to output a control signal to the air bag deployment system to prevent an air bag from deploying (such as a passenger air bag when there is no front seat passenger) or for controlling the rate at which the airbag deploys.

The individual components represented by the blocks shown in the schematic block diagrams of FIGS. 6, 6A, 6B, 10 and 10A are well known in the art relating to automatic rearview mirrors, vehicle lighting systems and vehicle intrusion detection systems, and their specific construction and operation is not critical to the invention or the best mode for carrying out the present invention. Moreover, the logic flow charts discussed in the specification and shown in FIGS. 7, 8A, 8B, 12, 12A, 12B, 13A, 13B, 13C and 13D may be implemented in digital hardwired logic or programmed into well-known signal processors, such as microprocessors, by persons having ordinary skill in the art. Since such digital circuit construction or programming per se is not part of the invention, no further description thereof is deemed necessary.

While the present invention has been described in connection with what are the most practical and preferred embodiments as currently contemplated, it should be understood that the present invention is not limited to the disclosed embodiments. Accordingly, the present invention is intended to cover various modifications and equivalent arrangements, methods and structures that are within the spirit and scope of the claims.

What is claimed is:

1. A vehicle monitoring system, comprising:
   a photosensor array having a field of view of an area of interest in an interior compartment of a vehicle and positioned for capturing an image of at least one imaged object at said area of interest, said photosensor array comprising a plurality of photosensor elements arranged in a predefined array;
   an illumination source illuminating said area of interest, said illumination source comprising an infrared illumination source for radiating in a bandwidth that is outside the visible light spectrum; and
   a control responsive to an output of said photosensor array for detecting the at least one imaged object, said photosensor array resolving said area of interest in accordance with said predefined array, said control processing image data that are geometrically associated with a geometric arrangement of said predefined array, and said control selecting particular image information by analyzing particular groupings of said predefined array while ignoring other image information imaged by other groupings of said predefined array so as to be responsive to image information chosen from at least one of presence, size, shape, contour and motion of the at least one object at said area of interest.

2. The monitoring system in claim 1 wherein said compartment comprises an interior cabin of the vehicle.

3. The monitoring system in claim 2 wherein said illumination source comprises a near-infrared source.

4. The monitoring system in claim 1 wherein said infrared illumination source comprises a near-infrared source.

5. The monitoring system in claim 1 wherein said illumination source illuminates at east between about 700 nm and 1200 nm.

6. The monitoring system in claim 3 wherein said illumination source is chosen from at least one of a light-emitting diode and a laser.

7. The monitoring system in claim 4 wherein said illumination source is chosen from at least one of a light-emitting diode and a laser.

8. The monitoring system in claim 6 wherein said illumination source comprises at least one of a light-emitting diode and a laser.

9. The monitoring system in claim 1 wherein said illumination source comprises at least one of a light-emitting diode and a laser.

10. The monitoring system in claim 9 wherein said light-emitting diode is chosen from the group consisting of a gallium arsenide light-emitting diode and a gallium aluminum arsenide light-emitting diode.

11. The monitoring system in claim 1 including a lens to distribute the illumination of said illumination source.

12. The monitoring system in claim 11 wherein said lens provides illumination in a cone of at least about 100 degrees.

13. The monitoring system in claim 11 wherein said lens provides illumination in a cone in the range from about 100 degrees to about 160 degrees.

14. The monitoring system in claim 11 including an optical filter for said source.

15. The monitoring system in claim 14 wherein said filter is chosen from one of an absorption filter and an interference filter.

16. The monitoring system in claim 14 wherein said filter comprises a long-wave pass absorption filter.

17. The monitoring system in claim 1 wherein said illumination source is adjacent said imaging sensor.

18. The monitoring system in claim 17 including an opaque barrier between said illumination source and said imaging sensor.

19. The monitoring system in claim 1 wherein said supplemental illumination source provides illumination only during an exposure period of said imaging sensor.

20. The monitoring system in claim 1 wherein said control determines a peak light level of at least one sub-array of said imaging array.

21. The monitoring system in claim 20 wherein said control determines peak light levels of a plurality of sub-arrays of said imaging array.

22. The monitoring system in claim 1 wherein said photosensor array comprises a CMOS camera.

* * * * *